US007414622B2

(12) United States Patent
Abe et al.

(10) Patent No.: US 7,414,622 B2
(45) Date of Patent: Aug. 19, 2008

(54) DISPLAY APPARATUS, AND IMAGE SIGNAL PROCESSING APPARATUS AND DRIVE CONTROL APPARATUS FOR THE SAME

(75) Inventors: Naoto Abe, Tokyo (JP); Kohei Inamura, Kanagawa (JP); Osamu Sagano, Tokyo (JP); Hiroshi Saito, Kanagawa (JP); Takeshi Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 463 days.

(21) Appl. No.: 11/260,456

(22) Filed: Oct. 28, 2005

(65) Prior Publication Data

US 2006/0038836 A1 Feb. 23, 2006

Related U.S. Application Data

(62) Division of application No. 10/300,538, filed on Nov. 21, 2002, now Pat. No. 7,009,627.

(30) Foreign Application Priority Data

| | | | |
|---|---|---|---|
| Nov. 21, 2001 | (JP) | ............................. | 2001-356602 |
| Dec. 21, 2001 | (JP) | ............................. | 2001-390565 |
| Dec. 25, 2001 | (JP) | ............................. | 2001-392608 |

(51) Int. Cl.
*G06F 3/038* (2006.01)

(52) U.S. Cl. ...................................... 345/204; 345/690

(58) Field of Classification Search .................. 345/60, 345/64, 74.1–74.2, 87–90, 98–104, 204–207, 345/211–214, 690; 313/309, 336, 495; 315/169.1–169.4, 315/174–175

See application file for complete search history.

(56) References Cited

U.S. PATENT DOCUMENTS

| | | | | |
|---|---|---|---|---|
| 5,307,084 | A | 4/1994 | Yamaguchi et al. | 345/58 |
| 5,734,361 | A | 3/1998 | Suzuki et al. | 345/74 |
| 6,104,136 | A | 8/2000 | Abe et al. | 313/495 |
| 6,140,985 | A | 10/2000 | Kanai et al. | 345/74 |
| 6,177,914 | B1 * | 1/2001 | Iwama et al. | 345/60 |
| 6,420,824 | B1 | 7/2002 | Abe et al. | 313/495 |
| 6,429,836 | B1 * | 8/2002 | Hansen | 345/74.1 |
| 6,515,641 | B1 | 2/2003 | Sagano et al. | 345/76 |
| 6,870,522 | B2 | 3/2005 | Sagano et al. | 345/75.2 |
| 7,009,627 | B2 * | 3/2006 | Abe et al. | 345/690 |
| 2001/0035850 | A1 | 11/2001 | Okamoto et al. | 345/77 |

FOREIGN PATENT DOCUMENTS

JP 8-248920 9/1996

* cited by examiner

*Primary Examiner*—Richard Hjerpe
*Assistant Examiner*—Mansour M Said
(74) *Attorney, Agent, or Firm*—Fitzpatrick, Cella, Harper & Scinto

(57) ABSTRACT

An image data processing circuit includes a first circuit for calculating an average picture level value of the image data, a multiplier for multiplying a coefficient by the image data, a second circuit for calculating a first coefficient for the multiplier based upon the average picture level value, and a third circuit for calculating a second coefficient for the multiplier. The second coefficient is calculated so that the result of multiplying (1) image data having a value over an input range of a circuit to which data from the multiplier is inputted, and (2) the second coefficient falls in the input range. In addition, a selection circuit selects the coefficient to be used in the multiplier from the first coefficient calculated by the second circuit and the second coefficient calculated by the third circuit.

1 Claim, 42 Drawing Sheets n = N / BLOCK $$IFj = \sum_{i=j\times n+1}^{(j+1)\times n} Ifi$$

j represents BLOCK number
(j=0, 1, 2,..., BLOCK-1)

IE
PERIOD1
0
64
TIME SLOT
EMISSION CURRENT PULSE
IN CASE OF NO VOLTAGE DROP

IE
INFLUENCE OF
VOLTAGE DROP
PERIOD1
Ie0
Ie1
0
64
TIME SLOT
ACTUAL EMISSION
CURRENT PULSE
COMPENSATION

PERIOD1'
COMPENSATED
PULSE WIDTH
DC1
Ie0
Ie1
0
64
64+DC1
TIME SLOT
EMISSION CURRENT PULSE
AFTER COMPENSATION
※ IE: EMISSION CURRENT EMITTED
IN CASE OF NO VOLTAGE DROP

※IE: EMISSION CURRENT EMITTED IN CASE OF NO VOLTAGE DROP

○ : CASE THAT GAIN IS NOT AVERAGED (EQUATION 20)

● : CASE THAT GAIN IS AVERAGED (EQUATION 21)

Fig. 34A
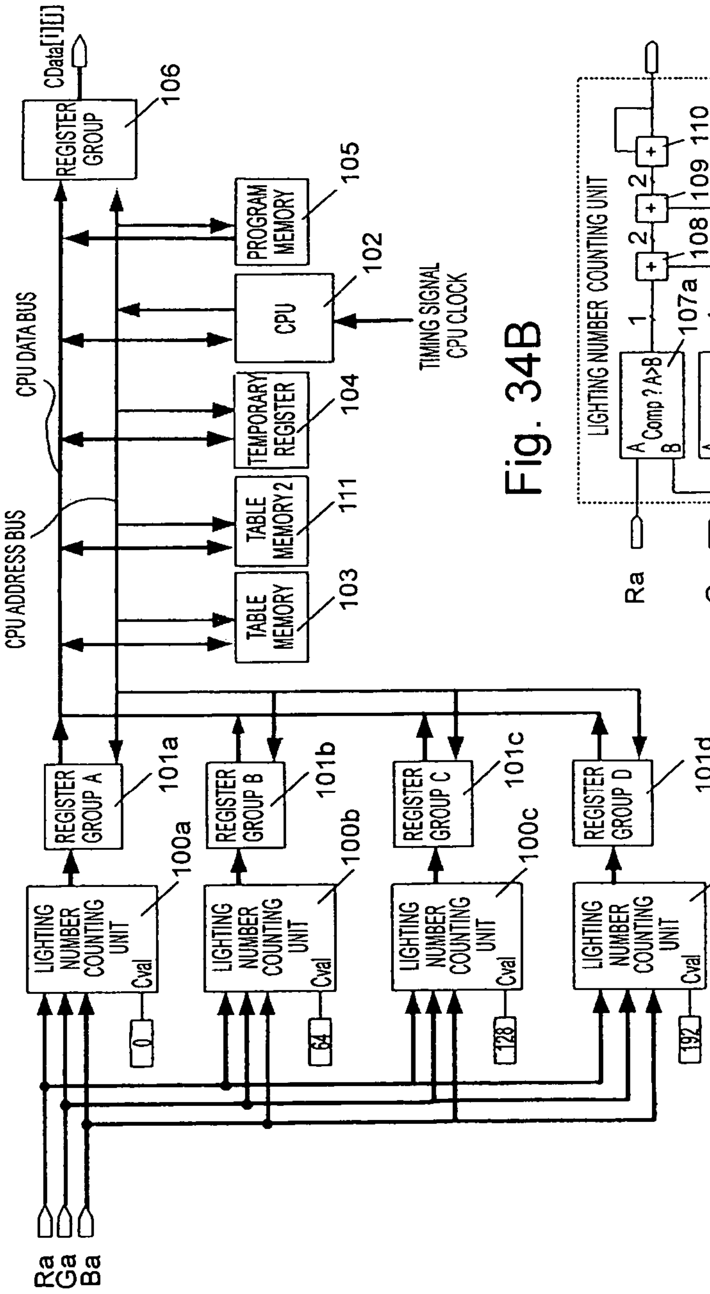
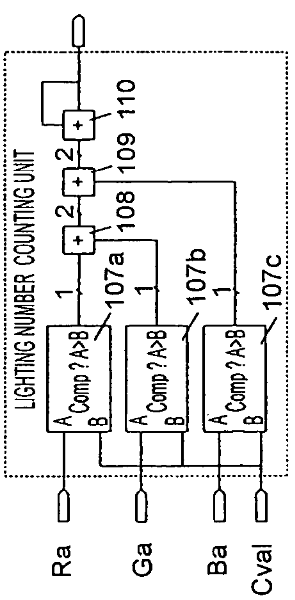
Fig. 34B

DISPLAY APPARATUS, AND IMAGE SIGNAL PROCESSING APPARATUS AND DRIVE CONTROL APPARATUS FOR THE SAME

This application is a divisional of application Ser. No. 10/300,538, filed on Nov. 21, 2002 now U.S. Pat. No. 7,009,627.

BACKGROUND OF THE INVENTION

1. Field of the Invention

This invention relates to display apparatuses such as display apparatuses for televisions and computers for receiving television signals and image signals of computers etc. and displaying images, and image signal processing apparatuses and drive control apparatuses for them.

More closely, it relates to a display apparatus which compensates a decreased portion of drive voltage resulting from electric resistance that a matrix wiring of a display panel has and effectively applied to display devices, and can drive the display devices with appropriate drive voltage, and an image signal processing apparatus and a drive control apparatus for the same.

2. Description of the Related Art

One of display devices is a cold cathode device. A example of a display apparatus having cold cathode devices is disclosed in JP Patent Publication No. 8-248920 (U.S. Pat. No. 5,734,361 specification). The display apparatus described in this document has such a structure that, in order to compensate lower luminance due to voltage drop by wiring resistance of electric connection wiring to the cold cathode device, its compensation data is calculated by statistical calculation and a desired value of an electron beam and the compensation value are combined.

The structure of the display apparatus described in this document is shown in FIG. 42. The structure involved in the data compensation in the apparatus is approximately as described below.

Firstly, a totalizer 1206 totalizes luminance data of one line of a digital image signal and outputs its totalized value to a memory 1207, and thereby, compensation data corresponding to the totalized value is read out from the memory 1207. On the other hand, the digital image signal is serial-to-parallel converted at a shift register 1204 and held for a predetermined time in a latch circuit 1205, and thereafter, inputted at a predetermined timing to a multiplier 1208 provided with respect to each column wiring. The multiplier 1208 multiplies the luminance data and the compensation data read out from the memory 1207 with respect to each column wiring to generate data after compensation, and transfers this data after compensation to a modulating signal generator 1209. The modulating signal generator 1209 generates a modulating signal corresponding to the data after compensation. Based upon this modulating signal, an image is displayed on a display panel. Here, like totalization processing of the luminance data of an 1 line portion of the digital image signal in the totalizer 1206, statistical calculation processing such as calculating summation and average to the digital image signal is carried out, and based upon this value, compensation is carried out.

However, in case of the conventional compensation for voltage drop, the processing for limitation of electric power which is generally called ABL (Automatic Brightness Limiter) is not carried out.

And, in case of the conventional compensation for voltage drop, signal processing in order to calculate a current of a high voltage power supply (an anode current which is flowing through an anode electrode) precisely is not carried out either.

SUMMARY OF THE INVENTION

One purpose of the present invention is to be able to carry out ABL in case of a compensation for voltage drop as well as to compensate for voltage drop precisely.

Another purpose of the present invention is to provide a display apparatus which is able to calculate a current of a high voltage power supply (an anode current) and to carry out ABL precisely, and an image signal processing apparatus and a drive control apparatus for realizing the same.

A feature of the invention is characterized in that, a display apparatus comprises a display panel having display devices which are arranged in a matrix layout and driven through a plurality of row wirings and column wirings, a scanning unit adapted to scan the row wirings, a modulation unit adapted to supply a modulation signal to the column wiring based upon image data, a compensation unit adapted to apply compensation processing for compensating at least fluctuation of display luminance due to influence of voltage drop which is caused by a resistance of the row wiring to the image data, and a luminance control unit adapted to control display luminance of the display panel, based upon luminance information of the image data.

It is suitable that, in the display apparatus, the luminance control unit changes a drive voltage which is applied to the display panel in accordance with the luminance information.

Also, it is suitable that, in the display apparatus, the luminance control unit changes a drive voltage which is applied to the display panel in accordance with the luminance information, and changes a parameter of the compensation processing in the compensation unit.

Also, it is suitable that, in the display apparatus, the luminance control unit changes luminance level of the image data before the compensation processing or after the compensation processing in accordance with the luminance information.

Also, it is suitable that the display apparatus has a coefficient calculation unit adapted to determine a coefficient for maintaining width of the image data after the compensation processing within a predetermined range, and the luminance control unit changes display luminance of the display panel in accordance with the coefficient and the luminance information.

Also, it is suitable that the display apparatus has a coefficient calculation unit adapted to determine a coefficient for maintaining width of the image data after the compensation processing within a predetermined range, and the luminance control unit compares a value which is obtained from the coefficient and the luminance information with a predetermined luminance limitation reference value, and based upon its comparison result, changes luminance level of the image data after the compensation processing.

Also, it is suitable that, the display panel is a display panel having a common anode electrode, and the display apparatus has a coefficient calculation unit adapted to determine a coefficient for maintaining width of the image data after the compensation processing within a predetermined range, and, from an integration value of the image data and the coefficient, a value corresponding to a current value flowing through the anode electrode is calculated, and the value calculated is compared with a predetermined luminance limitation reference value, and based upon its comparison result, display luminance of the display panel is changed.

Also, it is suitable that, in the display apparatus, the luminance control unit changes display luminance of the display panel in accordance with the luminance information and a luminance limitation reference value which was set, and the luminance limitation reference value can be changed by at least one of power consumption of the display apparatus, a user interface unit or an external environment detection unit.

Another feature of the invention is characterized in that, an image signal processing apparatus for processing image data to be inputted to a display apparatus having a display panel having display devices which are arranged in a matrix layout and driven through a plurality of row wirings and column wirings, a scanning unit adapted to scan the row wirings, and a modulation unit adapted to supply a modulation signal to the column wiring based upon input image data, comprises a compensation unit adapted to apply compensation processing for compensating at least fluctuation of display luminance due to influence of voltage drop which is caused by a resistance of the row wiring to the image data, and a luminance control unit adapted to change luminance level of the image data to control display luminance of the display panel, based upon luminance information of the image data.

Still another feature of the invention is characterized in that, a drive control apparatus for controlling a drive of a display apparatus having a display panel having display devices which are arranged in a matrix layout and driven through a plurality of row wirings and column wirings, a scanning unit adapted to scan the row wirings, and a modulation unit adapted to supply a modulation signal to the column wiring based upon input image data, comprises a compensation unit adapted to apply compensation processing for compensating at least fluctuation of display luminance due to influence of voltage drop which is caused by a resistance of the row wiring to the image data, and a luminance control unit adapted to change a drive voltage of the display panel to control display luminance of the display panel, based upon luminance information of the image data.

It is suitable that, in the drive control apparatus, a parameter of the compensation processing is changed in accordance with change of the drive voltage.

Then, yet another feature of the invention is characterized in that, an image signal processing method for processing image data to be inputted to a display apparatus having a display panel having display devices which are arranged in a matrix layout and driven through a plurality of row wirings and column wirings, a scanning unit adapted to scan the row wirings, and a modulation unit adapted to supply a modulation signal to the column wiring based upon input image data, comprises a compensation step of applying compensation processing for compensating at least fluctuation of display luminance due to influence of voltage drop which is caused by a resistance of the row wiring to the image data, and a luminance control step of changing luminance level of the image data to control display luminance of the display panel, based upon luminance information of the image data.

Still yet another feature of the invention is characterized in that, a drive control method for controlling a drive of a display apparatus having a display panel having display devices which are arranged in a matrix layout and driven through a plurality of row wirings and row wirings, a scanning unit adapted to scan the column wirings, and a modulation unit adapted to supply a modulation signal to the column wiring based upon input image data, comprises a compensation step of applying compensation processing for compensating at least fluctuation of display luminance due to influence of voltage drop which is caused by a resistance portion of the row wiring to the image data, and a luminance control step of changing a drive voltage of the display panel to control display luminance of the display panel, based upon luminance information of the image data.

It is suitable that, in the drive control method, a parameter of the compensation processing is changed in accordance with change of the drive voltage.

BRIEF DESCRIPTION OF THE DRAWINGS

In the accompanying drawings:

FIG. 34 is a block diagram showing a structure of a discrete compensation data calculation part;

DESCRIPTION OF THE PREFERRED EMBODIMENTS

FIG. 1 is a block diagram for explaining a display apparatus according to several preferred embodiments of the invention.

Figure 1A:
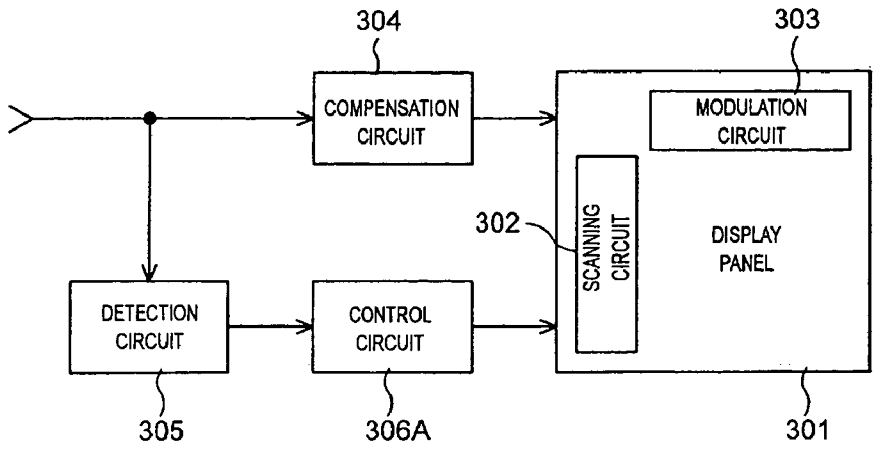
FIG. 1 is a block diagram of a display apparatus according to a preferred embodiment of the invention.

In FIG. 1A, 301 designates a display panel, 302 designates a scanning circuit, 303 designates a modulation circuit, 304 designates a compensation circuit as a compensation unit adapted to carry out compensation for voltage drop, 305 designates a detection circuit for detecting luminance information of input image data, and 306A is a control circuit for carrying out a drive control in accordance with the detected luminance information.

To incoming image data, the compensation circuit 304 applies, for example, voltage drop compensation processing to be hereinafter described, and the data is supplied to the modulation circuit 303 as a drive unit of the display panel 301.

On the other hand, the detection circuit 305 detects, from the input image data, for example, luminance information in 1 frame image. The detected luminance information is inputted to the control circuit 306A, and the control circuit 306A carries out processing for changing a drive voltage which is applied to the display panel 301 by the drive unit.

According to this embodiment, it is possible to carry out the voltage drop compensation successfully, over carrying out display brightness (luminance) control of the display panel like ABL (automatic brightness limiter).

Figure 1B:
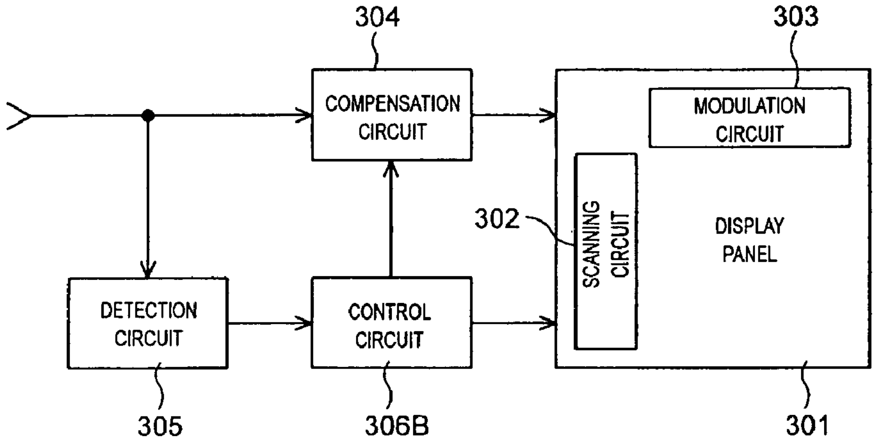

The display apparatus of FIG. 1B is a conformation in which detail of the display apparatus shown in FIG. 1A was changed, and the control circuit 306B carries out not only processing for changing the drive voltage in the same manner as in the control circuit 306A but also drive control and signal processing control such as changing parameters for voltage drop compensation processing in conformity to the drive voltage after the change and adjusting compensation amount by substantially voltage drop compensation processing.

According to the embodiment, over carrying out display brightness (luminance) control of the display panel like ABL, the voltage drop compensation can be carried out more successfully with good precision.

Figure 1C:
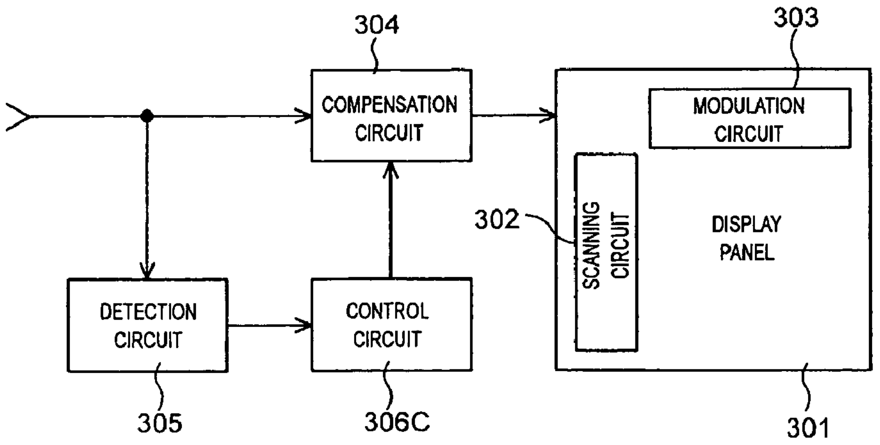

The display apparatus of FIG. 1C is a conformation in which detail of the display apparatus shown in FIG. 1B was changed, and the control circuit 306C carries out signal processing control such as changing parameters for the voltage drop compensation processing and adjusting substantially compensation amount by the voltage drop compensation processing in accordance with the detected luminance information. The control circuit 306C is a circuit which fixes, for example, a coefficient (gain) for changing and adjusting the luminance level of the image data. The fixed gain may be used for gain adjustment of the image data before the voltage drop compensation processing, and may be used for gain adjustment of the image data after the voltage drop compensation processing.

According to the embodiment, over carrying out the display brightness (luminance) control of the display panel like ABL, it can carry out the voltage drop compensation more successfully with good precision and it can carry out the brightness (luminance) control and the voltage drop compensation only by the processing of the image data. Accordingly, it is amore suitable conformation, in case that the detection circuit 305, the compensation circuit 304 and the control circuit are realized in one chip semiconductor integrated circuit, and in case that those functions are realized by a software.

As described above, the control circuits 306A, 306B and 306C work as a luminance control unit adapted to control the display luminance of the display panel 301.

The change of the drive voltage can be easily realized for example, by selecting a reference voltage applied to the display device by a switch of the drive unit. The reference voltage is a multilevel voltage determining a selection electric potential and a non-selection electric potential of the scanning signal, display electric potential and non-display electric potential of the modulation signal etc. Or, the reference voltage may be anode voltage for determining the electric potential of the anode in the display panel with an electron emitting device used as a display device. Here, an adjustment is carried out such as changing at least one electric potential among these electric potentials.

The luminance information is APL (average picture level) in a broad sense, i.e., average luminance level of all pixels in 1 frame, an integrated value of image data of all pixels in 1 frame, or the average luminance level of a large number of pixels selected appropriately out of all pixels in 1 frame or the integrated value of pixel data of a large number of pixels and so on. The luminance information like APL is suitable for carrying out ABL control.

Among others, in case that the integrated value is used as the luminance information, since it becomes clear that an electric current value corresponding to the display luminance of actual 1 frame portion of the display panel can be obtained from the integrated value and the coefficient which are used for changing the luminance level of the image data, on the basis of this coefficient and the integrated value, good control can be carried out. The detail of this will be described later.

Also, in the foregoing description, it was explained under such assumption that the detection circuit 305 detects the luminance information from the input image data, but information such as a display mode and an input source of the image data etc. may be treated as the luminance information to be detected. Herewith, in accordance with the display mode and the input source, the luminance control with an effect of the voltage drop compensation can be carried out.

Further, it is desirable to provide a gain calculation unit adapted to determine a gain for accommodating width of the image data after the compensation processing within a predetermined range, and to provide, according to need, a limiter for limiting maximum width of the image data.

Then, a value obtained from its gain and the luminance information is compared with a predetermined luminance limitation reference value, and on the basis of its comparison result, display luminance level of the display panel may be changed.

The voltage drop compensation is processing for compensating a difference between a drive voltage which should be applied to a selected display device and an applied voltage actually applied thereto due to the voltage drop resulting from electric resistance of wiring connected to the display device and current flowing therein. As its processing, a method for compensating the image data before being modulated by the modulation circuit is desirably used. For example, in case that, as to a drive voltage "+5" for displaying the image data of a certain luminance level (e.g., "+5"), an actual applied voltage is getting down to a voltage "+4" for displaying luminance level "+4" due to the voltage drop, a compensation for changing the image data of luminance level "+5" to the image data of luminance level "+6" is carried out. When this is done, since the actual applied voltage due to the voltage drop is not "+6" but becomes "+5", the luminance level "+5" to be desired to be primarily displayed is realized. In reality, there is no need for the luminance level to coincide with "+5" and it is enough to be able to compensate to a value as close as possible to it. Also, in case of a kind of line sequential drive of a matrix display panel, the voltage drop due to resistance of the scanning wiring (row wiring) is maximized, and the voltage drop amount differs by amount of an electric current flowing through another display device on the same selected line and its spatial distribution. Further, in case that a pulse width modulation is carried out in 1 horizontal scanning period, the voltage drop amount differs also by a temporal distribution of electric current in the 1 horizontal scanning period by the same reason.

In case that such voltage drop compensation is carried out, if luminance adjustment like ABL is used at the same time, there is a fear that precision of the voltage drop compensation is fluctuated to be lowered.

The display apparatus in this embodiment and its image signal processing apparatus and drive control apparatus suppress these fluctuations and enable the voltage drop compensation with higher precision to be carried out.

In case of the conformation as shown in FIG. 1B, it is desirable that the control circuit 306B has a compensated image data calculation unit having a function for renewing calculation parameters for calculating the compensated image data, in accordance with the drive voltage represented as a difference voltage of the selection electric potential on the occasion of sequentially selecting a row wiring by the scanning circuit 302 and the modulation electric potential (display electric potential) on the occasion of modulation by the modulation circuit 303. Or, it may be one for changing the calculation parameter such as the gain to be multiplied with an output of the compensation circuit 304.

Then, it is desirable that as the detection circuit 305, an average luminance detection circuit for detecting an average luminance level of the input image data is provided, and the control circuit 306B has a drive voltage adjustment function for setting the drive voltage based upon its average luminance level.

Or, it is desirable that the control circuit 306B has a plurality of display modes including at least a mode for giving a priority to the luminance and a mode for giving a priority to power consumption, and has a drive voltage adjustment function for setting the drive voltage based upon the selected display mode.

Further, it is desirable that the control circuit 306B has an image signal input terminal for television and an image signal input terminal for computer, and has a drive voltage adjustment function for setting the drive voltage based upon which terminal (image source) is supplying an image to be displayed.

It is desirable that the drive voltage adjustment function is a function for making the selection electric potential variable on the occasion of sequentially selecting a row wiring by the scanning circuit 302, and/or a function for making the modulation electric potential which is outputted by the modulation circuit 303 variable.

It is desirable that the compensated image data calculation unit has a voltage drop amount calculation unit for predicting the voltage drop on the row wiring for the input image data, a luminance lowering amount calculation unit for predicting the lowering amount of the luminance by the voltage drop from the voltage drop amount, and a compensation amount calculation unit for calculating a compensation amount which is applied to the input image data from the luminance lowering amount.

It is desirable that the voltage drop amount calculation unit renews a device current as the calculation parameter used on the occasion of calculating the voltage drop amount on the row wiring in compliance with the drive voltage.

It is desirable that the voltage drop amount calculation unit sets a plurality of reference times in 1 horizontal scanning period in compliance with the input image data, and further, along the selected row wiring, sets a plurality of reference points, and predicts and calculates the voltage drop amount at the reference points and at a plurality of reference times.

It is desirable that the luminance lowering amount calculation unit predicts and calculates the lowering amount of the luminance corresponding to a horizontal position that the voltage drop amount calculation unit calculated the voltage drop amount and a plurality of the reference times.

It is desirable that the compensation amount calculation unit calculates the compensated image data to a plurality of preset image data values, at a plurality of discrete horizontal display positions as the reference points, from the luminance lowering amount occurring at the plurality of reference times, at the plurality of reference points calculated by the luminance lowering amount calculation unit.

It is desirable that the compensated image data calculation unit further has an interpolation circuit for interpolates the discrete compensated image data calculated by the compensation amount calculation unit, and for calculating the compensated image data corresponding to the input image data value and its horizontal display position.

It is desirable that the display device is an electron-emitting device which can emit electrons in compliance with the drive voltage to be applied, an EL (electroluminescence) device having a light-emitting object as represented by an organic EL and an inorganic EL, or a LED device.

It is desirable that the electron-emitting device is a cold cathode device.

It is desirable that the cold cathode device is a surface conduction electron-emitting device, a field emission device etc., and what used, as an electron-emission material, a nanostructure in which carbon is a major component, as represented by CNT (Carbon Nano-Tube) or GNF (Graphite Nano Fiber), is desirably used.

It is desirable to have a fluorescent substance emitting fluorescence when electrons emitted from the electron-emitting device collide one another.

It is desirable that the display panel has the display devices arranged in a matrix layout and driven through the row wiring (scanning wiring) and the column wiring (modulation wiring).

Hereinafter, preferred embodiments of this invention will be described in detail by way of illustration with reference to the drawings. However, dimensions, materials, shapes, relative configurations etc. of components described in this embodiment are not intended to limit a scope of this invention to them, as long as there is no specific description in particular.

First Embodiment

This embodiment relates to a display apparatus having a processing circuit for compensating an influence applied to a display image by voltage drop in a scanning wiring, in view of such a phenomenon that, in a display apparatus in which cold-cathode devices as the display devices are arranged in a simple matrix layout, the voltage drop occurs in electric current flowing into the scanning wiring and wiring resistance of the scanning wiring and a display image is deteriorated, and relates particularly to one which realizes it with relatively small circuit size.

The compensation circuit (voltage drop compensation circuit) for compensating the decrease of the applied voltage due to the voltage drop described here is one which calculates deterioration of the display image caused by the voltage drop in compliance with the input image data, and obtains the compensation data for compensating it, and applies the compensation to the image data.

In this embodiment, it is possible to carry out the voltage drop compensation properly, even in case of carrying out luminance limitation, by controlling the drive voltage (difference electric potential of the selection electric potential and the modulation electric potential in case of selection) to be applied to the cold cathode device depending upon the average luminance level of the input image signal, from another view point that power consumption upon display is reduced.

Hereinafter, a preferred embodiment in case that the surface conduction electron-emitting device is used as the display device will be described.

(Overview of the Image Display Device)

Figure 2:
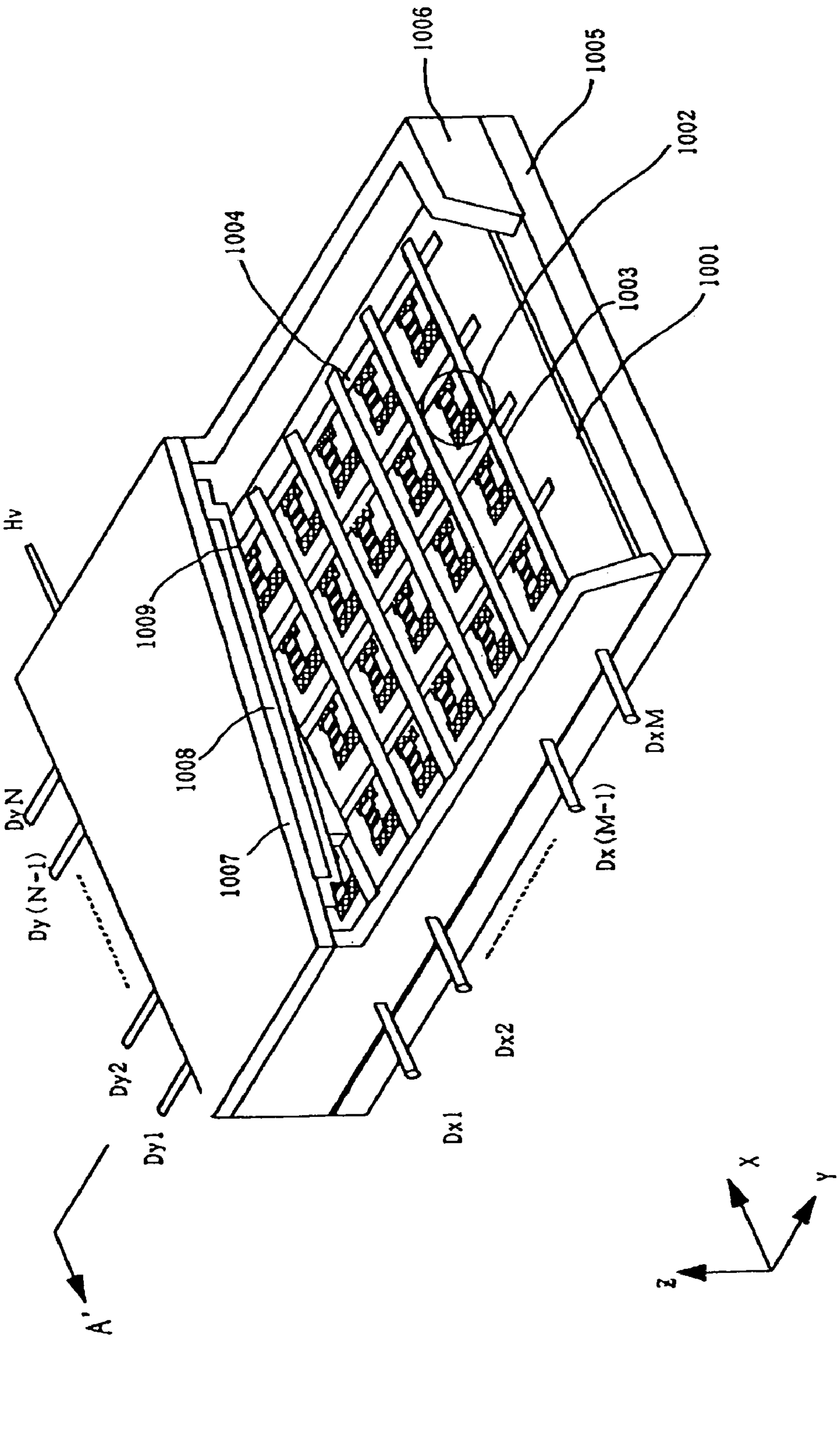
FIG. 2 is a diagram showing an overview of a display panel.

FIG. 2 is a perspective view of the display panel using the image display device according to this embodiment. Note that, in order to show its internal construction, the display panel is presented with a part removed. In the diagram, a rear plate 1005, a sidewall 1006 and a face plate 1007 constitute an airtight container for maintaining the inner part of the display panel as a vacuum.

Figure 3:
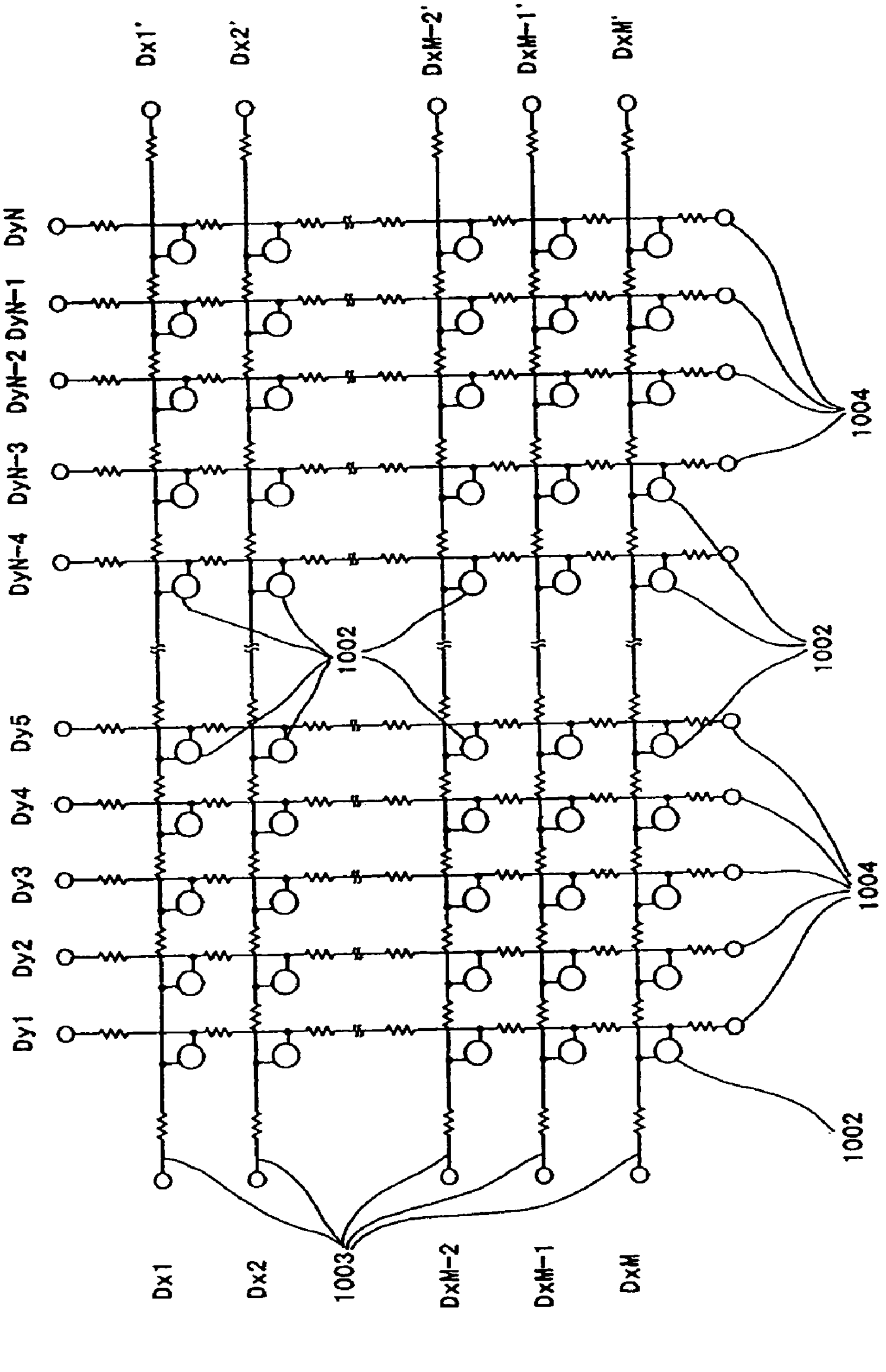
FIG. 3 is a diagram showing electrical connections of the display panel.

A substrate 1001 is fixed to the rear plate 1005. On the substrate 1001, there are formed N×M cold cathode devices 1002. Row wirings (scanning wirings) 1003, column wirings (modulation wirings) 1004 and cold cathode devices 1002 are connected as shown in FIG. 3. A construction wired in this fashion is referred to as a passive matrix.

Further, on a bottom surface of the face plate 1007 there is formed a fluorescent film (a fluorescent member) 1008. Since the display apparatus according to this embodiment is a color display apparatus, phosphors of the fluorescent film 1008 portion are colored separately in three primary colors of red, green and blue. The cold cathode devices are formed in the matrix manner so as to correspond with each of the pixels (picture elements) on the rear plate 1005. The phosphors are constructed such that the pixels are formed at positions where emitted electrons (emission current) that are emitted from the cold cathode devices will abut against the phosphors.

On a bottom surface of the fluorescent film 1008, there is formed a metal back 1009.

A high voltage terminal Hv is electrically connected to the metal back 1009. By applying a high voltage to the high voltage terminal Hv, the high voltage is applied between the rear plate 1005 and the face plate 1007.

In accordance with this embodiment, the surface conduction electron-emitting devices are made as the cold cathode devices inside the display panel described above. It is also possible to use as the cold cathode device a field emission device. Further, the present invention can also be applied in an image display device in which self light-emitting devices other than the cold cathode devices, such as EL devices.

(Characteristics of Surface Conduction Electron-Emitting Devices)

Figure 4:
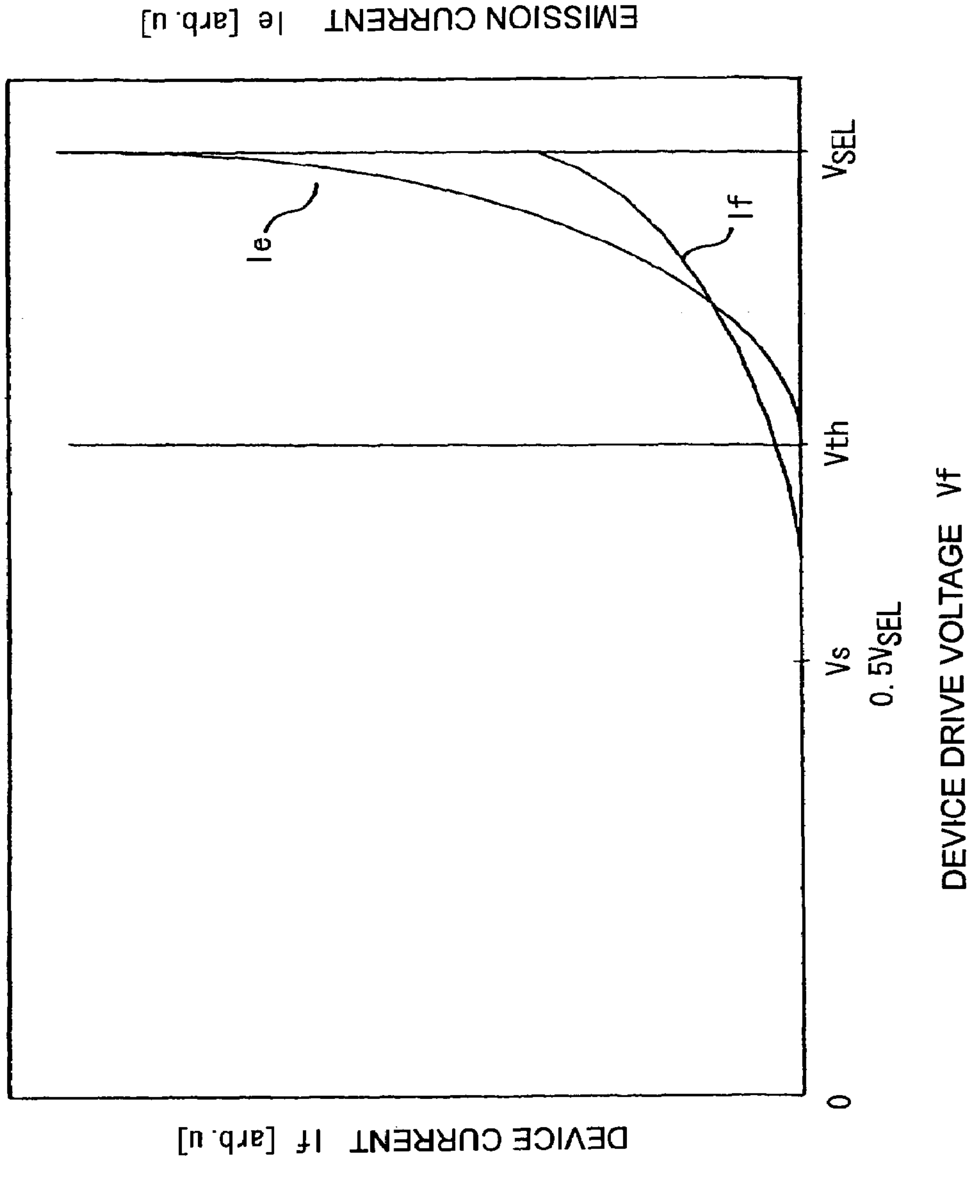
FIG. 4 is a diagram showing one example of a characteristic of a surface conduction electron-emitting device.

The surface conduction electron-emitting devices exhibit an emission current Ie/device drive voltage Vf characteristic, and a device current If/device drive voltage Vf characteristic, as shown in FIG. 4. Note that, the emission current Ie is much smaller than the device current If, and since it is difficult to show these currents in a diagram using the same scales, they are shown in two graphs using respectively different scales.

The emission current Ie in the surface conduction electron-emitting devices exhibit the following three characteristics.

First, when a voltage equal to or greater than a given voltage (this will be referred to as a "threshold voltage Vth") is applied to the device, the emission current Ie increases dramatically. However, on the other hand, when a voltage that is less than the threshold voltage Vth is applied to the device, the emission current Ie is hardly detected. In other words, the surface conduction electron-emitting device is a non-linear device having a clear threshold voltage Vth with respect to the emission current Ie.

Second, since the emission current Ie varies depending upon the voltage Vf that is applied to the devices, it is possible to control the amount of the emission current Ie by making the voltage Vf variable.

And third, since the surface conduction electron-emitting devices are also cold cathode devices, they have quick responsiveness which enables the emission time of the emission current Ie to be controlled by controlling the time when the voltage Vf is applied.

By taking advantage of the above-mentioned characteristics, the surface conduction electron-emitting devices can be used for the display apparatus in a favorable fashion.

For example, in a display apparatus using the display panel shown in FIG. 2, if the first characteristic is used, it becomes possible to perform the display by progressive scanning the display screen. In other words, according to the desired luminance a voltage which is equal to or greater than the threshold voltage Vth is applied as appropriate to the devices being driven, and a voltage below the threshold voltage Vth is applied to the devices which are in a non-selected state. By sequentially changing the devices which are being driven, the display screen can be scanned sequentially to perform the display.

Further, by utilizing the second characteristic, the amplitude of the voltage Vf applied to the devices is controlled to thereby enable the luminous brightness of the phosphors to be controlled, thus enabling image displays at various brightness.

Further, by utilizing the third characteristic, the illumination time of the phosphors can be controlled with the time that the voltage Vf is applied to the devices, whereby image displays of various brightness can be performed.

In the display apparatus of this embodiment, modulation was performed on the quantity of the electron beam of the display panel by using the above-mentioned third characteristic.

(Method of Driving the Display Panel)

The method of driving the display panel will be described concretely by use of FIG. 5.

Figure 5:
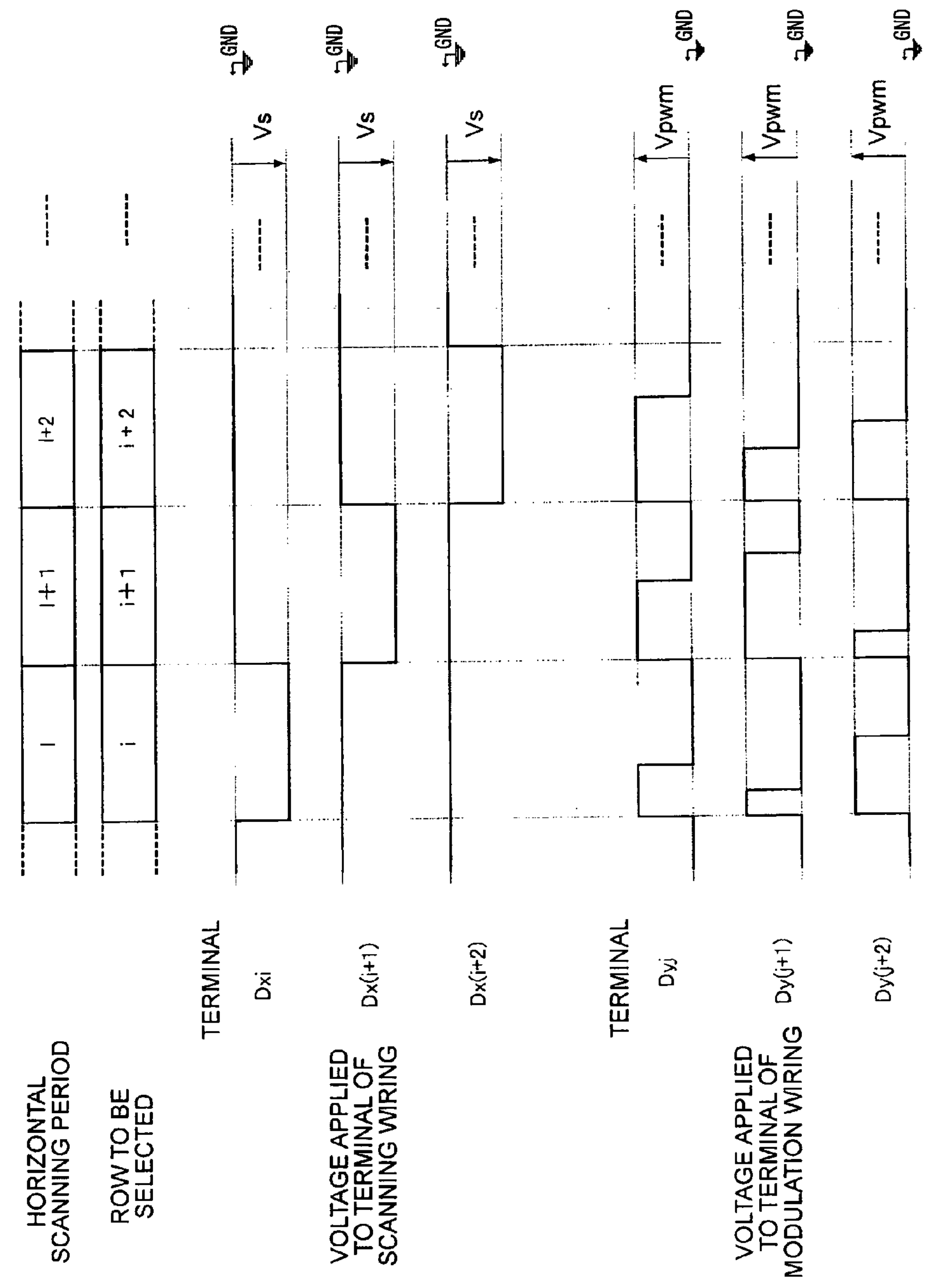
FIG. 5 is a diagram showing one example of a driving method of the display panel.

FIG. 5 shows one example of voltage applied to voltage supply terminals of the scanning wiring and the modulation wiring on the occasion of driving the display panel.

In the figure, a horizontal scanning period I shows a period for having pixels in a row "i" emitted light.

In order to have the pixels in the row i emitted light, the scanning wiring in the row i is made to be of a selection state, and a selection electric potential Vs is applied to its voltage supply terminal Dxi. Also, voltage supply terminals Dxk (k=1, 2, . . . N, but ≠i) for other scanning wiring are made to be of non-selection state, and non-selection electric potential Vns is applied thereto.

In this embodiment, the selection electric potential Vs is set to −5V which is about 30% to 50% of a $V_{SEL}$ (see, FIG. 4), and the non-selection electric potential Vns is set to a ground electric potential (GND). In addition, the voltage $V_{SEL}$ is assumed to be a rated voltage for driving the surface conduction electron-emitting device of the embodiment.

To the voltage supply terminal of the modulation wiring, a pulse-width modulation signal of voltage amplitude Vpwm is supplied.

Conventionally, pulse width of the pulse-width modulation signal to be supplied to the j-th modulation wiring was determined according to a value of the image data at the pixel in the row i at a column j of the image to be displayed, and pulse-width modulation signals corresponding to the value of the image data at respective pixels were supplied to all of the modulation wirings.

On the other hand, in this embodiment, by determining the pulse width of the pulse-width modulation signal to be supplied to the j-th modulation wiring in compliance with the value of the image data of the pixel in the row i at the column j of the image to be displayed and its compensation amount, the lower luminance due to the influence of the voltage drop is compensated.

In this embodiment, voltage of the voltage Vpwm is set to +0.5 $V_{SEL}$.

The surface conduction electron-emitting device emits electrons when the voltage $V_{SEL}$ is applied to both end of the device as shown in FIG. 4, but does not emit electrons at all in case of the applied voltage which is smaller than the voltage Vth. Also, the voltage Vth, as shown in FIG. 4, is characterized to be larger than 0.5 $V_{SEL}$.

On this account, electrons are not emitted from the surface conduction electron-emitting device connected to the scanning wiring to which the non-selection electric potential Vns is applied. Also, in the same manner, since the voltage applied to the both ends of the surface conduction electron-emitting device on the selected scanning wiring is Vs during a period in which an output of a pulse-width modulation unit is of the ground electric potential (hereinafter, called as the period in which the output is "L"), electrons are not emitted.

That is, electrons are emitted from the surface conduction electron-emitting device on the scanning wiring to which the selection voltage Vs was applied, in compliance with the period in which the output of the pulse-width modulation unit is Vpwm (hereinafter called as the period in which the output is "H"). Since, when the electrons are emitted, the above-described fluorescent substance emits light in compliance with amount of emitted electron beams, it is possible to obtain the luminance in compliance with the time for emission.

(With Regard to the Voltage Drop in the Scanning Wiring)

As described above, a basic problem to be solved is that, in particular, due to the voltage drop in the scanning wiring, the electric potential on the scanning wiring is increased, and thereby, the voltage to be applied to the surface conduction electron-emitting device is reduced, and the emission current from the surface conduction electron-emitting device is reduced.

A device current for 1 device of the surface conduction electron-emitting device, although it differs also by design specifications and manufacturing methods of the surface conduction electron-emitting devices, is around several 100 μA in case that the voltage $V_{SEL}$ was applied thereto.

In case that only 1 pixel on the scanning wiring selected in a certain horizontal scanning period is made to emit light and other pixels than it are made not to emit light, the device current flowing into the selected scanning wiring from the modulation wiring is simply a current for 1 pixel (i.e., the above-described several 100 μA). In this case, there is almost no case that the voltage drop occurs and light emission luminance is going down.

However, in case that, in a certain horizontal scanning period, all pixels in a selected row are made to emit light, currents for all pixels are to flow into the selected scanning wiring from all modulation wirings. The summation of these currnts become several 100 mA to several A, and it becomes difficult to neglect the voltage drop on the scanning wiring caused by the wiring resistance of the scanning wiring.

In case that the voltage drop occurs on the scanning wiring, the drive voltage applied to the both ends of the surface conduction electron-emitting device drops. On this account, the emission current for emitting light from the surface conduction electron-emitting device is going down and as a result, the light emission luminance was reduced.

Figure 6A:
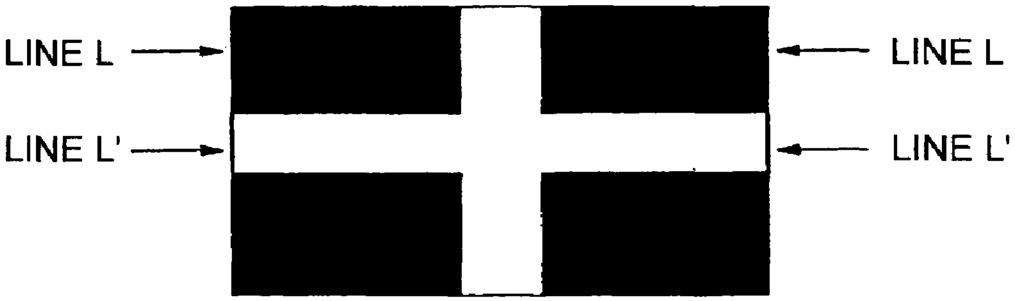
FIG. 6 is a diagram for explaining an influence of voltage drop.

Specifically, a case in which a pattern with a white cross shape on a black background is displayed as a display image as shown in FIG. 6A will be considered.

In such a case, when a line "L" is driven, the number of pixels which are lit up is small. Therefore, hardly any voltage drop occurs in the scanning wiring on this line. As a result, the desired amount of emission current is emitted from the surface conduction electron-emitting devices at each pixel, and the illumination at the desired luminance can be achieved.

On the other hand, when a line "L'" in the same diagram is driven, all the pixels light up simultaneously. Therefore, the voltage drop does occur in the scanning wiring, and the emission current emitted from the surface conduction electron-emitting devices of each pixel decreases. As a result, the luminance at line L' decreases.

Figure 6B:
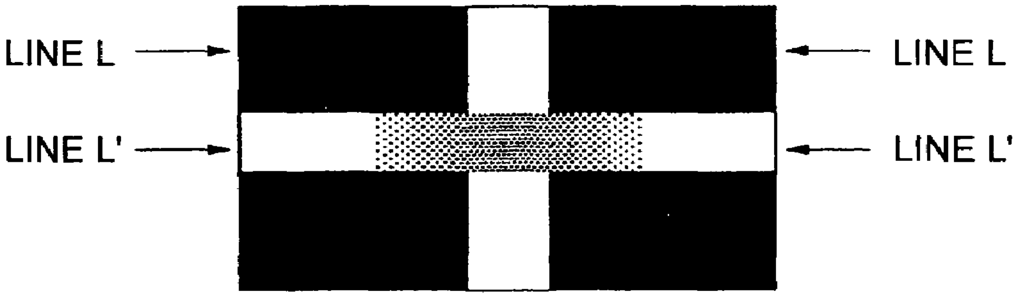

Thus, depending on differences in the image data at each of the horizontal lines, the influence suffered due to the voltage drop would change, and therefore, when displaying a cross pattern as shown in FIG. 6A, an image as in FIG. 6B would be shown.

Note that this phenomenon is not limited to cross patterns, but also occurs in some cases when displaying, for example, a window pattern or a natural image.

Further, to complicate things further, when modulation is performed by means of the pulse width modulation, there are instances where the degree of the voltage drop changes during one horizontal scanning period.

FIG. 5 shows pulse-width modulation signals having pulse widths corresponding to the value of the inputted image data, and having their rising edges synchronized with each other. In a case where such pulse-width modulation signals are outputted to each column, differences will occur depending on the inputted image data, but, generally speaking, in one horizontal scanning period, the number of illuminated pixels is greatest immediately after the rising of the pulse. After the rising edge, the pixels go out in sequence starting with the least bright pixels. Accordingly, the number of illuminated pixels during one horizontal scanning period decreases as time passes. Therefore, the amount of the voltage drop occurring in the scanning wiring also has a tendency to be greatest at the start of one horizontal scanning period, and then gradually diminish. The output of the pulse-width modulation signals changes with each unit of time that corresponds to a single gradation in the modulation. Therefore, the chronological change in the voltage drops also occurs with each unit of time corresponding to a single gradation of the pulse width modulation signal.

(Method of Calculating the Voltage Drop)

In order to find the compensation amount for reducing the influence of the voltage drop, firstly, as its first stage, there may be hardware for predicting size of the voltage drop and its temporal change in real time.

However, it is general that the display panel of the display apparatus has several thousand modulation wirings, and it is very difficult to calculate the voltage drops at points where all of the modulation wirings intersect with the selected scanning wiring, and it is not realistic to manufacture hardware to calculate these in real time.

On the other hand, as a result for the inventors to study the voltage drop, it turned out that there are the following features.

i) At a certain point of time in 1 horizontal scanning period, the amount of voltage drop occurring on the scanning wiring is a specially continuous on the scanning wiring and a very smooth curve.

ii) The amount of the voltage drop differs also depending upon the display image, and also varies with respect to each time corresponding to 1 gradation of the pulse-width modulation, but overall, the amount of the voltage drop is larger near the raising edge of the pulse, and getting smaller or maintained as time passes. That is, there is no case that the size of the voltage drop increases during 1 horizontal scanning period when the drive method as shown in FIG. 5 is used.

Then, the calculation will be carried out in simplified manner by use of an approximate model as described below.

Firstly, in the light of the feature i), on the occasion of calculating the amount of the voltage drop at a certain point of time, the calculation is carried out in a approximate simplified manner by use of a degeneracy model in which several thousand modulation wirings are concentrated into several to several tens of wirings to carry out calculation (This will be described in detail in the following calculation of the voltage drop by use of the degeneracy model.).

Next, in light of the characteristic described at "ii)", a plurality of different points of time are established within one horizontal scanning period, and the voltage drops at each of these times are calculated, whereby an overall prediction of the chronological changes in the voltage drop is made.

Specifically, by using a degeneracy model described below to calculate the voltage drops at a plurality of points of time, an overall prediction of the chronological change of the voltage drop is made.

(Calculation of the Voltage Drop Using the Degeneracy Model)

Figure 7A:
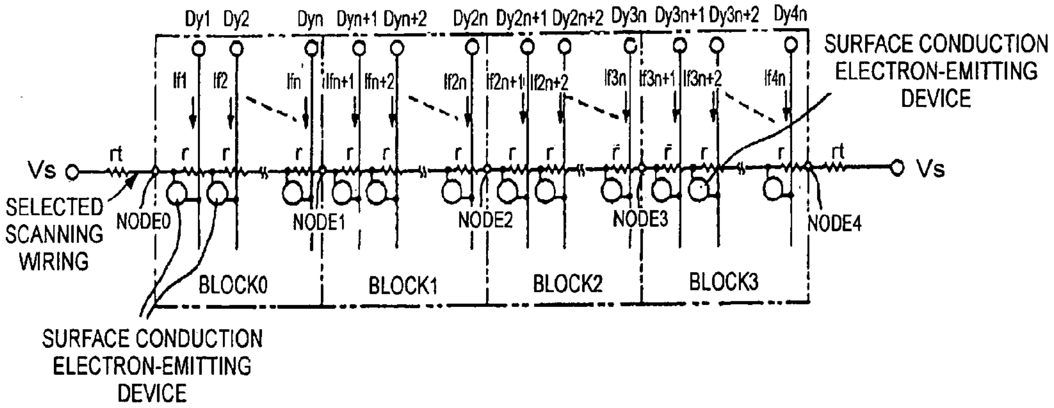
FIG. 7 is a diagram for explaining a degeneracy model.
Figure 7B:
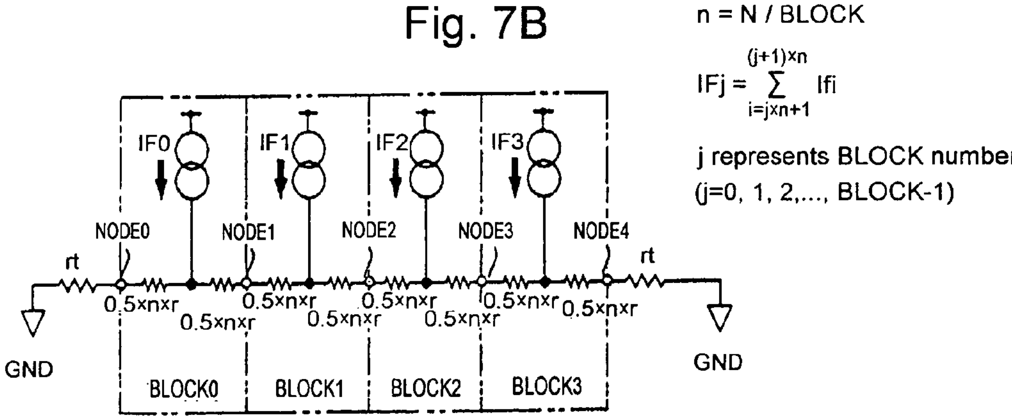
Figure 7C:
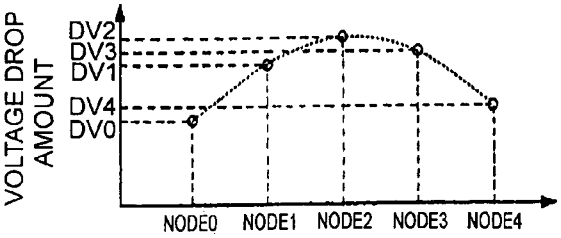

FIG. 7A is a diagram for explaining blocks and nodes used when performing degeneration. In order to abbreviate the diagram, only the selected scanning wiring, the modulation wirings and the surface conduction electron-emitting devices connected to their intersecting portions are shown in FIGS. 7A to 7C.

Now, the diagram shows a point of time during one horizontal scanning period, and it is assumed that the illumination state of each pixel on the selected scanning wiring (i.e., whether the output from the modulation means is "H" or "L") has already been determined. In the illumination state, the device current flowing from each of the modulation wirings to the selected scanning wiring is defined as Ifi (where i=1, 2, . . . N, and i denotes a column number).

Further, as shown in the same diagram, n modulation wirings, a portion where the selected scanning wiring intersects with the n modulation wirings and the surface conduction electron-emitting device arranged at the intersection, are assumed to constitute one group that is defined as 1 block. In accordance with the present embodiment, the blocks are divided into 4 blocks.

Further, a position referred to as a "node" is established at the boundary positions of each block. The "node" refers to a horizontal position (reference point) for discretely calculating the amount of the voltage drop that will occur in the scanning wiring in the degeneracy model.

In accordance with the present embodiment, 5 nodes from a node 0 to a node 4 are established at the boundary positions of the blocks.

FIG. 7B is a diagram for explaining the degeneracy model.

In the degeneracy model, n modulation wirings included in 1 block in FIG. 7A are degenerated to 1 modulation wiring and this single degenerated modulation wiring is connected such that it is located in the center of the block on the scanning wiring.

Further, electric current sources are connected to the modulation wirings of each of the blocks which have been degenerated, and it is assumed that electric current total sums IF0 to IF3 in each of the blocks are flowing from the power sources.

Namely, Ifj (j=0, 1, 2, 3) is the electric current expressed as:

$$IFj = \sum_{i=j\times n+1}^{(j+1)\times n} IFi \qquad \text{(Equation 1)}$$

Further the potential at both ends of the scanning wiring is Vs in FIG. 7A, but it is the ground potential in FIG. 7B. It is because, according to the degeneracy model, the electric current flowing from the modulation wiring to the selected scanning wiring is modeled according to the above-mentioned electric current source, whereby the voltage drop amount at each portion on the scanning wiring can be calculated by treating the electricity supply portion as a reference (ground) potential to calculate the voltages at each part.

Further, the reason why the surface conduction electron-emitting device is abbreviated is because from the perspective of the selected scanning wiring if an equivalent electric current flows in from the column wirings, the generated voltage drop itself will not change at all due to whether or not the surface conduction electron-emitting devices are provided. Therefore, the electric current value that flows in from electric current source of each block is set to the total electric current value (Equation 1) of the device currents in each block, whereby the surface conduction electron-emitting device can be abbreviated.

Further, the wiring resistance in the scanning wirings in each block is n-times the wiring resistance r of the scanning wiring in one section. (Here, a "section" refers an area from the intersection between the scanning wiring and a certain column wiring to the intersection with the next column wiring. Also, in the present example, the wiring resistances of the scanning wirings in one section are assumed to be equal to each other.)

In the above-mentioned degeneracy model, the voltage drop amounts DV0 to DV4 occurring at each node on the scanning wiring can be calculated in a simple fashion by using the following equation with product sum format:

$$DV0 = a00 \times IF0 + a01 \times IF1 + a02 \times IF2 + a03 \times IF3$$

$$DV1 = a10 \times IF0 + a11 \times IF1 + a12 \times IF2 + a13 \times IF3$$

$$DV2 = a20 \times IF0 + a21 \times IF1 + a22 \times IF2 + a23 \times IF3$$

$$DV3 = a30 \times IF0 + a31 \times IF1 + a32 \times IF2 + a33 \times IF3$$

$$DV4 = a40 \times IF0 + a41 \times IF1 + a42 \times IF2 + a43 \times IF3$$

In other words, the voltage drop amounts DVi (i=0, 1, 2, 3, 4) are expressed as:

$$DVi = \sum_{j=0}^{3} aij \times IFj \quad (i = 0, 1, 2, 3, 4) \qquad \text{(Equation 2)}$$

However, in the degeneracy model, the "aij" refers to the voltage generated at the i-th node when the unit potential is applied only to j-th block. (Hereinafter, the foregoing will serve as the definition of "aij".)

The above-mentioned aij can be derived in a simple fashion according to Kirchhoff's Law as follows.

Namely, in FIG. 7B, if the wiring resistance up to the supply terminal on the left side of the scanning wiring as viewed from the electric current source in block i is defined as rli (i=0, 1, 2, 3), and the wiring resistance up to the supply terminal on the right side is rri (i=0, 1, 2, 3), and the wiring resistance between the block 0 and the left supply terminal and the wiring resistance between the block 4 and the right supply terminal are both defined as rt, then the following is established:

$$rl0 = rt + 0.5 \times n \times r$$

$$rr0 = rt + 3.5 \times n \times r$$

$$rl1 = rt + 1.5 \times n \times r$$

$$rr1 = rt + 2.5 \times n \times r$$

$$rl2 = rt + 2.5 \times n \times r$$

$$rr2 = rt + 1.5 \times n \times r$$

$$rl3 = rt + 3.5 \times n \times r$$

$$rr3 = rt + 0.5 \times n \times r$$

Further, the following is supposedly set:

$$a = rl0 // rr0 = rl0 \times rr0 / (rl0 \times rr0)$$

$$b = rl1 // rr1 = rl1 \times rr1 / (rl1 \times rr1)$$

$$c = rl2 // rr2 = rl2 \times rr2 / (rl2 \times rr2)$$

$$d = rl3 // rr3 = rl3 \times rr3 / (rl3 \times rr3)$$

Therefore, aij can be derived in a simple fashion as in (Equation 3). However, in (Equation 3), A//B is a symbol expressing a resistance value parallel to resistance A and resistance B, where A//B=A×B/(A+B).

$$a00 = a \times rt / rl0$$

$$a10 = a \times (rt + 3 \times n \times r) / rr0$$

$$a20 = a \times (rt + 2 \times n \times r) / rr0$$

$$a30 = a \times (rt + 1 \times n \times r) / rr0$$

$$a40 = a \times rt / rr0$$

$$a01 = b \times rt / rl1$$

$$a11 = b \times (rt + n \times r) / rl1$$

$$a21 = b \times (rt + 2 \times n \times r) / rr1$$

$$a31 = b \times (rt + n \times r) / rr1$$

$$a41 = b \times rt / rr1$$

$$a02 = c \times rt / rl2$$

$$a12 = c \times (rt + n \times r) / rl2$$

$$a22 = c \times (rt + 2 \times n \times r) / rl2$$

$$a32 = c \times (rt + n \times r) / rr2$$

$$a42 = c \times rt / rr2$$

$$a03 = d \times rt / rl3$$

$$a13 = d \times (rt + n \times r) / rl3$$

$$a23 = d \times (rt + 2 \times n \times r) / rl3$$

$$a33 = d \times (rt + 3 \times n \times r) / rl3$$

$$a43 = d \times rt / rr3 \qquad \text{(Equation 3)}$$

Even if the number of blocks is not 4, the definition of aij enables the calculation by using (Equation 2) in a simple fashion using Kirchhoff's Law. Further, even in a case where the electricity supply terminals are not supplied to both sides of the scanning wiring as in the present embodiment, but are supplied to only one side thereof, the computation can be performed in a simple fashion by performing the calculation in accordance with the aij definition.

Note that, the parameter aij defined in (Equation 3) does not need to be recalculated each time the calculation is performed. Rather, it may be calculated once and then stored as a table.

Further, the total sum electric currents IF0 to IF3 for each block as determined with (Equation 1) are approximated as follows:

$$IFj = \sum_{i=j\times n+1}^{(j+1)\times n} IFi = IFS \times \sum_{i=j\times n+1}^{(j+1)\times n} Counti \qquad \text{(Equation 4)}$$

However, in (Equation 4), Counti is a variable that will take a value of "1" when the "i"-th pixel on the selected scanning wiring is in the illuminated state, and will take a value of "0" when the pixel is in the turned-off state.

IFS denotes an amount produced when the device current IF flowing when the voltage $V_{SEL}$ is applied to both ends of one device of the surface conduction electron-emitting devices is multiplied by a coefficient a taking a value between 0 and 1. In other words, it is defined as follows:

$$IFS = \alpha IF \qquad \text{(Equation 5)}$$

According to (Equation 4), the device current proportionate to the number of pixels illuminated within a given block flows from column wirings of each block to the selected scanning wiring. Device current IF of one device which is multiplied by the coefficient α is set as the device current IFS of one device considering that the voltage in the scanning wiring increases due the voltage drop, thus reducing the amount of the device current.

In addition, if the drive voltage to be applied to the both ends of the surface conduction electron-emitting device is assumed to be $V_{DRV}$, in case that the drive voltage $V_{DRV}$ varies, a value of the device current IF used in (Equation 5) may be renewed in accordance with the value of the voltage $V_{DRV}$ to carry out the calculation.

FIG. 7C shows one example of calculation results of the voltage drop amounts DV0 to DV4 at respective nodes in a certain illuminated state by use of the degeneracy model.

Since the voltage drop exhibits an extremely smooth curve, the voltage drops between nodes are presumed to take values indicated approximately by a dotted line in the diagram.

Thus, when the present degeneracy model is used, it is possible to calculate the voltage drop with respect to the inputted image data at the position of the node at desired points of time.

As described above, the voltage drop amount in a given illuminated state can be calculated in a simple fashion by using the degeneracy model.

Further the voltage drop that will occur on the selected scanning wiring changes chronologically within one horizontal scanning period. However, as described above, these changes are predicted by obtaining the illuminated states of several points of time within one horizontal scanning period, and using the degeneracy model to calculate the voltage drops exhibited in those illuminated states. Note that, the number of illuminations within each block at a given point of time within one horizontal scanning period can be obtained in a simple fashion by referencing the image data at each block.

Now, as an example, it will be assumed that the number of bits of the data inputted into the pulse width modulation circuit is 8 bits, and the pulse width modulation circuit outputs a linear pulse width with respect to the value of the input data. In other words, the input data value is 0, the output is "L"; when the input data value is 255, "H" is outputted during one horizontal scanning period; and when the input data is 128, "H" is outputted for the first half of one horizontal scanning period, and "L" is outputted for the last half thereof.

In a case as described above, the number of illuminations at the time when the pulse-width modulation signal is started (i.e., at the time of the rising edge in the modulation signal of the present example) can easily be detected by performing counting on the input data to the pulse-width modulation circuit are greater than 0. Similarly, the number of illuminations at the central point of time in one horizontal scanning period can be detected easily by counting the number of input data to the pulse width modulation circuit that are greater than 128. By comparing the image data with respect to a given threshold as described above, the number of illuminations in an arbitrary period of time can be counted easily by counting the number of outputs from the comparator that are positive.

Here, in order to simplify the following explanation, an amount of time referred to as a time slot will be defined.

Namely, a time slot is defined as an amount of time since a rising edge of the pulse-width modulation signal within one horizontal scanning period, and "time slot=0" indicates a point of time immediately following the start of the pulse-width modulation signal. "Time slot=64" is defined as indicating a point of time where time corresponding to 64 gradations has elapsed since the start of the pulse-width modulation signal. Similarly, "time slot=128" is defined as indicating a point of time where time corresponding to 128 gradations has elapsed since the start of the pulse-width modulation signal.

Note that, in accordance with the present embodiment, an example was given in which the pulse width modulation uses the rising-edge time as a reference, and the pulse width after that point of time is modulated. However, in a case where the falling-edge time of pulse is used as the reference to modulate the pulse width, the direction in which the time axis moves and the direction in which the time slot progresses will be opposite directions, but it goes without saying that the present invention may be applied nevertheless.

(Calculation of Compensation Data Based on the Voltage Drop Amount)

As described above, the degeneracy model is used to repeatedly perform calculations to approximately and discretely calculate the chronological changes exhibited by the voltage drops within one horizontal scanning period.

Figure 8:
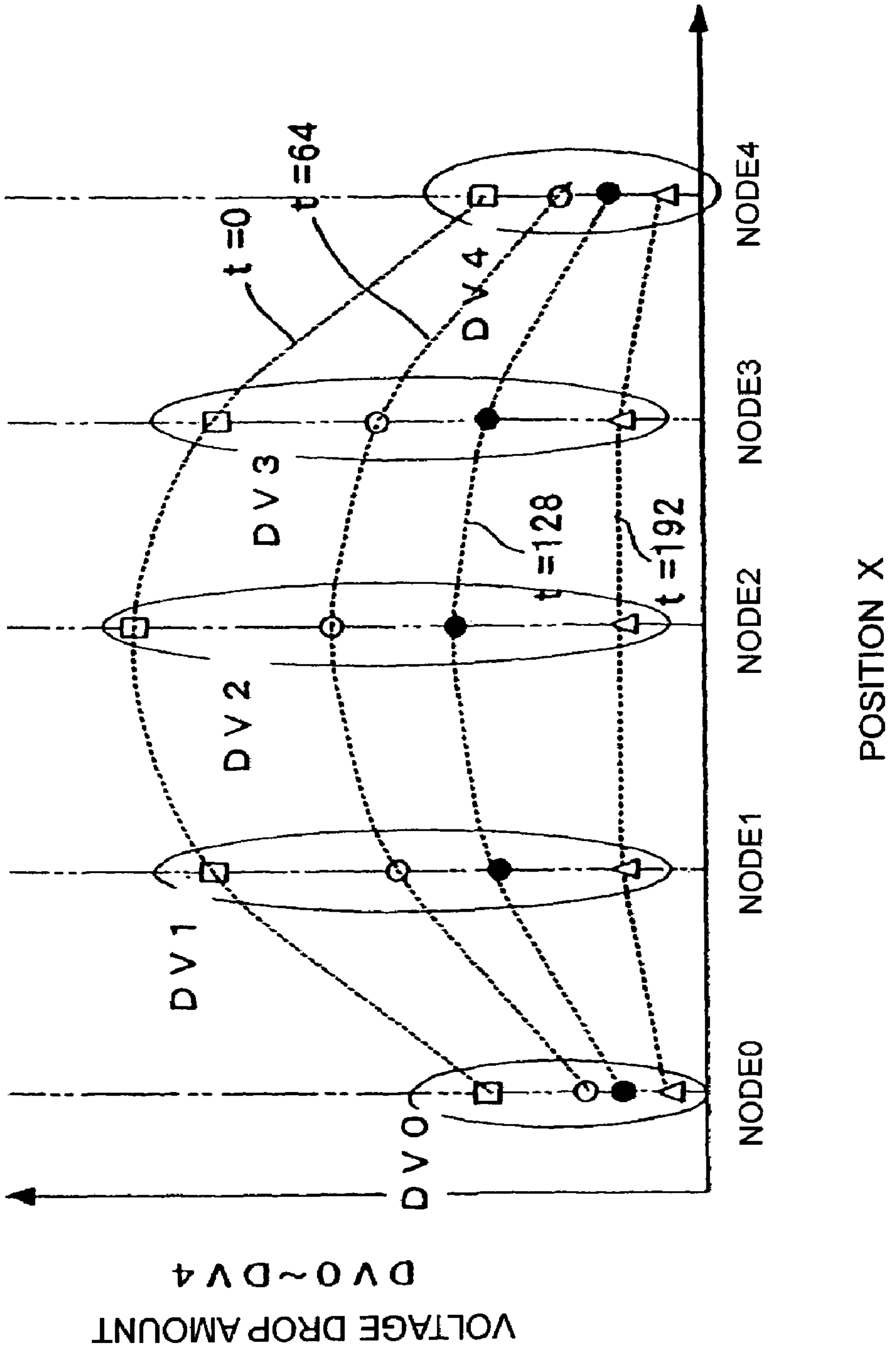
FIG. 8 is a graph showing voltage drop amount calculated in a discrete manner.

FIG. 8 illustrates an example in which the voltage drops are repeatedly calculated with respect to given image data to calculate the chronological changes of the voltage drops in the scanning wiring. The voltage drops and their chronological changes shown here are one example given with respect to given image data, and it is natural that the voltage drops with respect to different image data will exhibit different changes.

In FIG. 8, the degeneracy model is applied for calculation with respect to 4 points of time at which time slot is 0, 64, 128 and 192, respectively, and the voltage drop at each of those times is discretely calculated.

In accordance with FIG. 8, the voltage drop amounts at each node are connected by a dotted line. However, the dotted line is drawn only to make the diagram easier to look at. The voltage drops calculated using the present degeneracy model are each calculated discretely at each of the node positions which are indicated by the white squares, the white circles, the black circles and the white triangles.

Figure 9:
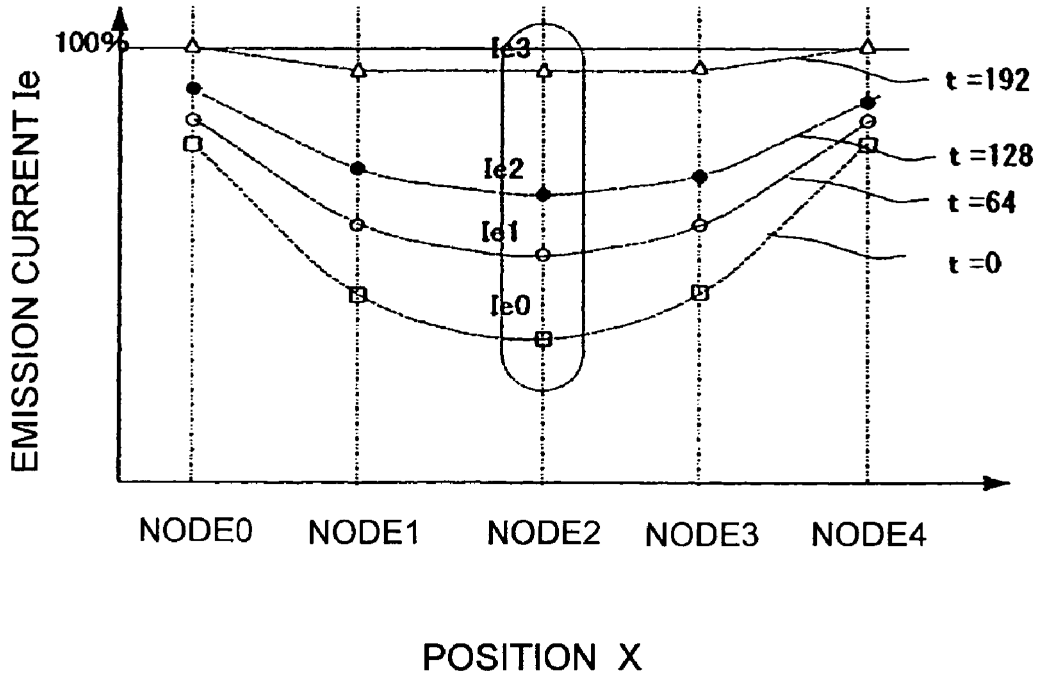
FIG. 9 is a graph showing change amount of emission current calculated in a discrete manner.

FIG. 9 is a graph estimating the emission current that is emitted from a given surface conduction electron-emitting device in the illuminated state when the voltage drop shown in FIG. 8 occurs in the selected scanning wiring.

The vertical axis indicates the emission current amount as percentages at each time and at each location where the degree of the emission current that is emitted when there is not voltage drop is 100%. The horizontal axis indicates the horizontal positions.

As shown in FIG. 9, at the horizontal position (the reference point) at node 2, the following is established: the emission current when time slot=0 is Ie0; the emission current when time slot=64 is Ie1; the emission current when time slot=128 is Ie2; and the emission current when time slot=192 is Ie3.

Note that, the emission current Ie shown in FIG. 9 is calculated from the graphs showing the voltage drop amounts in FIG. 8 and the "drive voltage/emission current" shown in FIG. 4. Specifically, the value of the emission current produced when the voltage calculated by subtracting the voltage drop amount from the voltage $V_{DRV}$ is applied, is simply plotted out mechanically.

Therefore, FIG. 8 primarily indicates the electric current that is emitted from the surface conduction electron-emitting device when it is in the illuminated state. The surface conduction electron-emitting devices in the turned-off state do not emit electric currents.

Figures 10A, 10B, 10C:
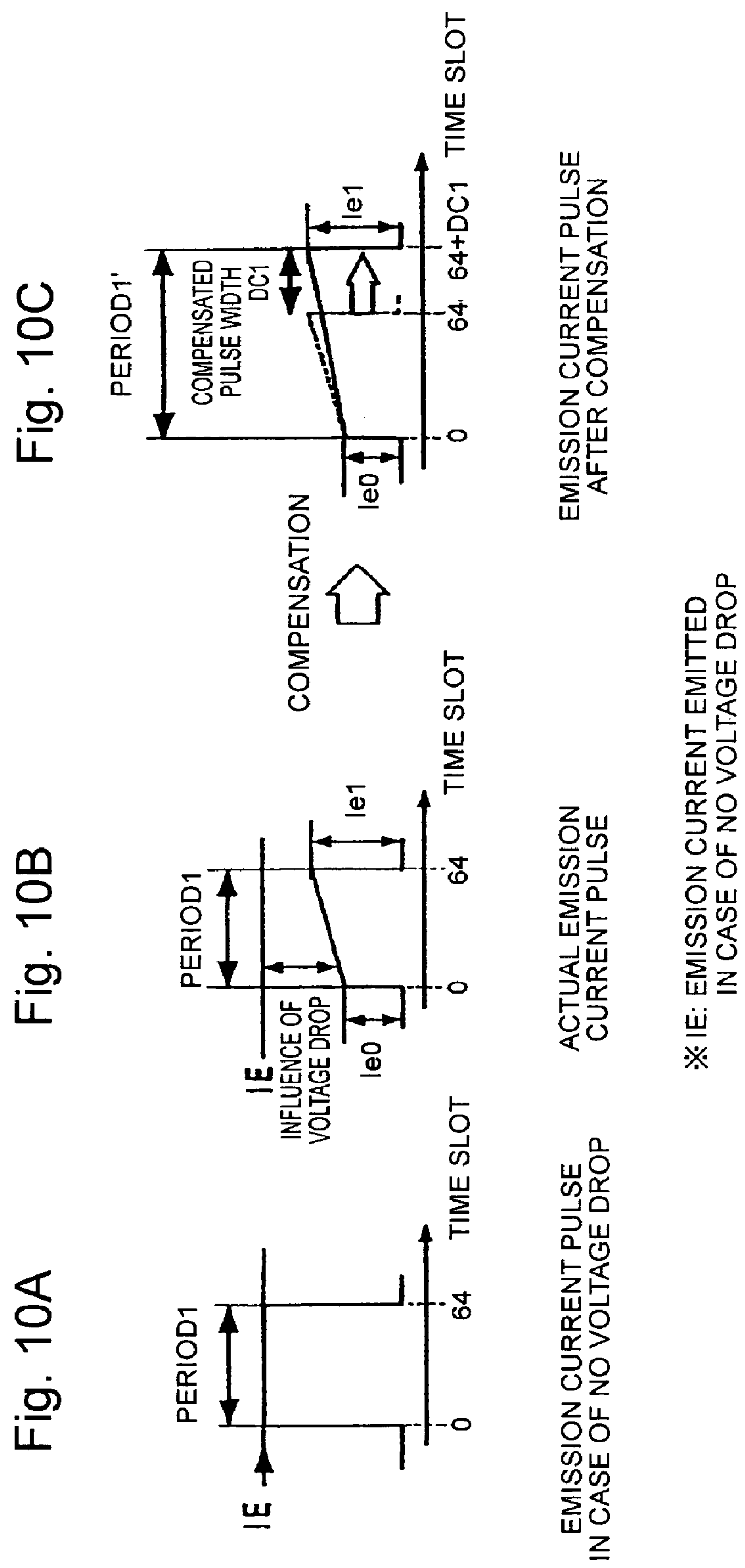
FIG. 10 is a diagram showing a calculation example of compensation data in case of a value of image data is 64.

FIGS. 10A, 10B and 10C are diagrams for explaining a method for calculating the voltage drop amount compensation data based on the changes with a time in the emission current. These diagrams illustrate an example of calculating compensation data for compensating an image data having an inputted data size of 64.

The luminous amount of the luminance is equal to the emission charge amount in which the emission current from the emission current pulse is integrated with a time. Therefore, when fluctuation in the luminance caused by the voltage drop is considered hereinafter, explanations will be made based on the emission charge amount.

Now, in the case where there is no influence from the voltage drop, the emission current is "IE". Further, if the amount of time corresponding to 1 gradation in the pulse width modulation is assumed to be Δt, then the emission charge amount Q0 which should be emitted by the emission current pulse when the image data value is 64 is expressed as follows. The emission current pulse's amplitude IE times the pulse width (i.e., 64×Δt), which can be expressed as:

$$Q0=IE\times 64\times \Delta t \quad \text{(Equation 6)}$$

However, in actuality, the voltage drop in the scanning wiring causes the electric current amount that is emitted from the device to drop.

In the following way, the amount of the emission charge amount produced by the emission current pulse can be approximately calculated in a way which takes the influence of the voltage drop into consideration: i.e., the emission currents of the time slots 0 and 64 at node 2 are established as Ie0 and Ie1, respectively, and if the emission current from 0 to 64 is approximated as a value changing in a linear fashion between Ie0 and Ie1, then the emission charge amount Q1 during this period will exhibit a trapezoidal area shown in FIG. 10B. In other words, the foregoing can be calculated as:

$$Q1=(Ie0+Ie1)\times 64\times \Delta t\times 0.5 \quad \text{(Equation 7)}$$

Next, as shown in FIG. 10C, in order to compensate the amount of the emission current that is caused by the voltage drop, the influence from the voltage drop can be removed by extending the pulse width by an amount equal to DC1. Further, in the case where the compensation for the voltage drop is made and the pulse width is extended, it is considered that the emission current amounts at each of the time slots will change. However, here, for the sake of simplicity, as shown in FIG. 10C, when the time slot=0, the emission current is Ie0, and when the time slot=(64+DC1), the emission current is Ie1. Further, the emission current between the time slot 0 and the time slot (64+DC1) is approximated as a value along a straight line connecting the emission currents at these 2 points.

Therefore, the emission charge amount Q2 produced by the emission current pulse after the compensation can be calculated as:

$$Q2=(Ie0+Ie1)\times(64+DC1)\times \Delta t\times 0.5 \quad \text{(Equation 8)}$$

If this is equal to the above-mentioned Q0, then $$IE\times 64\times \Delta t=(Ie0+Ie1)\times(64+DC1)\times \Delta t\times 0.5$$

When this is calculated with respect to DC1, $$DC1=((2\times IE-Ie0-Ie1)/(Ie0+Ie1))\times 64 \quad \text{(Equation 9)}$$

Thus, the compensation data when the size of the image data is 64 is calculated as described above.

In other words, in the case of the image data with the value of 64 at the node 2 position, the compensation amount CData may be added until DC1 as described in the (Equation 9).

Figure 11A:
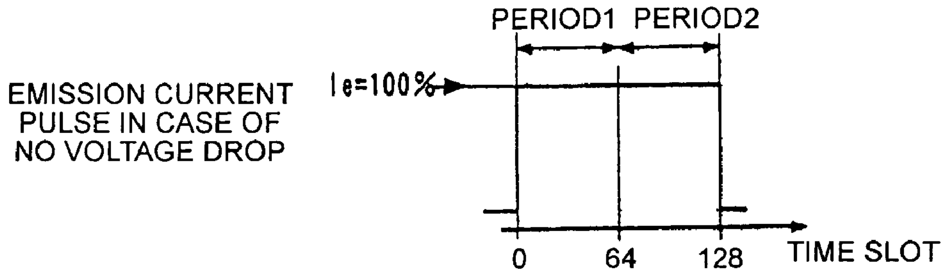
FIG. 11 is a diagram showing a calculation example of compensation data in case of a value of image data is 128.
Figure 11B:
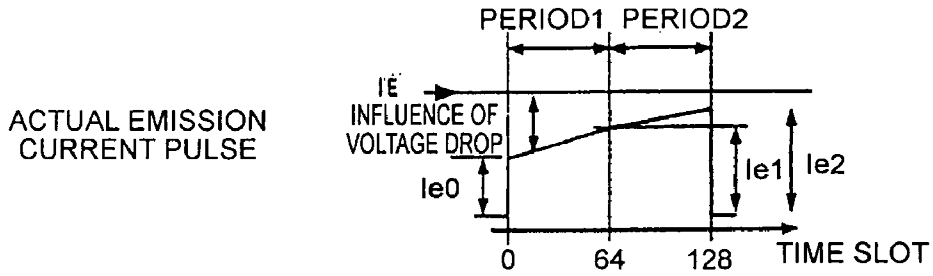
Figure 11C:
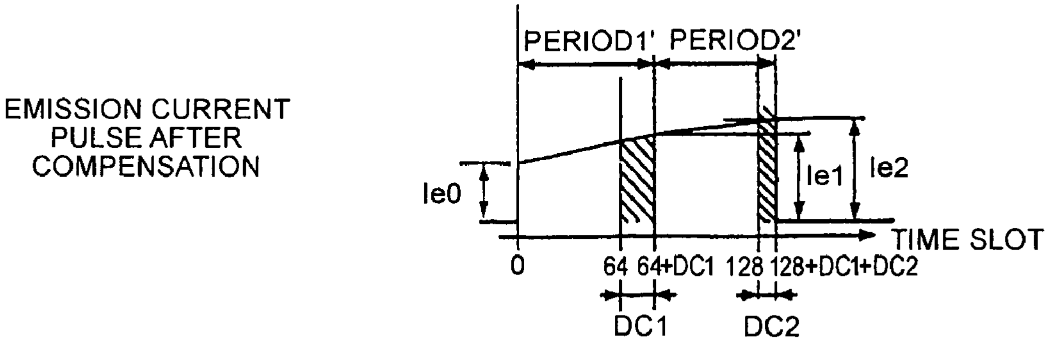

FIGS. 11A to 11C are examples of calculation of the compensation data for image data having a value of 128, based on the calculated voltage drop amount.

In the case where there is no influence from the voltage drop, the emission charge amount Q3 that should be produced by the emission current pulse when the image data value is 128 is:

$$Q3=IE\times 128\times \Delta t=2\times Q0 \quad \text{(Equation 10)}$$

On the other hand, the emission charge amount produced by the actual emission current pulse having been influenced by the voltage drop can be approximately calculated in the following way. Namely, the emission current amounts at the time slots 0, 64 and 128 at node 2 are set to be Ie0, Ie1 and Ie2, respectively. Further, the emission current during the period from time slot 0 to 64 alters a value on a straight line connecting Ie0 and Ie1, and if the emission current during the period from time slot 64 to 128 is approximated as its value changing along the straight line between Ie1 and Ie2, then the emission charge amount Q4 between the time slot 1 to 128 will be the sum of the two trapezoidal areas in FIG. 11B. That is, it can be calculated as:

$$Q4=(Ie0+Ie1)\times 64\times \Delta t\times 0.5+(Ie1+Ie2)\times 64\times \Delta t\times 0.5 \quad \text{(Equation 11)}$$

On the other hand, the voltage drop compensation amount was calculated as follows. The interval corresponding to the time slots 0 to 64 is defined as an interval 1, and the interval corresponding to the time slots 64 to 128 is defined as an interval 2. When the compensation has been carried out, the interval 1 portion is extended by an amount equivalent to DC1, thus being extended to an interval 1', and the interval 2 part is extended by an amount equivalent to DC2, thus being extended to an interval 2'. At this time, by compensating each of the intervals, the emission charge amount becomes the same as Q0 described above.

Further, it goes without saying that the emission currents at the beginning and end of each interval are altered by performing the compensation. However, in order to simplify the calculations, it is assumed that these emission currents do not change. In other words, the emission current at the beginning of the interval 1' is Ie0, and the emission current at the end of the interval 1' is Ie1. The emission current at the beginning of the interval 2' is Ie1, and the emission current at the end of the interval 2' is Ie2.

As such, DC1 can be calculated in a fashion similar to (Equation 9).

DC2 can also be calculated based on a similar approach:

$$DC2=((2\times IE\times Ie1-Ie2)/(Ie1+Ie2))\times 64 \quad \text{(Equation 12)}$$

As a result, for the image data having the size of 128 at the node 2 position, it is sufficient to add the compensation amount CData that is equivalent to:

$$CData=DC1+DC2 \quad \text{(Equation 13)}$$

Figure 12A:
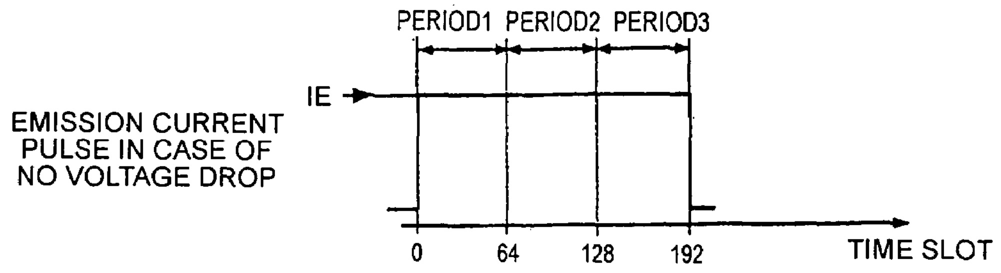
FIG. 12 is a diagram showing a calculation example of compensation data in case of a value of image data is 192.
Figure 12B:
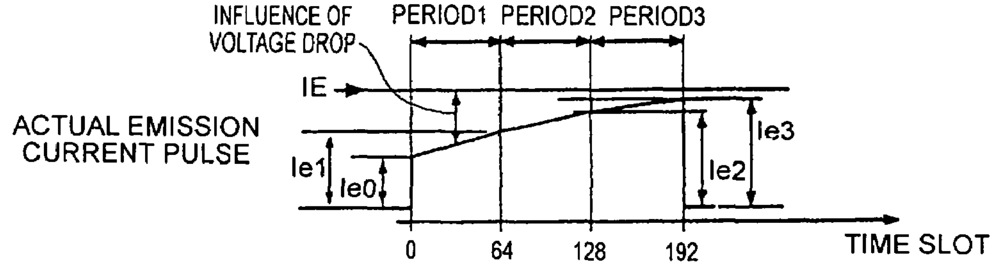
Figure 12C:
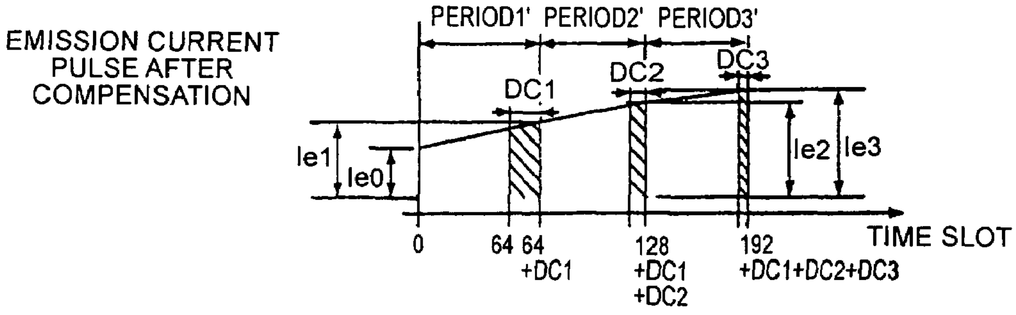

FIGS. 12A to 12C are examples of calculating compensation data for image data having a value of 192, based on the calculated voltage drop amount.

Now, the emission charge amount Q5 that will be produced by an emission current pulse anticipated when the image data value is 192 is:

$$Q5=IE\times192\times\Delta t=3\times QO$$

On the other hand, the emission charge amount produced by the actual emission current pulse having received the influence by the voltage drop can be approximately calculated as follows. Namely, during the time slots 0, 64, 128 and 192 for node 2, the emission current amounts at each of these time slots is Ie0, Ie1, Ie2 and Ie3, respectively. Further, if the emission current during the period from the time slot 0 to 64 is approximated as its value changing along a straight line connecting Ie0 and Ie1, and if the emission current during the period from the time slot 64 to 128 is approximated as its value changing along a straight line connecting Ie1 and Ie2, and if the emission current during the period from the time slot 128 to 192 is approximated as its value changing along a straight line connecting Ie2 and Ie3, then an emission charge amount Q6 during a period from the time slot 0 to 192 will be as represented by the 3 trapezoidal areas in FIG. 12C. In other words, the emission charge amount Q6 can be calculated as:

$$\begin{aligned} Q6 = {} & (Ie0 + Ie1)\times 64\times\Delta t\times 0.5 + \\ & (Ie1 + Ie2)\times 64\times\Delta t\times 0.5 + \\ & (Ie2 + Ie3)\times 64\times\Delta t\times 0.5 \end{aligned} \quad \text{(Equation 14)}$$

The interval corresponding to the time slot 0 to 64 is defined as an interval 1, the interval corresponding to the time slot 64 to 128 is defined as an interval 2, and the interval corresponding to the time slot 128 to 192 is defined as an interval 3. In the same manner as is described above, after the compensation has been carried out, the interval 1 part is extended by an amount equivalent to DC1, thus being extended to an interval 1', the interval 2 part is extended by an amount equivalent to DC2, thus being extended to an interval 2', and the interval 3 part is extended by an amount equivalent to DC3, thus being extended to an interval 3'. At this time, by compensating each of the intervals, the emission current amount becomes the same as Q0 described above.

Further, it has been temporarily assumed that the emission currents at the beginning and the end of each interval remain unchanged before and after the compensation. That is, the emission current at the beginning of the interval 1' is Ie0, and the emission current at the end of the interval 1' is Ie1. The emission current at the beginning of the interval 2' is Ie1, and the emission current at the end of the interval 2' is Ie2. The emission current at the beginning of the interval 3' is Ie2, and the emission current at the end of the interval 3' is Ie3.

Therefore, DC1 and DC2 can each be calculated in the same ways as shown in (Equation 9) and (Equation 12).

Further, DC3 can be calculated as:

$$DC3=((2\times IE-Ie2-Ie3)/(Ie2+Ie3))\times64 \quad \text{(Equation 15)}$$

As a result, the compensation data CData to be added to the image data having the value of 192 at the node 2 position can be calculated as:

$$CData=DC1+DC2+DC3 \quad \text{(Equation 16)}$$

The foregoing explains the calculation of the compensation data CData for the image data having the sizes of 64, 128 and 192 with respect to the node 2 position.

Further, when the pulse width is 0, it is obvious that the voltage drop has no influence on the emission current. Therefore, the compensation data is 0, and the compensation data CData to be added to the image data is also 0.

Note that, the reason why the compensation data is calculated in this scattered fashion for image data 0, 64, 128 and 192 is to reduce the volume of the calculations. In other words, if the same calculation were to be performed on all the image data, the volume of the calculations would become extremely large, and the amount of hardware for performing the calculations would become extremely great. On the other hand, there is a tendency that the greater the image data at a given node position, the greater the compensation data will be. Therefore, when the compensation data for an arbitrary image data is to be calculated, the calculation volume can be significantly decreased by using a linear approximation to interpolate between points in the vicinity of the image data for which the compensation data has already been calculated. Note that the interpolation will be explained in detail when discrete compensated data interpolating means is explained.

Further, if the same approach is applied to all the node positions, the compensation data for the 0, 64, 128 and 192 image data at all the node positions can be calculated.

In this embodiment, by applying the degeneracy model to 4 points of the time slots 0, 64, 128, and 192, the voltage drop amounts at respective times were calculated, and thereby, it became possible to calculate the compensation data corresponding to 4 image data reference values of 0, 64, 128, and 192.

However, optimally, by making a time interval for calculating the voltage drop in fines by use of the degeneracy model and increasing the number of the reference values of the image data, it is possible to treat the temporal variation of the voltage drop more precisely and to reduce errors of the approximate calculation.

For example, in this embodiment, the calculation was carried out at only the 4 points of the time slots 0, 64, 128, and 192, but in case that the calculation was carried out at intervals of 16 time slots among the time slots 0 to 255 (i.e., the reference values of the image data are set every 16 in the value of the image data), more preferable result was obtained.

In addition, on that occasion, based upon similar way of thinking, (Equation 6) to (Equation 16) may be modified to carry out the calculation.

Figure 13B:
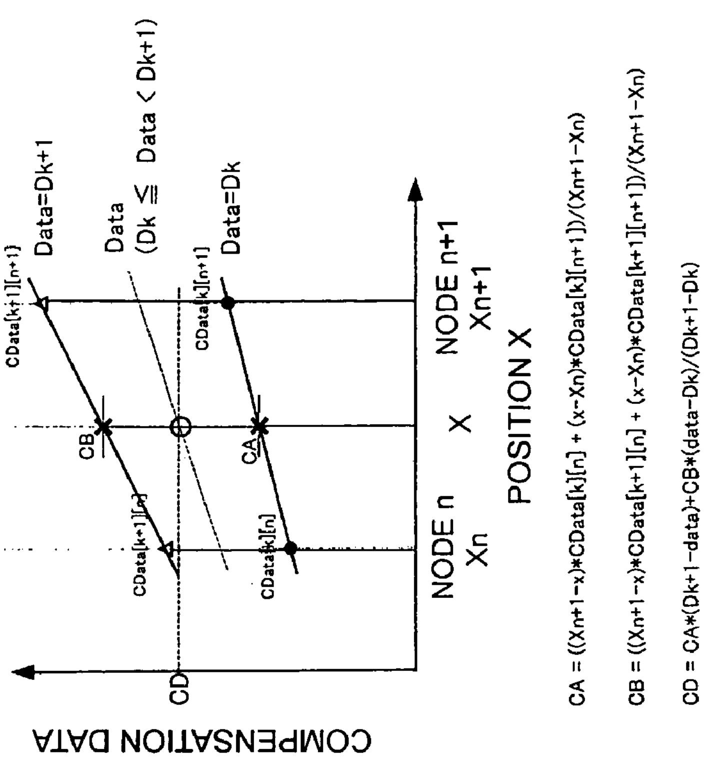
FIG. 13 is a diagram for explaining an interpolation method of the compensation data.
Figure 13A:
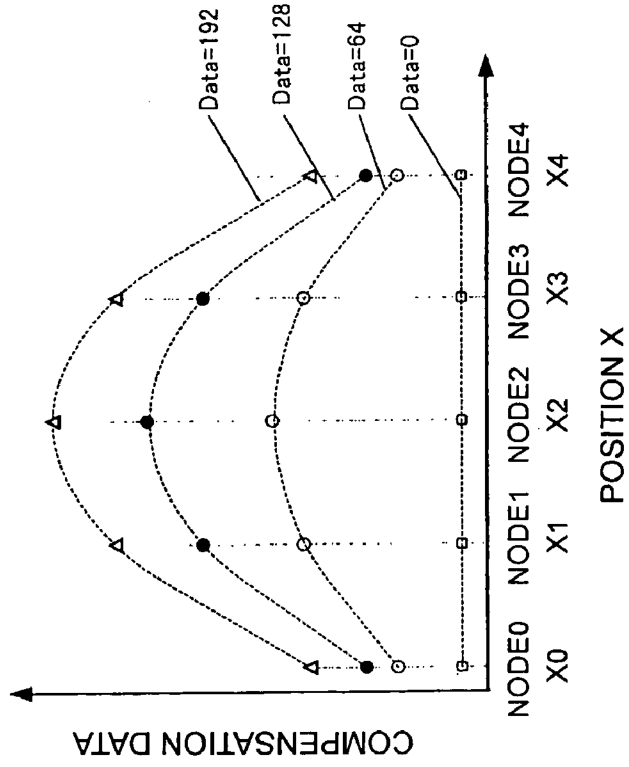

An example, obtained by this method, of discrete compensation data to certain input image data is shown in FIG. 13A. In this figure, a horizontal axis corresponds to the horizontal display position, and positions of respective nodes are described. Also, a vertical axis corresponds to the value of the compensation data.

The discrete compensation data is calculated at each of the node positions and the values of the image data Data (image data reference values=0, 64, 128, 192) which are indicated by the white squares, the white circles, the black circles and the white triangles.

(Method of Interpolating the Discrete Compensation Data)

The compensation data calculated discretely is discrete one to positions of respective nodes, and is not one providing compensation data in an arbitrary horizontal position (column wiring number). Also, at the same time to it, it is compensation data to the image data having the size of the reference values of several predetermined image data at respective node positions, but is not one providing compensation data in accordance with size of actual image data value.

Consequently, compensation data fit in with the size of the input image data value in respective column wirings is calculated by interpolating the compensation data calculated discretely.

FIG. 13B is a diagram showing a method for calculating compensation data corresponding to image data "Data" at a position×located between a node n and a node n+1.

Note that it is presumed that the compensation data has already been discretely calculated for positions Xn and Xn+1 at the node n and at the node n+1. Further, the inputted image data Data has a value between image data reference values Dk and Dk+1 for which discrete compensation data have already been calculated.

If the discrete compensation data for the reference value for the "k"-th image data at the node n is written as CData[k] [n], then the compensation data CA for the pulse width Dk at the position x can be calculated in the following way according to the linear approximation using the values of CData[k] [n] and CData[k] [n+1].

$$CA = \frac{(X_{n+1} - x) \times CData\ [k]\ [n] + (x - X_n) \times CData\ [k]\ [n+1]}{X_{n+1} - X_n} \quad \text{(Equation 17)}$$

Further, compensation data CB for image data Dk+1 at the position x can be calculated as follows.

$$CB = \frac{(X_{n+1} - x) \times CData\ [k+1]\ [n] + (x - X_n) \times CData\ [k+1]\ [n+1]}{X_{n+1} - X_n} \quad \text{(Equation 18)}$$

By linearly approximating the compensation data CA and CB, the compensation data CD for the image data Data at the position x can be calculated as follows.

$$CD = \frac{CA \times (D_{k+1} - \text{Data}) + CB \times (\text{Data} - D_k)}{D_{k+1} - D_k} \quad \text{(Equation 19)}$$

As described above, in order to calculate the compensation data from the discrete compensation data such that the compensation data is appropriate for the actual position and the actual image data size, the calculations can be performed easily by using the methods written in (Equation 17) to (Equation 19).

The compensation data calculated herewith is added to the image data to compensate the image data and the pulse-width modulation is carried out in compliance with the image data after the compensation, and thereby, deterioration of the image quality due to the voltage drop can be reduced and the image quality can be improved.

Since calculated amount can be reduced by adopting the approximation such as the degeneracy etc., with respect to hardware for compensation, it can be configured by very small-sized hardware.

(Explanation of Functions of Overall System and Respective Parts)

Then, hardware of the display apparatus with a built-in compensation data calculation unit will be described.

Figure 14:
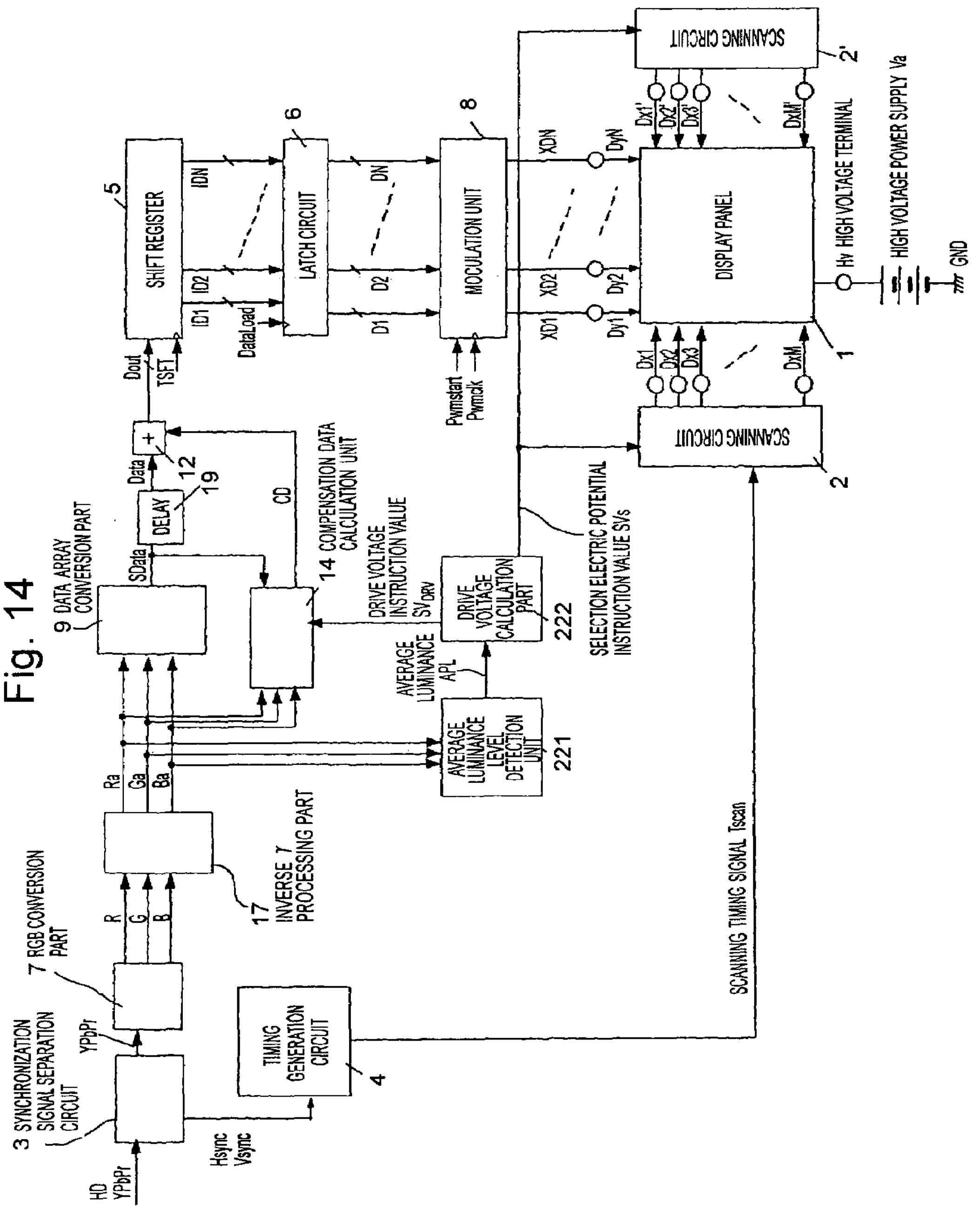
FIG. 14 is a block diagram showing structures of signal processing series and drive series of the display apparatus according to a first embodiment of the invention.

FIG. 14 is a block diagram showing an outline of its circuit structure. In the figure, 1 designates the display panel of FIG. 2, Dx1 to DxM and Dx1' to DxM' designate voltage supply terminals for the scanning wirings of the display panel, Dy1 to DyN designate voltage supply terminals for the modulation wirings of the display panel, Hv designates a high-voltage supply terminal for applying acceleration voltage between a face plate and a rear plate, Va designates a high-voltage power supply, 2 designates a scanning circuit (scanning unit), 3 designates a synchronization signal separation circuit, 4 designates a timing generation circuit, 7 designates a RGB conversion part for converting YPbPr signals separated by the synchronizing signal separation circuit 3 into RGB signals, 17 designates an inverse γ processing part, 5 designates a shift register for 1 line of the image data, 6 designates a latch circuit for 1 line of the image data, 8 designates a pulse-width modulation unit (modulation unit) outputting modulation signals to the modulation wirings of the display panel, 12 designates an adder (calculation processing unit, addition processing unit), 14 designates a compensation data calculation unit, 221 designates an average luminance level calculation unit (average luminance detection circuit), and 222 designates a drive voltage calculation part.

Also, in the same figure, R, G, and B designate parallel input image data, Ra, Ga, and Ba designate RGB-parallel image data to which inverse γ conversion processing described later is applied, Data is image data which was parallel/serial-converted by a data array conversion part 9, CD designates compensation data which was calculated by the compensation data calculation unit 14, and Dout designates image data which was compensated (compensated image data) by adding the compensation data to the image data by the adder 12.

(Synchronization Signal Separation Circuit, Timing Generation Circuit)

The display apparatus of this embodiment can display NTSC, PAL, SECAM, HDTV and other such television signals, and also computer outputs such as VGA and the like.

In FIG. 14, only the HDTV format is shown in order to simplify the diagram.

From an image signal of HDTV system, firstly, synchronization signals Vsync, Hsync are separated by a synchronization signal separation circuit 3, and supplied to a timing generation circuit 4. The image signal from which the synchronization signals were separated are supplied to a RGB conversion part 7. Inside of the RGB conversion part 7, besides a conversion circuit from YPbPr to RGB, not-shown low pass filter and A/D converter etc. are disposed. The RGB conversion part 7 converts YPbPr which is filtered with the low pass filter to digital RGB signals by the A/D converter, and supplies the same to the inverse γ processing part 17.

(Timing Generation Circuit)

The timing generation circuit 4 has a built-in PLL circuit, and it generates timing signals synchronized to synchronization signals from various image sources and generates operation timing signals for each part.

Examples of timing signals generated by the timing generation circuit 4 include a TSFT for controlling operating timing of the shift resistor 5; a control signal Dataload for latching data from the shift resistor 5 to the latch circuit 6; a pulse width modulation start signal Pwmstart for the modulation circuit 8; a clock Pwmclk for the pulse width modulation; and a timing signal Tscan for controlling the operation of the scanning circuit 2.

(Scanning Circuit)

The scanning circuits 2 and 2' in FIG. 14 are circuits for outputting the selection electric potential Vs or the non-selection electric potential Vns to the connection terminals Dx1 to DxM to sequentially scan the display panel 1 in steps of 1 line during 1 horizontal scanning period.

Figure 15:
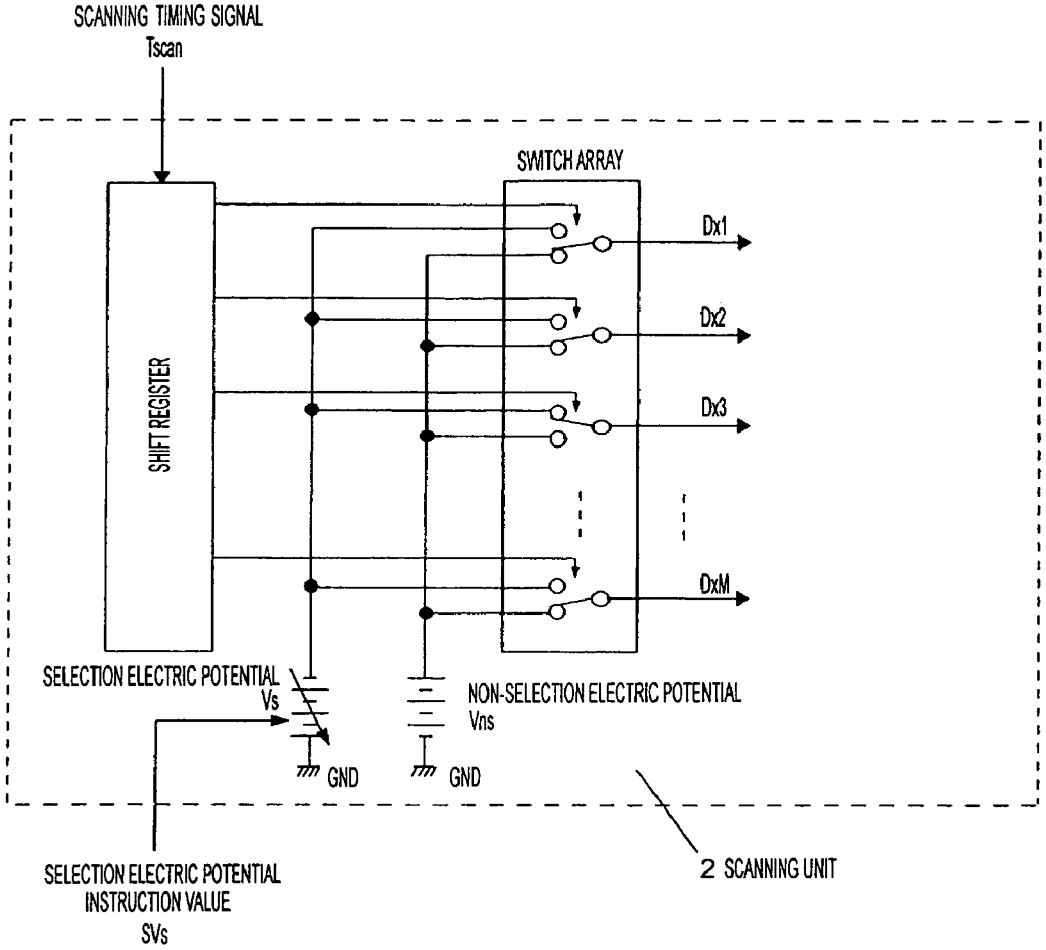
FIG. 15 is a block diagram showing a structure of a scanning circuit.

The scanning circuit 2 and 2', as shown in FIG. 15, has a variable power supply for setting the selection electric potential Vs on the basis of a selection electric potential instruction value SVs which is supplied from a drive voltage calculation part to be described later. In this embodiment, by changing the selection electric potential Vs, it is possible to change the drive voltage of the cold cathode device disposed on the display panel 1.

The scanning circuits 2 and 2' are circuits which sequentially change the scanning wiring that is being selected with respect to each horizontal period, in synchronous with a timing signal Tscan from the timing generation circuit 4 to carry out the scanning.

In addition, Tscan designates a group of timing signals generated of vertical synchronization signals and horizontal synchronization signals etc.

The scanning circuits 2 and 2', as shown in FIG. 15, are composed of M number of switches and shift registers etc. It is desirable that these switches are composed of transistors and FETs.

In addition, in order to reduce the voltage drop in the scanning wiring, it is effective that, as shown in FIG. 14, the scanning circuits are connected to both ends of the scanning wiring of the display panel to drive from the both ends. However, the method in this embodiment is applicable to a case that the scanning circuits are not connected to the both ends of the scanning wiring. In that case, the above-described (Equation 3) may be modified.

In FIG. 15, a panel drive power supply which provides the selection electric potential Vs and the non-selection electric potential Vns is disposed in the scanning circuits, but it is desirable that such panel drive power supply is formed as an independent power supply circuit separated from the scanning circuits.

(Inverse γ Processing Part)

CRTs have a luminous characteristic of the approximately 2.2 power to their inputs (hereinafter referred to as inverse γ characteristic). Input image signals, taking such characteristic of CRTs into consideration, are converted generally in compliance with the γ characteristic of the 0.45 power to realize a linear luminous characteristic on the occasion of displaying on CRT.

On the other hand, the display panel 1 of the display apparatus in this embodiment, in case that the modulation is carried out by adjusting duration of time that the drive voltage is applied, has a substantially linear luminous characteristic with respect to length of time that the drive voltage is applied. Accordingly, the input image signal may be converted on the basis of the inverse γ characteristic (hereinafter, referred to as inverse γ conversion).

Figure 16:
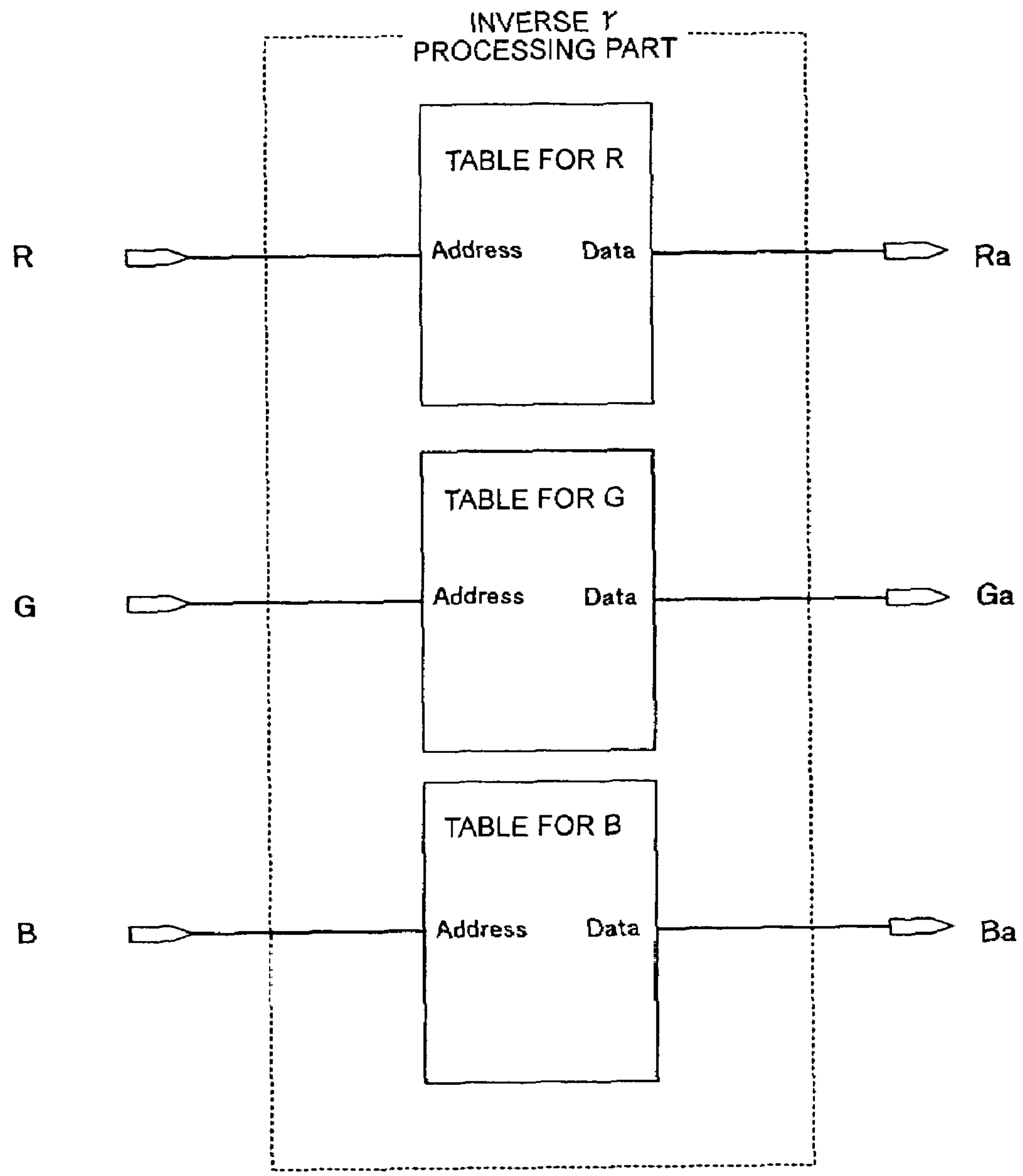
FIG. 16 is a block diagram showing a structure of an inverse γ processing part.

FIG. 16 shows the detail of a inverse γ processing part 17. This inverse γ processing part 17 is a block for carrying out the inverse γ conversion of the input image signal.

The inverse γ processing part 17 in this embodiment realizes the inverse γ conversion processing by use of a memory. The number of bits of the image signals R, G, and B are set to 8 bits, and the number of bits of the image signals Ra, Ga, and Ba as outputs from the inverse γ processing part 17 are also set to 8 bits, and the inverse γ processing part 17 is configured by using a memory having 8 bit addresses and 8 bit data with respect to each color.

(Data Array Conversion Part)

Figure 17:
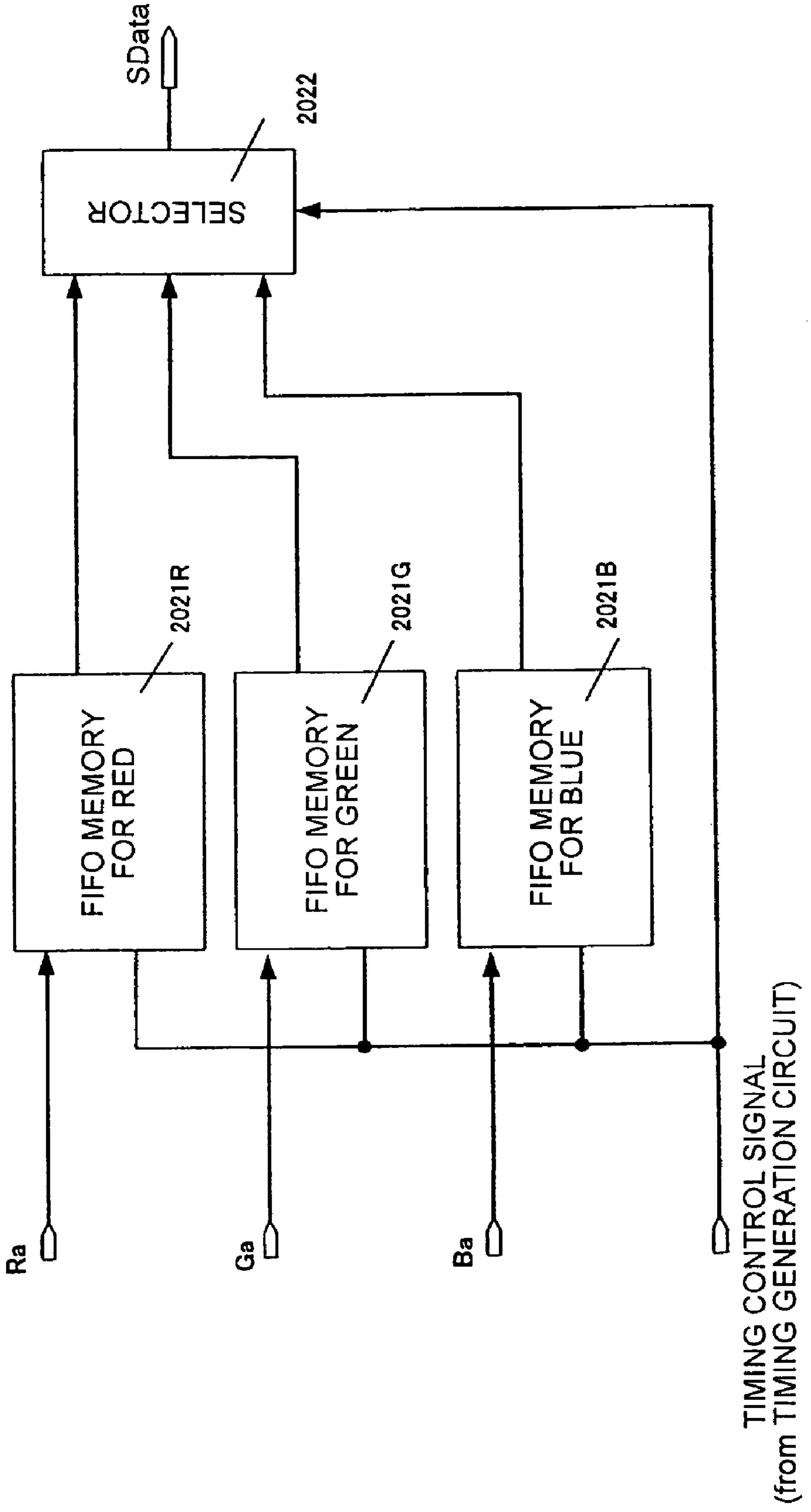
FIG. 17 is a block diagram showing a structure of a data arrangement conversion part.

A data array conversion part 9 in FIG. 14 is a circuit for performing a parallel/serial conversion on the RGB parallel image signals Rb, Gb and Bb, to make them appropriate for pixel array of the display panel. As shown in FIG. 17, the data array conversion part 9 is composed of FIFO (a First In First Out) memories 2021R, 2021G and 2021B for each of the RGB colors, and a selector 2022.

Although they are not shown in the diagram, the FIFO memory has two memories capable of holding number of words equal to the number of horizontal pixels, where one of the memories is for odd-number lines, and the other memory is for even-number lines. When image data from an odd-number line is inputted, this data is inputted into the FIFO for the odd-number line while image data stored in the immediately previous horizontal scanning period is read out from the FIFO memory for the even-number line. When the image data from the even-number line is inputted, the data is written into FIFO for the even-number line while the image data stored in the immediately previous horizontal scanning period is read out from the FIFO for the odd-number line.

The data read out from the FIFO memory undergoes the parallel/serial conversion by the selector in accordance with the pixel array of the display panel, and is then outputted as serial image data SData for the RGB. The data array conversion part 9 operates based on the timing control signals from the timing generation circuit 4.

(Adder)

The adder 12 in FIG. 14 is a unit for adding the compensation data CD from the compensation data calculation unit 14 and the image data Data. By carrying out the addition, the image data Data is compensated and is, as image data Dout, transferred to the shift register 5.

In addition, on the occasion of adding the image data Data and the compensation data CD, there is a possibility that overflow occurs in the adder 12. In contrast to this, in this embodiment, as a structure for preventing the overflow, depending upon maximum value on the occasion of adding the image data Data and the compensation data CD, bid width of the adder 12 and bit width of the modulation unit 8 after that were determined.

More concretely, in case of the display apparatus of this embodiment, since the compensation data became maximum 120 on the occasion of a screen in which all the image data values are 255, the maximum value of the output of the adder 12 becomes 255+120=375. Then, supposing that the number of output bits of the adder is of 9 bits, and the number of bits of the modulation unit is of 9 bits, the number of bits in respective parts was determined.

Also, as another structure for preventing the overflow, the maximum value of the compensation data to be added is estimated in advance, and, in order to prevent the overflow from occurring when its maximum value was added, a range of a value that the image data can take may be lessen in advance.

In order to lessen range of the value that the image data can take, for example, the input image data may be limited on the occasion of carrying out A/D conversion, and a multiplier may be provided so that a gain of more than 0 and less than 1 is multiplied with the input image data to limit its range.

(Delay Circuit)

The image data SData which has been reordered by the data array conversion part 9 is inputted into the compensation data calculation unit 14 and into the delay circuit 19. A compensation data interpolating part of the compensation data calculation unit 14 described below cross-references horizontal position information x from the timing control circuit and the value of the image data SData to calculate the compensation data CD which will be suitable for each horizontal position and for each image data value.

The delay circuit 19 is provided to absorb the time required for the calculation of the compensation data. When the adder 12 adds the compensation data to the image data, the delay circuit 19 performs the delay so that the compensation data corresponding to the image data is added accurately. The delay circuit 19 is constituted by using a flip-flop circuit.

(Shift Resistor, Latch Circuit)

The image data Dout as outputs from the adder 12 undergoes the serial/parallel conversion by the shift resistor 5, whereby the image data Dout changes from its serial data format into parallel image data ID1 to IDN per modulation wiring and then it is outputted to the latch circuit 6. The latch circuit 6 latches the data from the shift resistor 5 immediately before one horizontal interval is started, based on the timing signal Dataload. The outputs from the latch circuit 6 are delivered to the modulation unit 8 as parallel image data D1 to DN.

Note that, in accordance with this embodiment, the image data ID1 to IDN and D1 to DN are each composed of 8 bits. Their operation timing is based on the timing control signals TSFT and Dataload from the timing generation circuit 4.

(Details of the Modulation Circuit)

The parallel image data D1 to DN outputted from the latch circuit 6 is provided to the modulation unit 8.

Figure 18A:
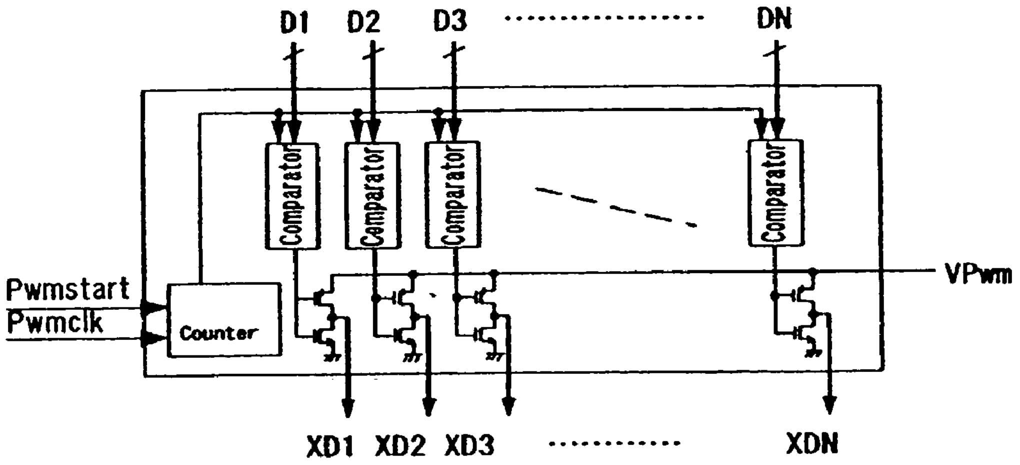
FIG. 18 is a diagram for explaining a structure of a modulation unit and its operation.

As shown in FIG. 18A, the modulation unit 8 is a pulse width modulation circuit (PWM circuit) including a PWM counter, and a comparator and a switch (a FET in FIG. 18A) for each modulation wiring.

Figure 18B:
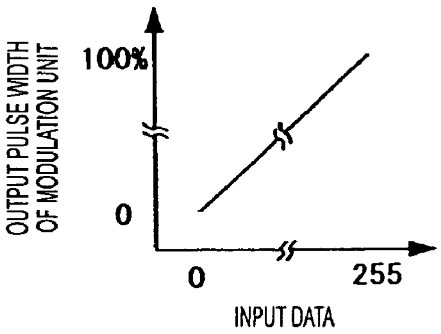

As shown in FIG. 18B, the relationship between the image data D1 to DN and the output pulse width from the modulation unit 8 is a linear relationship.

Figure 18C:
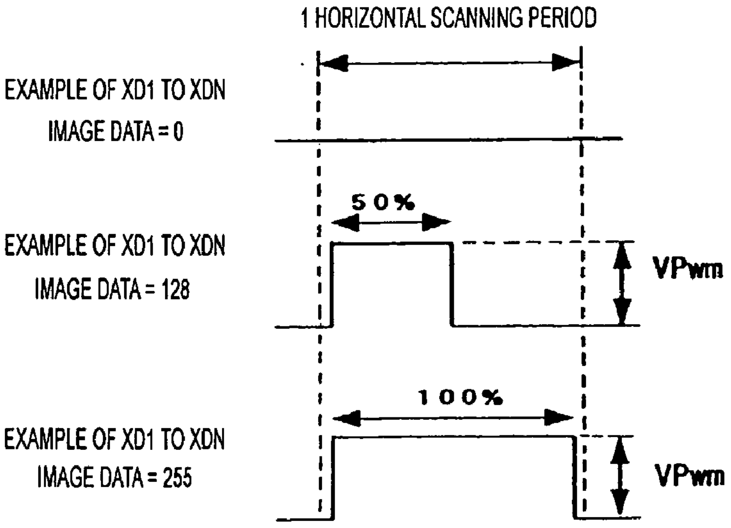

FIG. 18C shows 3 examples of an output waveform from the modulation unit 8. In FIG. 18C, the waveform depicted at the top is a waveform when the input data to the modulation unit 8 is 0. The waveform depicted in the middle is a waveform when the input data to the modulation unit 8 is 256. The waveform depicted on the bottom is the waveform when the input data to the modulation unit 8 is 511.

In addition, in this embodiment, the number of bits of the input data D1 to DN to the modulation unit 8 is, as described above, on the ground that the overflow does not occur, set to 9 bits (in addition, in the above-stated description, there are places describing that, when the input data of the modulation unit 8 is 511, the modulation signal of pulse width corresponding to 1 horizontal scanning period is outputted, but in detail, as shown in FIG. 18C, although it is very short time, no-drive periods are disposed at points of before a pulse is going up and after the pulse went down so that flexibility of timing is provided.).

Figure 19:
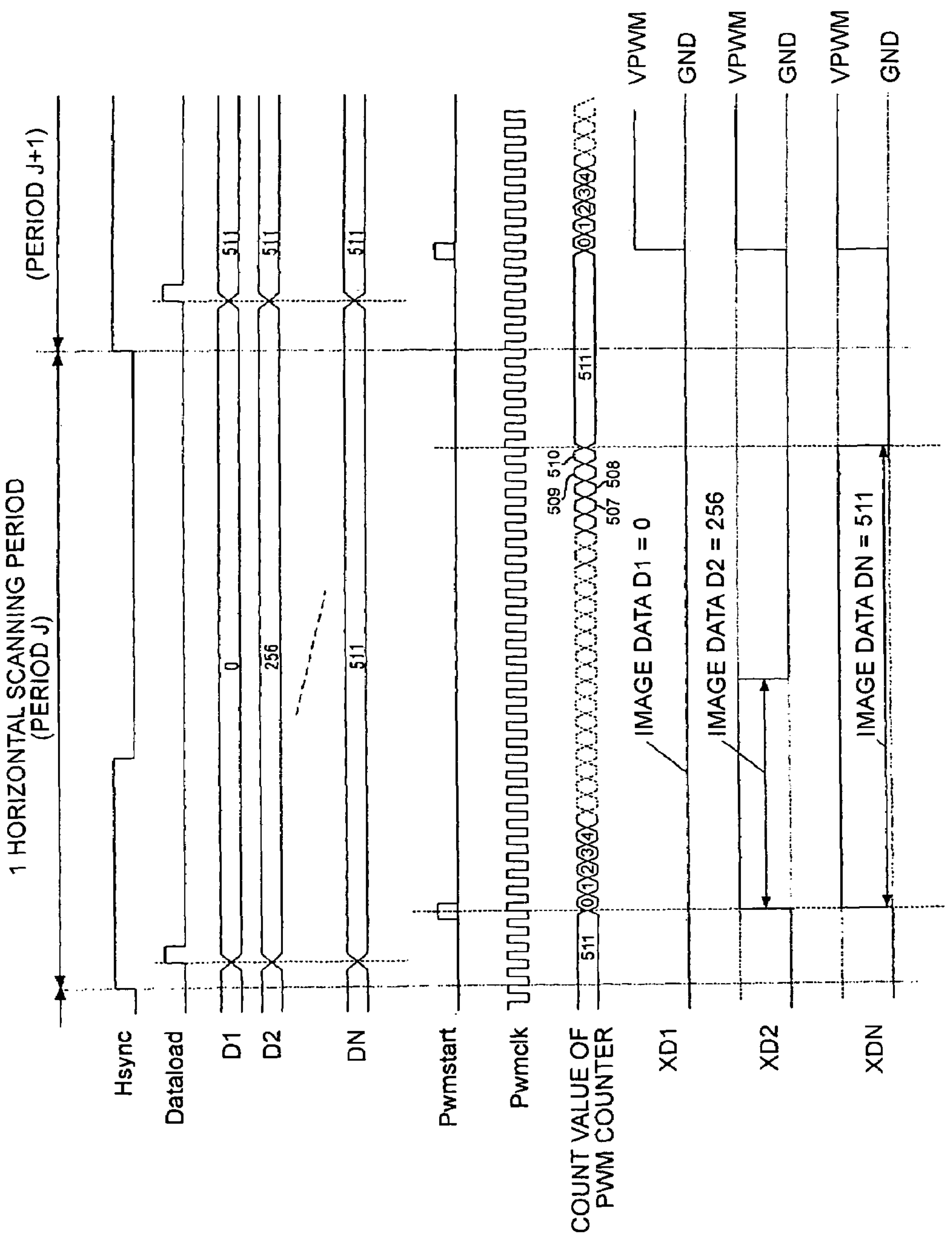
FIG. 19 is a timing chart for explaining operations of the modulation unit.

FIG. 19 is a timing chart showing the operation of the modulation unit 8 according to the present invention. In FIG. 19, Hsync denotes a horizontal synchronization signal; Dataload denotes a load signal provided to the latch circuit 6; D1 to DN denote the input signals to columns 1 to N of the modulation unit 8 described above; Pwmstart denotes a synchronization clear signal for the PWM counter; and Pwmclk denotes a clock of the PWM counter. Further, XD1 to XDN represent outputs of the modulation unit 8 pertaining to columns 1 to N.

As shown in FIG. 19, when one horizontal scanning period starts, the latch circuit 6 latches the image data and transfers the data to the modulation unit 8.

The PWM counter starts the count based on the Pwmstart and the Pwmclk, and when the count value reaches 511, it stops the counter and holds the value 511.

The comparator provided to each of the columns compares the counter value of the PWM counter and the image data from each of the columns. When the value of the PWM counter is greater than the image data, it outputs "High", and it outputs "Low" during all the other periods.

The comparator output is connected to the gate of the switch at each column. While the comparator output is "Low", the switch on a VPWM side shown in FIG. 18A is turned "ON", and the switch on a GND side is turned "OFF", so that the modulation wiring connects to the voltage VPWM. In contrast, while the comparator output is "High", the switch on the VPWM side in FIG. 18A is turned "OFF", and the switch on the GND side is turned "ON", so that the voltage in the modulation wirings connects with the ground potential.

Each part operates as described above, whereby the pulse-width modulation signal outputted by the modulation unit 8 exhibits the waveform with the synchronized rising edge of the pulse as shown in D1, D2 and DN in FIG. 19.

(Average Luminance Level Detection Unit)

The average luminance level detection unit 221 for detecting the luminance information is a unit for detecting the average luminance with respect to each frame in reference to the image data Ra, Ga, and Ba after the inverse γ conversion. This unit calculates summation of the image data in frame, by adding the image data of Ra, Ga, and Ba with respect to each frame, and detects the average luminance level by dividing the final total of the image data in frame by the number of pixels of the screen.

The detection of the luminance information which is used in this invention is not limited to this method but other units as described above may be used, if it can detect a value corresponding to the average luminance level.

A value corresponding to the average luminance level may be gotten by dividing the total sum of the image data by one of some adequate fixed values instead of dividing by the number of pixels of the screen. In this case, if the value is set to the n-th power of 2, division can be realized by a bit sift to simplify the structure of hardware.

The meaning of the average luminance level is almost same to that of APL (Average Picture Level).

(Drive Voltage Calculation Part)

The drive voltage calculation part 222 is a drive voltage calculation unit which calculates a drive voltage instruction value, on the basis of the average luminance calculated in the average luminance level detection unit 221. The calculated drive voltage instruction value SVDRV is, as shown in FIG. 14, supplied to a compensation data calculation unit 14 described later and, as a selection electric potential instruction value SVS which is found by subtracting the modulation electric potential from the drive voltage, supplied to the scanning circuits 2 and 2'.

Figure 20A:
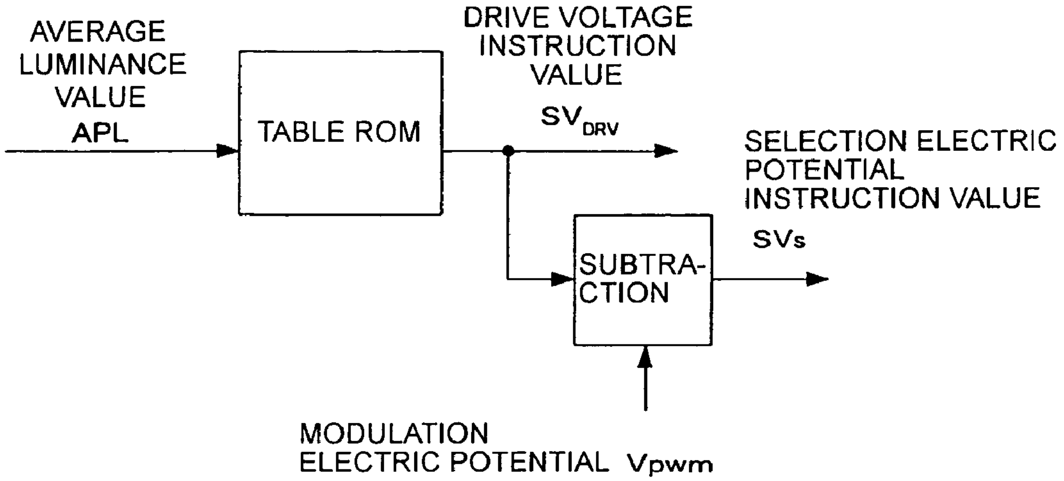
FIG. 20 is a diagram for explaining a drive voltage calculation part.

In this embodiment, a table ROM is used on the occasion of calculating the instruction value $SV_{DRV}$ for the drive voltage $V_{DRV}$ from the average luminance (FIG. 20A). That is, it was configured such that, when the average luminance is inputted as an input (address terminal) of the table ROM, the instruction value $SV_{DRV}$ of the drive voltage to be set is outputted from an output (data terminal) of ROM.

Figure 20B:
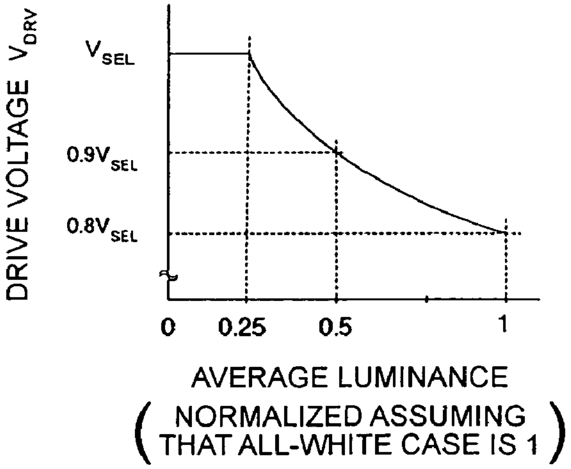

In addition, content which was stored in the table ROM in this embodiment is shown in FIG. 20B. In the same figure, a horizontal axis is set for the average luminance and, in order to make the figure clearly understandable, it is normalized by setting the average luminance to 1 when the input image signal of 1 frame is of an all-white screen. Also, a vertical axis of the same figure is not the drive voltage instruction value $SV_{DRV}$ but the actual drive voltage $V_{DRV}$. Also, $V_{SEL}$ is rated drive voltage of the surface conduction electron-emitting device in this embodiment.

That is, it is controlled that, in case of a dark image, i.e., an image in which the average luminance level is low, the drive voltage $V_{DRV}$ becomes high and, in case of a high image, the drive voltage $V_{DRV}$ becomes low.

(Compensation Data Calculation Unit)

Figure 21:
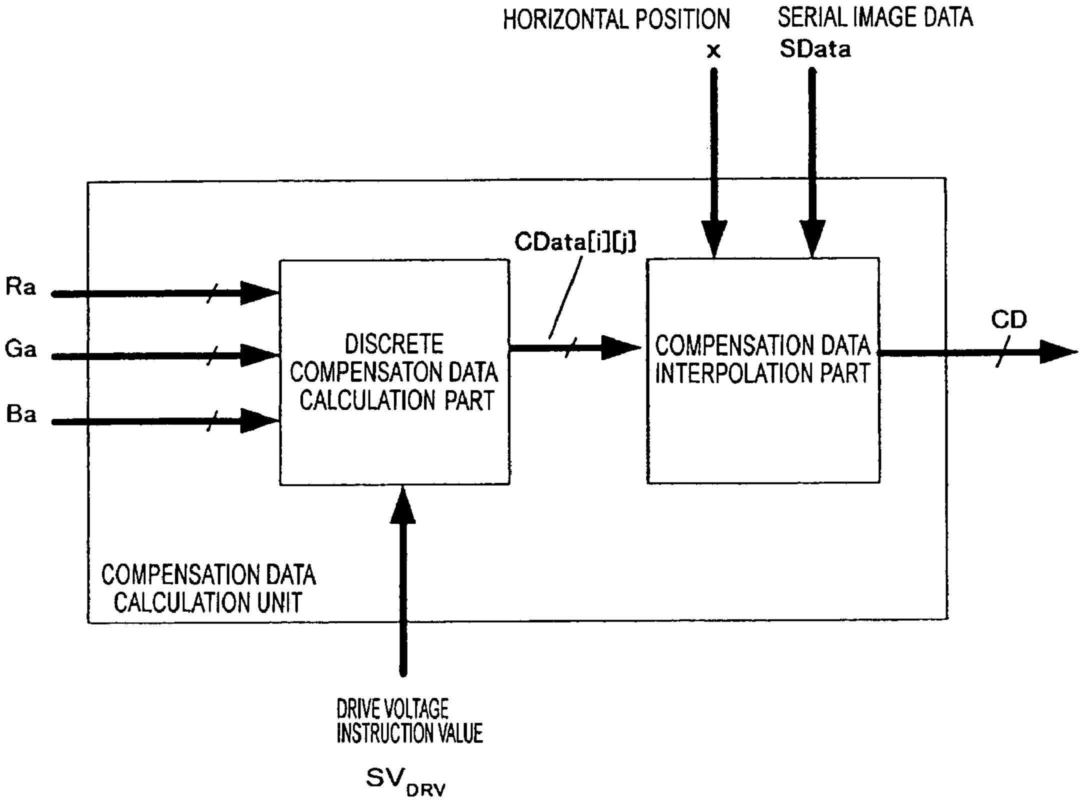
FIG. 21 is a diagram for explaining a compensation data calculation unit.

The compensation data calculation circuit 14 is a circuit which calculates the compensation data of the voltage drop corresponding to the drive voltage of the display panel 1, by the above-described compensation data calculation method. The compensation data calculation unit 14 is, as shown in FIG. 21, composed of two blocks of a discrete compensation data calculation part and a compensation data interpolation part.

The discrete compensation data calculation part makes reference to the drive voltage instruction value SVDRV which is outputted from the drive voltage calculation part 222, and calculates the voltage drop amount in compliance with the inputted image signal from the same signal, and calculated the compensation data discretely from the voltage drop amount.

This part, in order to reduce calculated amount and hardware amount, adopts the concept of the above-described degeneracy model, and calculates the compensation data discretely. On this occasion, in compliance with the drive voltage instruction value $SV_{DRV}$ which is a value corresponding to the drive voltage $V_{DRV}$, the device current amount which is used for the calculation is renewed and the voltage drop amount is calculated.

The compensation data calculated discretely is interpolated by the compensation data interpolation part (compensation data interpolation unit), and the compensation data CD fit in with the value of the image data and its horizontal display position x is calculated.

(Discrete Compensation Data Calculation Part)

FIG. 22 shows the discrete compensation data calculation part for calculating the compensation data discretely.

The discrete compensation data calculation part, as described below, is a unit which realizes a function as the voltage drop amount calculation part for dividing the image data into blocks to calculate a statistical amount (the number of lighting) with respect to each block, and calculating the time change of the voltage drop amount at respective node positions from the statistical amount, a function for converting the voltage drop amount with respect to each time into the light-emission luminance amount, a function for integrating the light-emission luminance amount in a time direction to calculate a total light-emission luminance amount, and a function for calculating the compensation data to the reference value of the image data at discrete reference points.

In FIG. 22, 100*a* to 100*d* designate a lighting number counting unit, 101*a* to 101*d* designate register groups for storing the number of lighting in respective times with respect to each block, 102 designates CPU, 103 designates a table memory (voltage drop amount storage unit) for storing the parameter aij described in (Equation 2) and (Equation 3), 113 designates a register for storing the drive voltage instruction value $SV_{DRV}$ which was supplied from the drive voltage calculation part, 112 designates a table memory for calculating the device current amount for calculating the voltage drop amount from the drive voltage instruction value $SV_{DRV}$, 104 designates a temporary register for temporarily storing calculation results, 105 designates a program memory in which programs for the CPU are stored, 111 designates a table memory in which conversion data for converting the voltage drop amounts into emission current amounts is stored, and 106 designates a register group for storing calculation results of the above-described discrete compensation data.

Figures 22A, 22B:
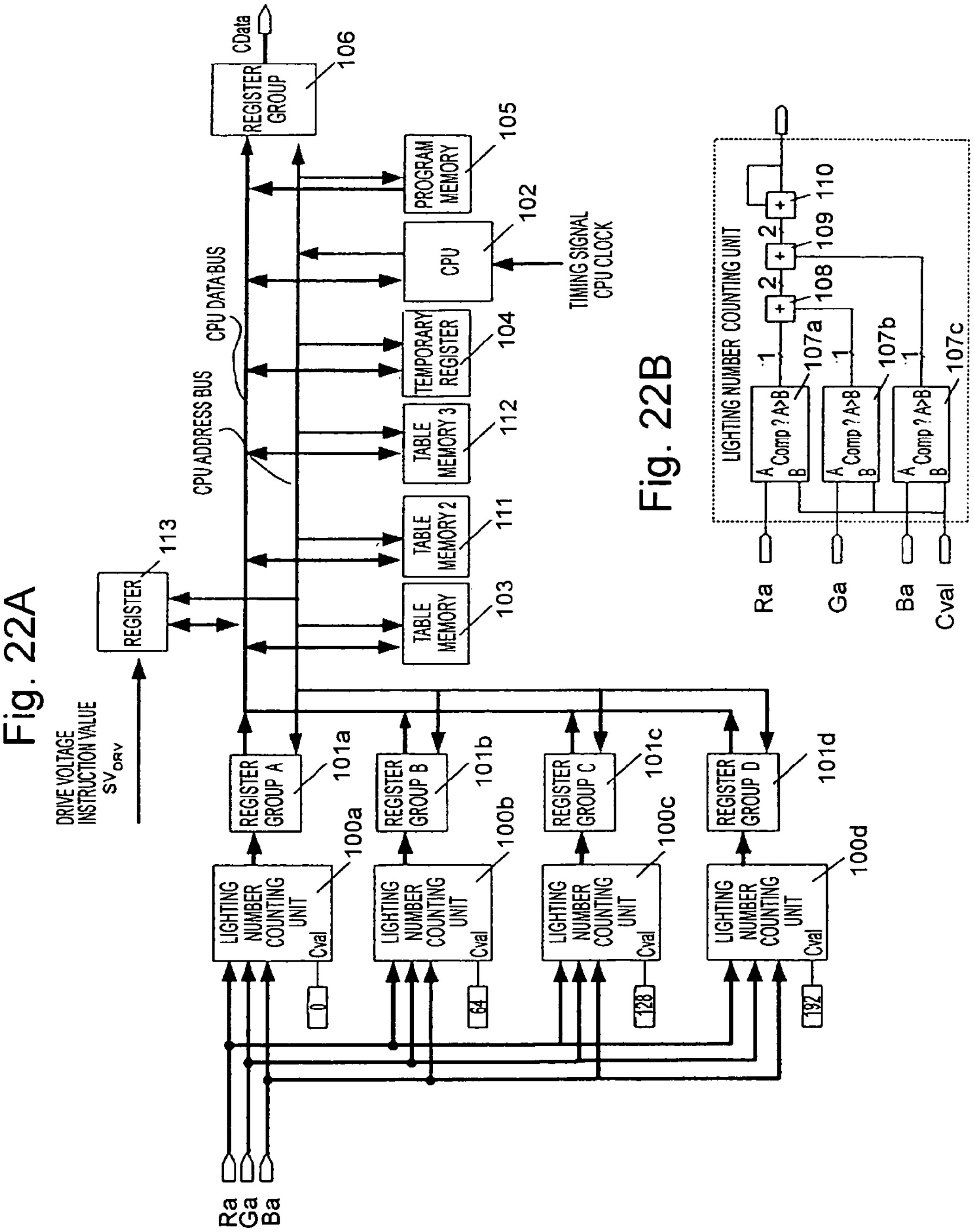
FIG. 22 is a block diagram showing a structure of a discrete compensation data calculation part.

The lighting number counting units 100*a* to 100*d* are composed of comparators and adders etc. as described in FIG. 22B. The image signals Ra, Ga, and Ba are inputted to comparators 107*a* to 107*c*, respectively, and are compared one after another with a value of Cval. In addition, Cval corresponds to the above-described reference value set to the image data.

The comparators 107*a* to 107*d* compare Cval with the image data, and if the image data value is larger, High is outputted, and if smaller, Low is outputted.

Outputs of the comparators 107*a* to 107*c* are added to one another by the adders 108 and 109, and further, by the adder 110, addition is carried out with respect to each block, and the addition results with respect to each block are stored in the resister groups 101*a* to 101*d* as the number of lighting with respect to each block.

To the lighting number counting units 100*a* to 100*d*, as the comparison value Cval of the comparators 107*a* to 107*c*, 0, 64, 128, 192 are inputted, respectively. In other words, the lighting number counting unit 100*a* counts the number of image data which is larger than 0 out of the image data, and stores a final total with respect to each block into the register 101*a*. The lighting number counting unit 100*b* counts the number of image data which is larger than 64 out of the image data, and stores a final total with respect to each block into the register 101*b*. The lighting number counting unit 100*c* counts the number of image data which is larger than 128 out of the image data, and stores a final total with respect to each block into the register 101*c*.

In case that the number of lighting is counted with respect to each block and with respect to each time, the CPU reads out the parameter table aij stored in the table memory 103 as needed, calculates the voltage drop amount in accordance with (Equation 2) to (Equation 5), and stores calculation results in the temporary register 104.

On this occasion, the CPU 102 firstly makes reference to contents of the register 113, and stores the drive voltage instruction value $SV_{DRV}$ which was instructed by the drive voltage calculation part 21.

Further, in order to calculate the device current amount which is used for calculating the voltage drop from the drive voltage instruction value $SV_{DRV}$, the CPU refers contents of the table memory 3 (112). In the table memory 3, a relation of a drive voltage vs. device current IF is stored, and when the drive voltage instruction value $SV_{DRV}$ is inputted to the table memory 3, the device current IF corresponding to it is outputted. By substituting the device current amount IF found herewith in (Equation 5), calculation of the voltage drop amount is carrying out.

In this embodiment, the CPU 102 has a sum of products calculation function for carrying out a calculation of (Equation 2) smoothly.

As a unit for realizing the calculation given in (Equation 2), the CPU 102 does not have to carry out the sum of products calculation, and for example, its calculation results may be put into the memory. That is, the number of lighting of respective blocks is set as inputs, and with respect to conceivable all input patterns, the voltage drop amount at respective node positions can be stored in the memory.

As calculation of the voltage drop amount is completed, the CPU 102 reads out the voltage drop amount with respect to each time and each block from the temporary register 104, and makes reference to the table memory 2 (111), and converts the voltage drop amount into the emission current amount, and calculates the discrete compensation data in accordance with (Equation 6) to (Equation 16). The calculated discrete compensation data is stored in the register group 106.

(Compensation Data Interpolation Part)

The compensation data interpolation part is a unit for calculating the compensation data fit in with a position where the image data is displayed (horizontal position), and the value of the image data. This unit, by interpolating the compensation data calculated discretely, calculates the compensation data in accordance with the display position (horizontal position) of the image data and the value of the image data.

Figure 23:
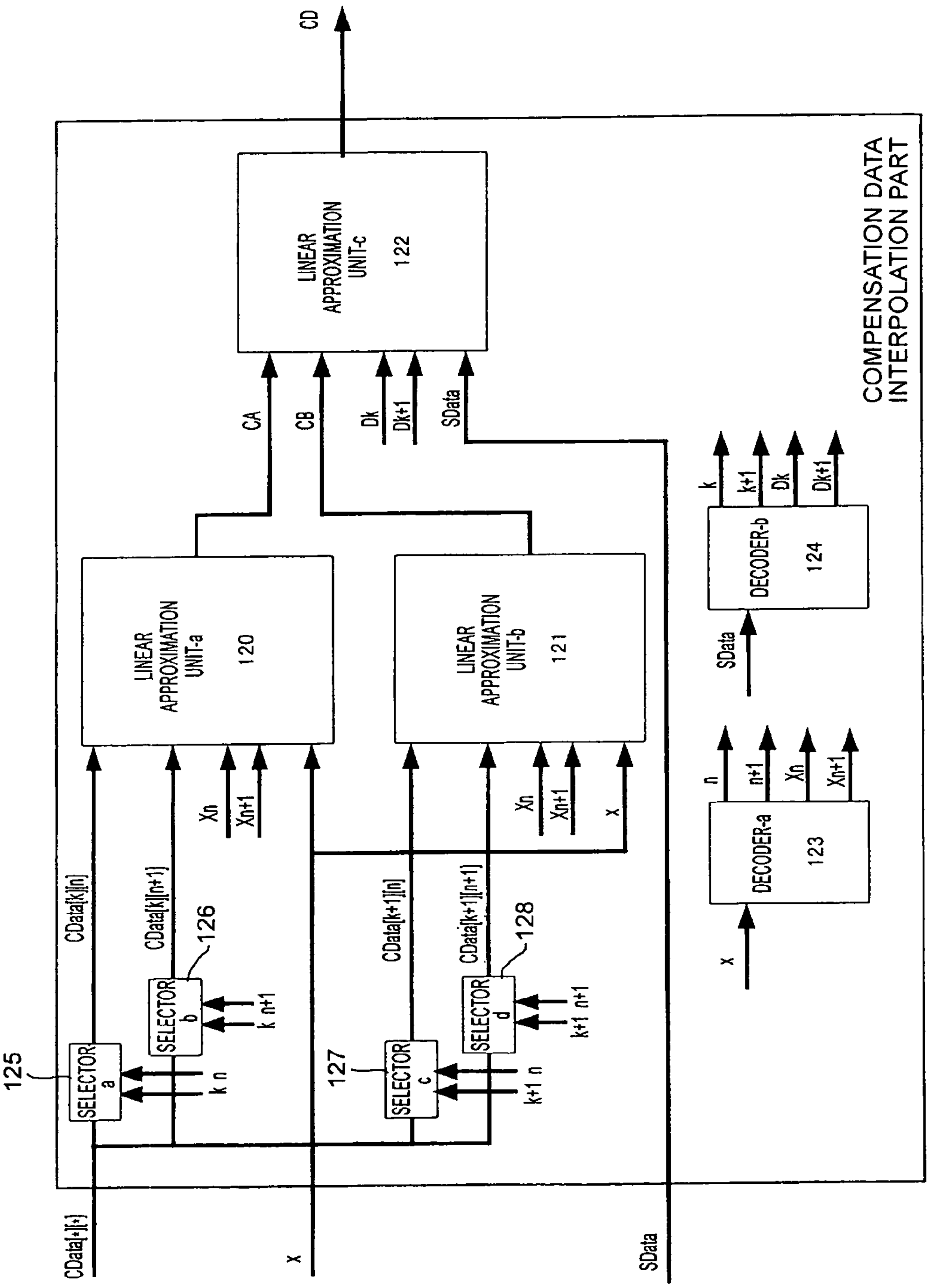
FIG. 23 is a block diagram showing a structure of a compensation data interpolation part.

FIG. 23 is a diagram for explaining the compensation data interpolation part. In FIG. 23, 123 designates a decoder-a for determining node numbers n and n+1 of the discrete compensation data to be used for the interpolation from the display position (horizontal position) x of the image data, and 124 designates a decoder-b for determining k and k+1 in (Equation 17) to (Equation 19) from the size of the image data. Also, selectors 125 to 128 are selectors for selecting the discrete compensation data and supplying it to the linear approximation unit. Also, 120 to 122 designates the linear approximation units for carrying out the linear approximation for (Equation 17) to (Equation 19), respectively.

Figure 24:
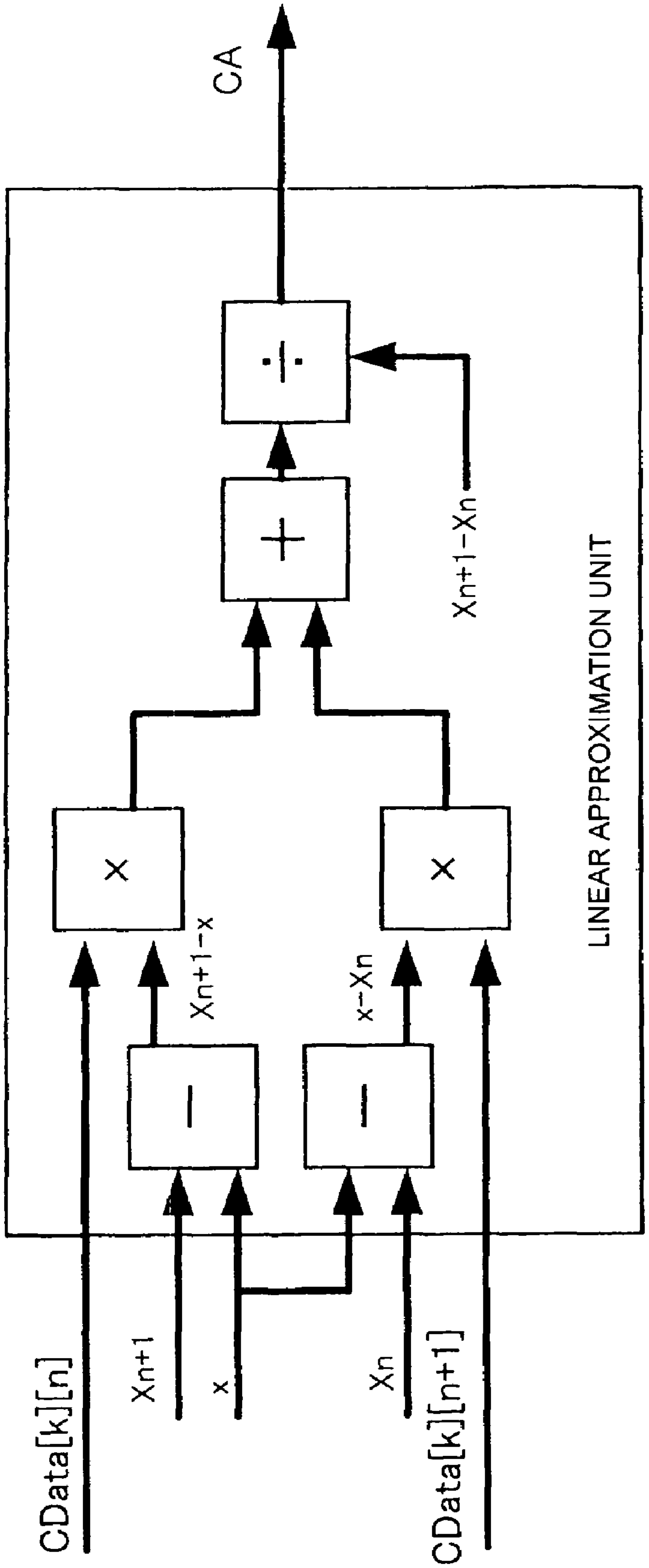
FIG. 24 is a block diagram showing a structure of a linear approximation unit.

FIG. 24 shows a structural example of the linear approximation unit 120. In general, the linear approximation unit, as shown in an operator of (Equation 17) to (Equation 19), can be composed of a subtracter, a multiplier, an adder, a divider etc.

Preferably, in case that it is configured such that the number of modulation wirings between the nodes where the discrete compensation data is calculated and an interval of the image data reference values where the discrete compensation data is calculated (i.e., time interval during which the voltage drop is calculated) become a power of 2, there is an advantage that hardware can be configured very simply. In case that they are set to the power of 2, in the divider shown in FIG. 24, Xn+1−Xn becomes a value of the power of 2, and therefor, division can be realized by a bit shift.

If the value of Xn+1−Xn is always a constant value and a value represented by the power of 2, the addition result of the adder may be shifted by an amount equivalent to a multiplier of the power, and there is no necessity to darlingly prepare the divider.

Also, by setting the intervals between the nodes where the discrete compensation data is calculated and the intervals between the image data to the power of 2, there are very many advantages that, for example, it becomes possible to simply prepare the decoders 123 to 124 and the calculation carried out by the subtracter in FIG. 24 can be replaced with a simple bit calculation.

(Operation Timing of the Units)

Figure 25:
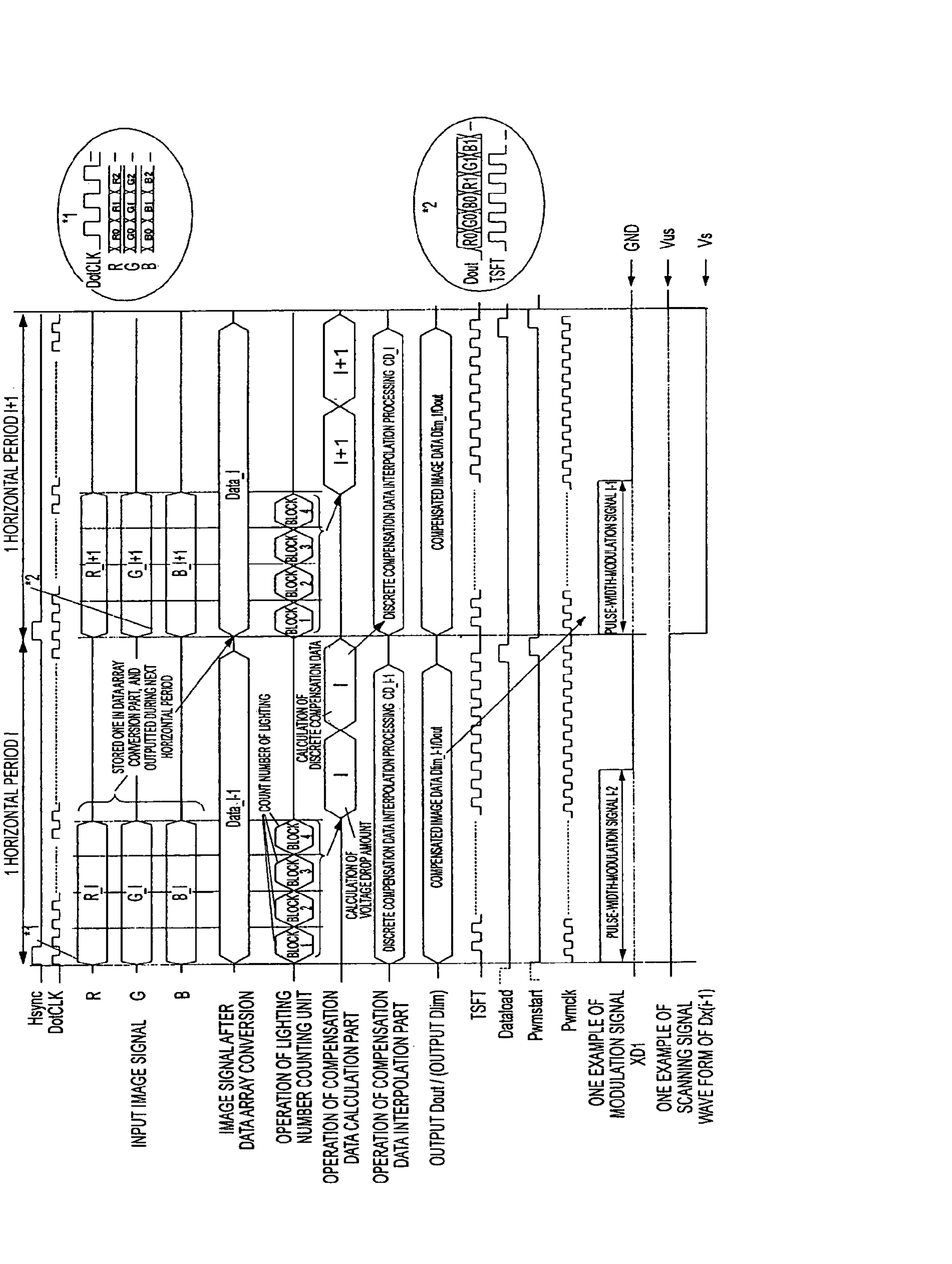
FIG. 25 is a timing chart for explaining operations of a display apparatus according to a preferred embodiment of the invention.

FIG. 25 shows a timing chart of operational timing of the units. Note that, in FIG. 25, Hsync is the horizontal synchronization signal; DotCLK is a clock made from the horizontal synchronization signal Hsync by a PLL circuit inside the timing generation circuit 4; R, G, B are digital image data from an input switching circuit; Data is image data which has already undergone data array conversion; Dout is the compensated image data which has undergone the voltage drop compensation; TSFT is the shift clock for sending the compensated image data Dout to the shift register 5; Dataload is a load pulse for latching the data to the latch circuit 6; Pwmstart is a start signal for the above-mentioned pulse width modulation; and a modulation signal XD1 is one example of the pulse width modulation signal provided to the modulation wiring 1.

When one horizontal interval is started, the digital image data RGB is forwarded from the input switching circuit. In FIG. 25, image data inputted at a horizontal scanning period I are indicated by R_I, G_I and B_I. The image data R_I, G_I and B_I are accumulated in the data array conversion part 9 during the one horizontal interval. Then, during a horizontal scanning period I+1, the image data R_I, G_I and B_I are outputted as digital image data Data_I in correspondence with the arrangement of the pixels in the display panel 1.

The image data R_I, G_I and B_I is inputted into the compensation data calculation circuit 14 during the horizontal scanning period I. The compensation data calculation circuit 14 counts the number of illuminations as described above, and when it finishes counting it calculates the voltage drop amount. After the voltage drop amount is calculated, the discrete compensation data is calculated and the results of the calculation are stored in the register.

During the horizontal scanning period I+1, the compensation data interpolation part interpolates from the discrete compensation data in synchronization with the image data Data_I before the one horizontal scanning period being outputted from the data array conversion part 9, and thus the compensation data is calculated. The interpolated compensation data is immediatly converted by a gradation number conversion part (not shown), and then the result is provided to the adder 12.

At the adder 12, the image data Data and the compensation data CD are added together one after the other, and then the compensated image data Dout is forwarded to the shift register 5. The shift register 5 stores the compensated image data Dout for one horizontal interval in accordance with TSFT, and also performs the serial/parallel conversion and outputs the parallel image data ID1 to IDN to the latch circuit 6. The latch circuit 6 latches the parallel image data ID1 to IDN from the shift register 5 in correspondence with the rising edge of the Dataload signal, and then transfers the latched image data D1 to DN to the pulse width modulation unit 8.

The modulation unit 8 outputs the pulse-width modulation signal having a pulse-width which corresponds to the latched image data. In accordance with the display apparatus of the present embodiment, the pulse width outputted by the modulation circuit 8 is, as a result, displayed after 2 horizontal scanning periods subsequent to the inputted image data.

When display of an image is carried out by such display apparatus, since voltage drop compensation processing by addition is carried out such that the compensation data CD is lessened in case that a change for lowering the drive voltage is carried out, or, adversely, the compensation data CD is enlarged in case that a change for heightening the drive voltage is carried out, the voltage drop amount in the scanning wiring can be compensated, and deterioration of the display image due to it can be improved, and very good image can be displayed.

Also, even in case that the drive voltage was controlled to reduce the power consumption, in accordance with the change of the drive voltage, the voltage drop compensation circuit can carry out the compensation properly, which was very acceptable.

In addition, in the above-described embodiment, the voltage drop compensation circuit which corresponded to the change of the drive voltage so as to reduce the power consumption was described, but even in case that the drive voltage is changed for another purpose, the voltage drop compensation can be carried out well as a matter of course.

As another application, there is a case that a mode for dynamically displaying by relatively increasing a peak luminance (dynamic mode) and a mode for displaying by emphasizing the power consumption and relatively decreasing the peak luminance (power consumption emphasis mode) etc. are prepared in advance, and set to be selectable based upon user's taste. Even in case that such a plurality of display modes are prepared, the mode is selected in accordance with a setting of a user and the drive voltage is controlled, and thereby, adjustment of the display image is carried out easily and the voltage drop compensation amount is adjusted corresponding to the adjusted drive voltage and good compensation can be carried out.

As still another application, in case that the display apparatus is used as not only a television but also as a monitor for a computer, since a user uses the monitor by looking straight at it, it is desirable that it is used by suppressing the luminance as compared with a case that it is used as the television. With regard to a case that such input image signal source is the computer, the display is carried out such that the luminance is suppressed by adjusting the drive voltage, and the good voltage drop compensation can be carried out corresponding to the adjusted drive voltage.

In addition, an identification of whether an image being displayed at present is an image of a computer or an image of a television may be carried out by detecting from which of an image supply terminal for a television and an image supply terminal for a computer, the image is supplied. Also, the identification may be carried out on the basis of an input setting of a user interface unit such as a remote controller by which the image supply terminal can be set, a detection result by an automatic detection unit, and a detection result of an external environment detection unit such as a photo-sensor etc.

Also, in this embodiment, as an actual controlled object on the occasion of adjusting the drive voltage, the selection electric potential of the scanning circuit was changed but, as described above, it is not limited to this.

In the above-described embodiment, with regard to the input image data, the discrete image data reference values are set and the reference points are set on the scanning wiring, and the compensation data at that reference point with regard to the image data value having size of the image data reference value was calculated discretely. Further, by interpolating the compensation data calculated discretely, the compensation data in accordance with the horizontal display position and the value of the input image data is calculated and added to the image data so that the compensation was realized.

On the other hand, aside from the above-described structure, similar compensation can be carried out also by the following structure. The compensation result of the discrete horizontal position and the image data reference value, i.e., sum of the discrete compensation data and the image data reference value is calculated, and further, the compensation result calculated discretely is interpolated to calculate the compensation result in accordance with the horizontal display position and the value of the input image data, and the modulation may be carried out in accordance with that compensation result. In this structure, since addition of the image data and the compensation data is carried out on the occasion of calculating the compensation result discretely, there is no necessity to carry out the addition of the image data and the compensation data after the interpolation.

As described above, according to the first embodiment of this invention, deterioration of the display image due to the voltage drop could be improved.

Also, by adopting several approximations, the compensation amount of the image data for compensating the voltage drop can be easily calculated, and it could be realized by very simple hardware.

Then, in case that the drive voltage was adjusted so as to for example, reduce the power consumption etc., in accordance with change of the adjusted drive voltage, the voltage drop compensation could be carried out properly.

Also, in the first embodiment, the parameter change for changing the drive voltage instruction value was carried out, but it is possible to change the average luminance level of 1 frame image data by changing the coefficient which is multiplied with the output image data Dout. Such embodiment will be described later.

Second Embodiment

A display apparatus according to a second embodiment of this invention which will be described later has a emission charge amount compensation unit for compensating change of the emission charge amount due to influence of the voltage drop, and, in an display apparatus in which the emission charge amount compensation unit calculates the compensated image data by compensating the input image data so as to correspond to the emission charge amount to be emitted, and the modulation unit outputs pulse wave forms which are applied to the column wiring according to the calculated compensated image data, is characterized by having a current value calculation unit for calculating an average current value corresponding to the light-emission luminance of the display apparatus based upon the integrated value of the input image data as a luminance desired value.

Or, also, it is characterized by having a compensated image data calculation unit which calculates the compensated image data as the image data in which influence of the voltage drop was compensated, a modulation unit which receives the compensated image data as input and outputs a modulation signal to the column wiring, and a current value calculation unit which calculats an average current value corresponding to the light-emission luminance of the display apparatus based upon the integrated value of the input image data.

It is suitable that the current value calculation unit has an integration unit which integrates the input image data, and takes an output of the integration unit as the average current value corresponding to the light-emission luminance of the display apparatus.

Further, it is desirable that it has an amplitude adjustment unit which multiplies a coefficient for adjusting amplitude of the compensated image data so that amplitude of the compensated image data corresponds to an input range of the modulation circuit.

It is suitable that the current value calculation unit has an integration unit which integrates the input image data, and takes a result of multiplying an output of the integration unit with the coefficient as the average current value corresponding to the light-emission luminance of the display apparatus.

It is suitable that, provided is an electric power limitation unit in which, the average current value calculated by the current calculation unit is compared with a predetermined reference current value, and in case that the average current value is larger than the reference current value, electric power relating to the light-emission luminance of the display apparatus is limited.

It is suitable that the electric power limitation unit has a function in which, a coefficient for carrying out the power limitation is calculated from the reference current value and the average current value, and the coefficient for carrying out the power limitation is multiplied so as to adjust the amplitude of the compensated image data.

In the case that a process has no over-flow process step, it is suitable that the electric power limitation unit has a function in which, when it is assumed that the integrated value of the input image data is APL, the reference current value is Iamax, the average current value is Ia, and the coefficient for carrying out the power limitation is G', $$Ia=APL, \text{ and}$$

when $Ia<Iamax$, $$G'=1,$$

when $Ia \geqq Iamax$, $$G'=Iamax/APL,$$

and the coefficient G' calculated as above is multiplied with the compensated image data.

It is suitable that the electric power limitation unit multiplies the coefficient G' with the compensated image data, and calculates the compensated image data in which the amplitude was adjusted.

It is suitable that the electric power limitation unit multiplies the coefficient G' with the image data before the compensation is applied.

It is suitable that the electric power limitation unit has a function in which, when it is assumed that the integrated value of the input image data is APL, the reference current value is Iamax, the average current value is Ia, and the coefficient for adjusting the amplitude of the compensated image data such that the amplitude of the compensated image data corresponds to the input range of the modulation unit is G, and a coefficient which was formed by modifying the coefficient G so as to carry out the power limitation is G", $$Ia=APL \times G, \text{ and}$$

when $Ia<Iamax$, $$G''=G$$

when $Ia \geqq Iamax$, $$G''=Iamax/APL,$$

and the coefficient G" calculated as above is set as a new coefficient for adjusting the amplitude of the compensated image data, and the amplitude adjustment unit adjusts the amplitude of the compensated image data by multiplying the coefficient G".

It is suitable that the amplitude adjustment unit multiplies the coefficient G" with the compensated image data, and calculates the compensated image data in which the amplitude was adjusted.

It is suitable that the amplitude adjustment unit multiplies the coefficient G" with the image data before the compensation is applied.

It is suitable that the integration unit calculates the integrated value of the input image data in frame.

It is suitable that the reference current value is a value which is determined in advance in accordance with the power consumption of the display apparatus.

It is suitable that the reference current value is changeable by at least one unit out of the user interface unit and the external environment detection unit.

It is suitable that the compensated image data calculation unit, in consideration of the influence of the voltage drop, expands the size of the image data to be inputted to the compensated image data calculation unit to thereby calculate the compensated image data.

It is suitable that the amplitude adjustment unit detects a maximum value of an output of the compensated image data calculation unit with respect to each frame, and, in order for the maximum value to be accommodated within an upper limit of the input range of the modulation circuit, calculates a coefficient for adjusting the amplitude of the compensated image data in an accommodative manner.

It is suitable that the amplitude adjustment unit makes reference to outputs of a plurality of frames which are precedent to the current frame by the compensated image data calculation unit, and in order for those values to correspond to the input range of the modulation unit, calculates the coefficient for adjusting the amplitude of the compensated image data in an accommodative manner.

It is suitable that the coefficient for adjusting the amplitude of the compensated image data is a coefficient which always has a constant value and was determined in advance.

It is suitable that the coefficient for adjusting the amplitude of the compensated image data is a coefficient which was determined such that, in case that the value of the input image data is maximized, an output of the compensated image data calculation unit does not overflow above the input range of the modulation unit.

It is suitable that the compensated image data calculation unit has a unit which predicts and calculates, in accordance with the input image data, spatial distribution and time change of the voltage drop amount which should occur on the row wiring during 1 horizontal scanning period, and a unit which calculates the compensated image data in which compensation is applied to the input image data, from the calculated voltage drop amount.

It is suitable that the compensated image data calculation unit has a unit which discretely predicts and calculates, in accordance with the input image data, spatial distribution and time change of the voltage drop amount which should occur on the row wiring during 1 horizontal scanning period, and a unit which calculates the compensated image data in which compensation is applied to the input image data, from the calculated voltage drop amount.

It is suitable that the compensated image data calculation unit has a unit which discretely predicts and calculates, in accordance with the input image data, spatial distribution and time change of the voltage drop amount which should occur on the row wiring during 1 horizontal scanning period, a discrete compensated image data calculation unit which discretely calculates the compensated image data to the image data corresponding to time when the voltage drop was calculated, in a spatial position where the voltage drop amount was calculated, from the calculated voltage drop amount, and a compensated image data interpolation unit which interpolates an output of the discrete compensated image data calculation unit and calculates the compensated image data corresponding to a value and a horizontal display position of the input image data.

It is suitable that the compensated image data which is calculated by the compensated image data calculation unit is adjusted such that the emission charge amount of the compensated image data becomes the emission charge amount of the input image data in case that there is no voltage drop amount which should occur on the row wiring.

A embodiment which will be described below, in a display apparatus which has the compensated image data calculation unit which calculates the compensated image data as the image data in which the influence of the voltage drop was compensated, and the amplitude adjustment unit having a function for adjusting the amplitude of the compensated image data such that the amplitude of the compensated image data calculated by the compensated image data calculation unit corresponds to the input range of the modulation unit, and in which, the modulation unit sets the compensated image data in which the amplitude was adjusted by the amplitude adjustment unit as an input, and outputs a modulation signal to the column wiring, and, in case that even image data which is not 0 was inputted, a pulse-width of a pulse which is outputted from the modulation unit close to an output terminal of the scanning unit is shortened as compared with a pulse-width of a pulse which is outputted from the modulation unit far away from the output terminal of the same scanning unit, is characterized in that, an electric power value calculation unit which calculates the average current value corresponding to the light-emission luminance of the display apparatus based upon the integrated value of the input image data is provided.

(Overall Outline)

The voltage drop compensation circuit in this embodiment predicts and calculates the deterioration of the display image which occurs due to the voltage drop in accordance with the input image data, and calculates the compensation data for compensating it, and applies the compensation to the input image data.

(Explanation of Functions of a Whole System and Respective Parts)

Then, hardware of a display apparatus having a built-in compensation data calculation unit will be described.

Figure 26:
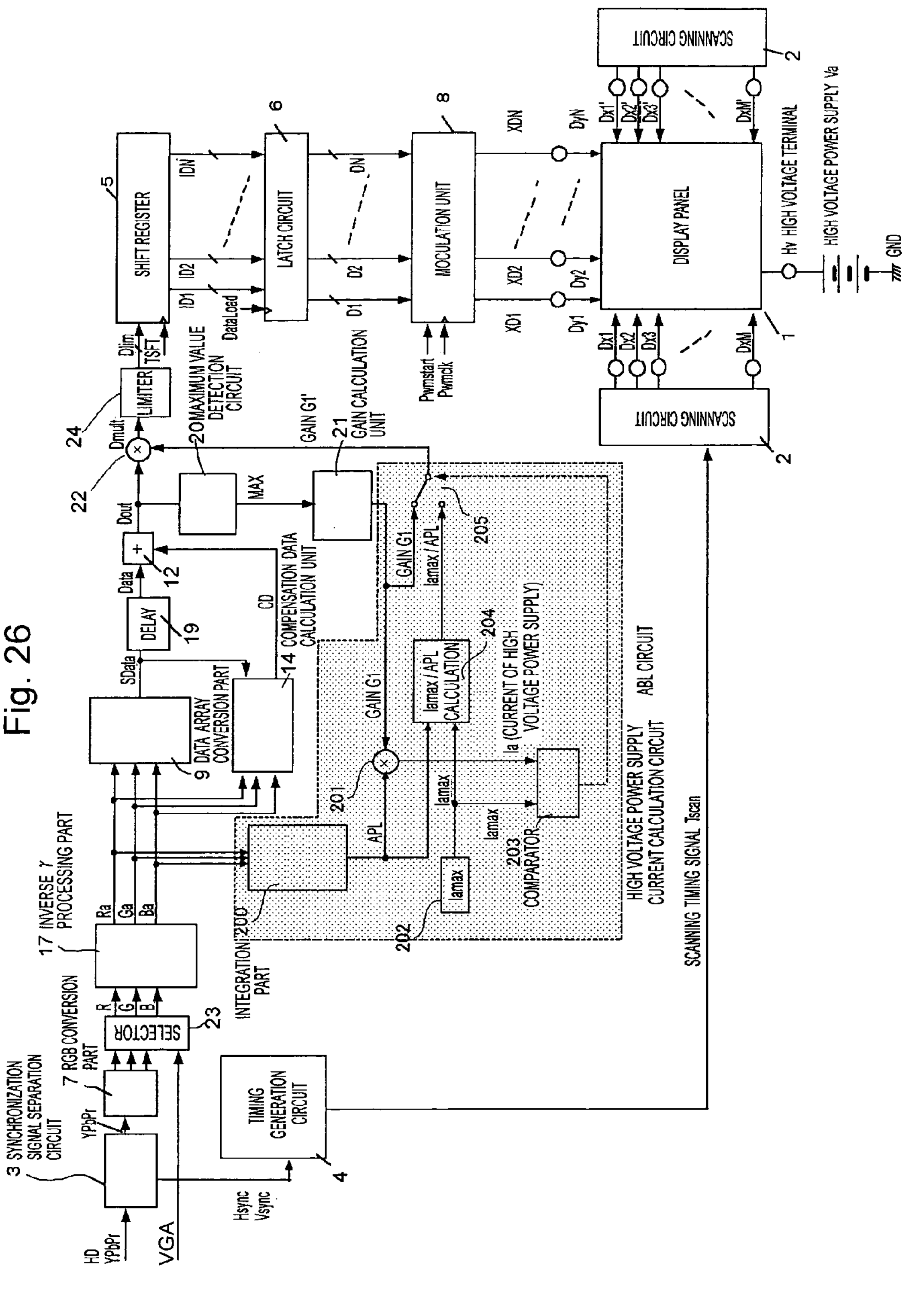
FIG. 26 is a block diagram showing a structure of a display device according to a second embodiment of the invention.

FIG. 26 is a block diagram showing an outline of its circuit structure. With regard to the same portions as the functional blocks used in the structure shown in FIG. 14, the same numerals are applied thereto, and their explanations will be omitted here. 23 designates a selector for switching an image signal of a television and an image signal of a computer, 20 designates a maximum value detection circuit, and 21 designates a gain calculation unit.

(Synchronization Signal Separation Circuit, Selector)

From an image signal of HDTV system, firstly, synchronization signals Vsync, Hsync are separated by a synchronization signal separation circuit 3, and supplied to a timing generation circuit 4. The image signal from which the synchronization signals were separated are supplied to a RGB conversion part 7. Inside of the RGB conversion part 7, besides a conversion circuit from YPbPr to RGB, not-shown low pass filter and A/D converter etc. are disposed. The RGB conversion part 7 converts YPbPr to digital RGB signals, and supplies the same to a selector 23.

An image signal such as VGA which is outputted from a computer is A/D-converted by the not-shown A/D converter, and supplied to the selector 23.

The selector 23, based upon which image signal a user wish to display, switches the television signal and the computer signal accordingly, and outputs it.

(Scanning Circuit)

Figure 27:
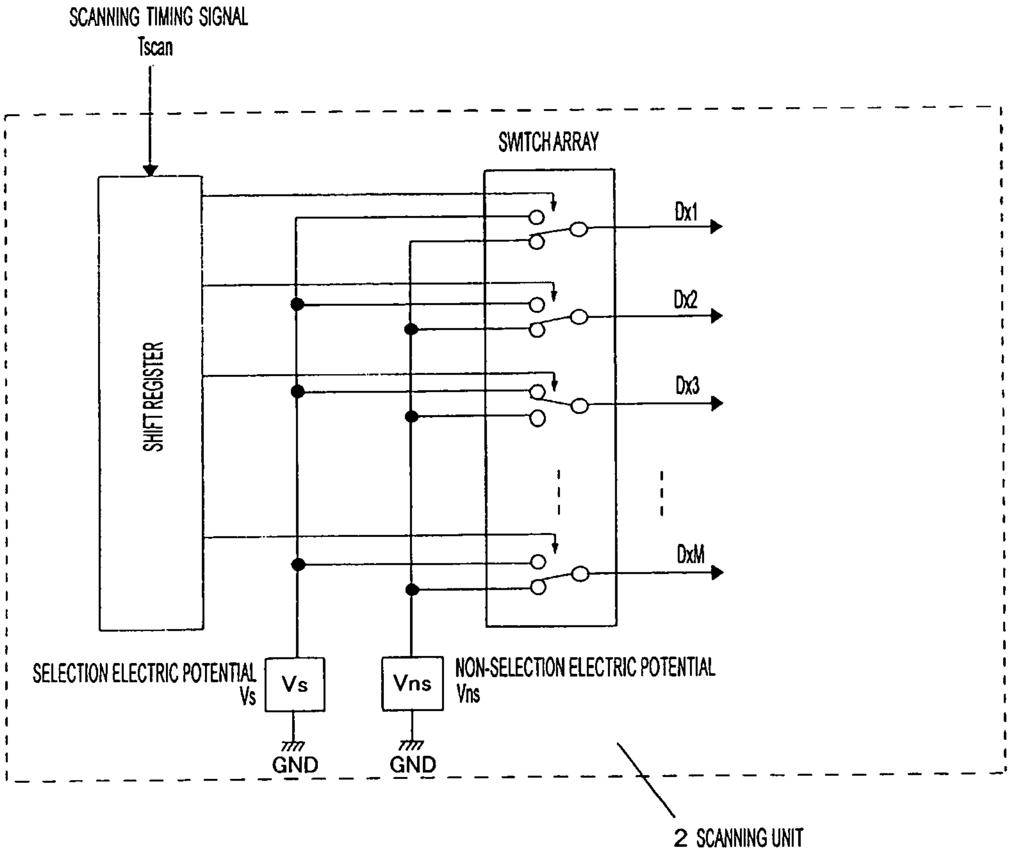
FIG. 27 is a block diagram showing a structure of a scanning circuit.

As shown in FIG. 27, the scanning circuits 2 and 2' are circuits which output the selection electric potential Vs or the non-selection electric potential Vns to the connection terminals Dx1 to DxM, in order to sequentially scan the display panel in steps of 1 line during 1 horizontal scanning period. A different point from the scanning circuit 2 and 2' shown in FIG. 15 is a point that the power supply Vs is a fixed power supply, and the selection electric potential Vs itself is a fixed value which was set in advance.

(Adder)

A basic structure of the adder 12 is the same as in the first embodiment. The compensation is applied to the image data Data, which is transferred to the maximum value detection circuit 20 and the multiplier 22 as the compensated image data Dout.

In addition, it is desirable that the number of bits of the compensated image data Dout as the output of the adder 12 is determined to prevent overflow from occurring on the occasion of adding the compensation data CD to the image data Data.

(Overflow Processing)

To realize the compensation by the compensated image data in which the calculated compensation data is added to the image data has been already described.

Now, it is assumed that the number of bits of the modulation unit 8 is 8 bits, and the number of bits of the compensated image data Dout as the output of the adder 12 is 10 bits. Whereat, if the compensated image data is connected to the input of the modulation unit 8 as it is, the overflow is to occur. Then, before inputted to the modulation unit 8, it is necessary to adjust the amplitude of the compensated image data.

As a method for preventing the overflow, there is a method in which, a maximum value of the compensated image data on the occasion of inputting an all-white pattern in which the input image data is maximized (assuming that the number of bits of the image data is 8 bits, (R, G, B)=(FFh, FFh, FFh)) is estimated in advance, and a gain which is accommodated in the input range of the modulation unit 8 is multiplied with the compensated image data. Hereinafter, this method is called as a fixed gain method.

In the fixed gain method, the overflow does not occur but, with regard to an image in which the average luminance is low, since, regardless of being capable of displaying with a larger gain, a small gain is multiplied, there is a case that the luminance of the display image becomes dark.

In contrast to this, the maximum value of the compensated image data may be detected with respect to each frame, and a gain in which this maximum value is accommodated in the input range of the modulation unit 8 may be calculated, and the gain may be multiplied with the compensated image data so that the overflow is prevented. Hereinafter, this method is called as an adaptive type gain method.

In the adaptive type gain method, it is necessary to provide a maximum value detection circuit 20 for detecting the maximum value MAX of the compensated image data Dout with respect to each frame, a gain calculation unit for calculating a gain G1 to be multiplied with the compensated image data from the maximum value, and a multiplier for multiplying the compensated image data Dout with the gain G1, etc.

In addition, in the adaptive type gain method, it is desirable that the gain for preventing the overflow is calculated in frame. For example, it is possible to prevent the overflow by calculating the gain with respect to each 1 horizontal line but, in that case, since, due to a difference of the gain with respect to each 1 horizontal line, uncomfortable feeling is generated on the display image, it is not desirable.

It has been confirmed that, even if the gain is calculated by each method of the fixed gain method and the adaptive type gain method, the amplitude of the compensated image data can be adjusted suitably.

Hereinafter, in this embodiment, a circuit structure for carrying out the amplitude adjustment (data width adjustment) of the compensated image data by the adaptive type gain method will be described in detail.

(Maximum Value Detection Circuit)

The maximum value detection circuit 20 is a unit for detecting a value which becomes the maximum in the compensated image data Dout of 1 frame portion. The same unit is a circuit which can be configured by a comparator and a register etc. The same unit is a circuit which compares a value stored in the register with the value of the compensated image data Dout which is sequentially transferred, and, in case that the value of the compensated image data Dout is larger than the value of the register, renews the value of the register with its data value. In case that the value of the register is cleared to 0 at a beginning of a frame, at the time of an end of the frame, the maximum value of the compensated image data in its frame is stored in the register.

The maximum value of the compensated image data detected in this manner is transferred to the gain calculation unit 21.

(Gain Calculation Unit)

The gain calculation unit 21 is a unit which calculates a gain for carrying out the amplitude adjustment such that the compensated image data Dout is accommodated in the input range of the modulation unit 8 based upon the adaptive type gain method.

The gain may be determined as in (Equation 20), when it is assumed that a maximum value which was detected by the maximum value detection circuit 20 is MAX, and a maximum value within the input range of the modulation unit 8 is INMAX (First method).

$$\text{Gain } G1 \leqq \text{INMAX/AMAX} \quad \text{(Equation 20)}$$

In the gain calculation unit 21, the gain is renewed during a vertical blanking period and a value of the gain is changed with respect to each 1 frame.

In addition, in the structure of this embodiment, it is configured that, by use of the maximum value of the compensated image data of a precedent frame, a gain to be multiplied with the compensated image data of a current frame is calculated. That is, through the use of correlation of the compensated image data (image data) between frames, the overflow is prevented.

Accordingly, in a narrow sense, there may be a case that the overflow occurs due to the difference of the compensated image data with respect to each frame.

In such case, a circuit may be designed such that a limiter unit is disposed to an output of the multiplier which multiplies the compensated data with the gain, and the output of the multiplier is accommodated in the input range of the modulation unit.

In addition, if a frame memory is disposed between the maximum value detection circuit 20 and the multiplier 22, it is possible to prevent the overflow by a structure in which no temporal delay occurs.

Also, the gain may be calculated by use of the following method. For example, the maximum value of the compensated image data which was detected in a frame precedent to a current frame is averaged, and by use of the averaged value AMAX, the gain G1 to be applied to the compensated image data of the current frame may be determined as in (Equation 21) (Second method).

$$\text{Gain } G1 \leqq \text{INMAX/AMAX} \quad \text{(Equation 21)}$$

Also, as a third method, the gain G1 with respect to each frame is calculated by (Equation 20), and by averaging it, a current gain may be calculated.

The second and third methods, rather than the first method, are very suitable since they have another advantage that flickers on the display image are reduced on a large scale.

In the second and third methods, when the number of frames to be averaged was studied, in case that for example 16 frames to 64 frames were averaged, a good image with less flickers was obtained.

In addition, since, even in the second and third methods, there is correlation between frames in the compensated image data, in the same manner as in the first method, a probability of occurrence of the overflow can be reduced but, it is not possible to prevent the overflow completely.

As a countermeasure for this, it is desirable that the overflow is roughly prevented by the above-described method, and a limiter is provided to an output of the multiplier 22 so that the overflow is prevented completely.

Figure 28:
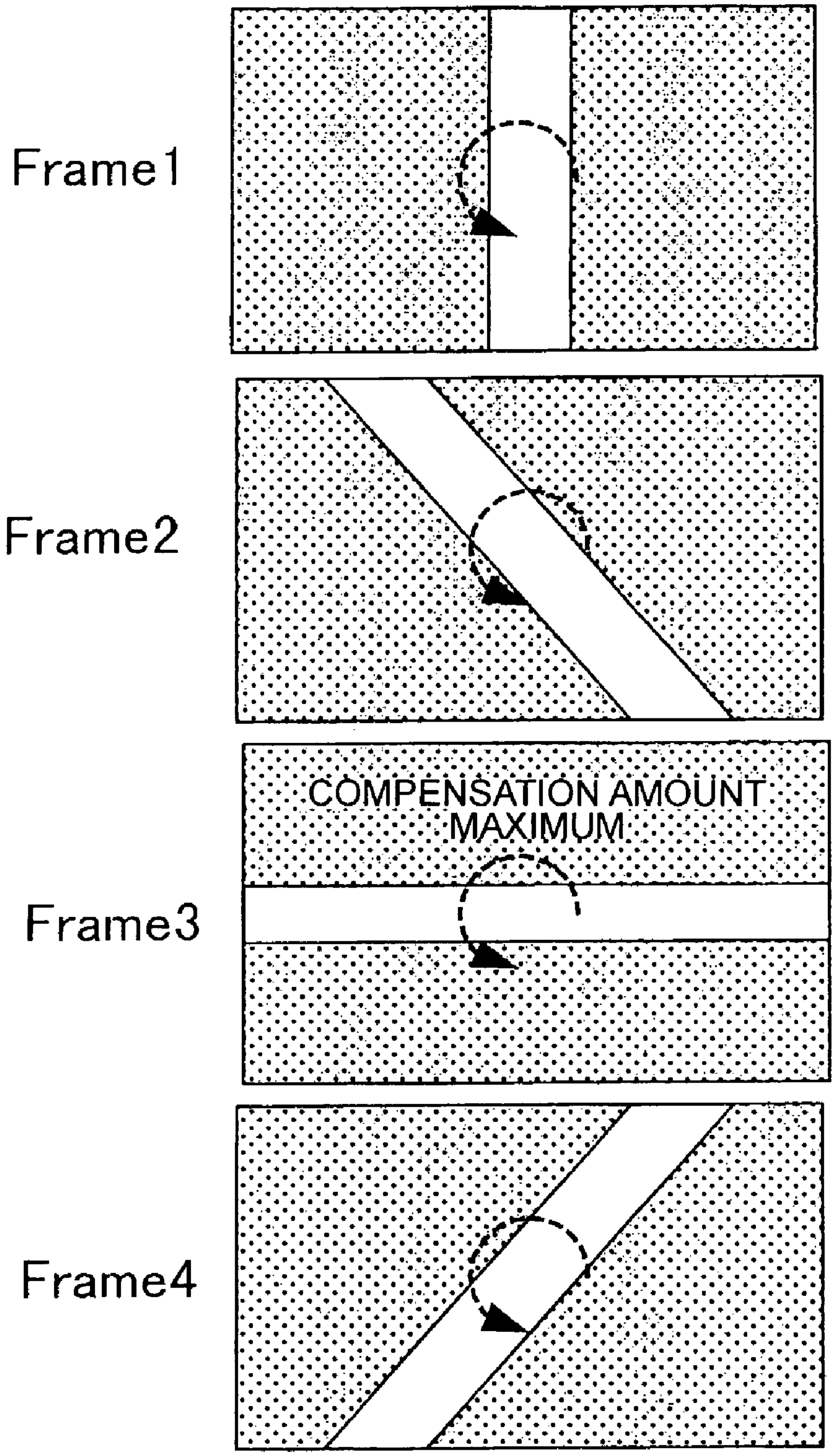
FIG. 28 is a diagram showing an example of an image of successive 4 frames.

FIG. 28 is a diagram for explaining about the flicker, by taking the first method and the second method as examples. FIG. 28 shows an example of a moving image in which a white bar rotates counterclockwise against a gray background.

In case that such image is displayed, in response to the rotation of the bar, a value of the compensation data CD is changed with respect to each frame.

Figure 29:
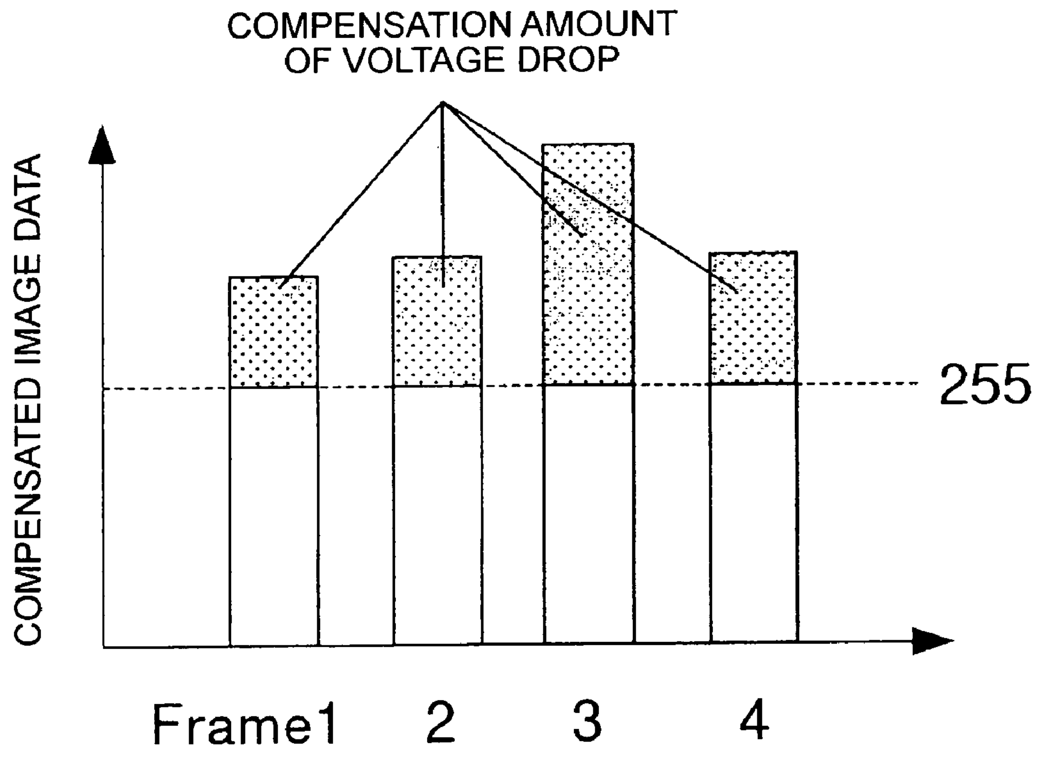
FIG. 29 is a graph showing values of image data in the successive 4 frames.

FIG. 29 is a diagram for explaining the compensated image data on the occasion of compensating such moving image. FIG. 29 is a graph which was prepared by maximum ones in respective frames which were picked up among respective compensated image data. In addition, a white portion in the same figure corresponds to original image data, and a hatched portion corresponds to a portion which was expanded by carrying out the compensation.

Figure 30A:
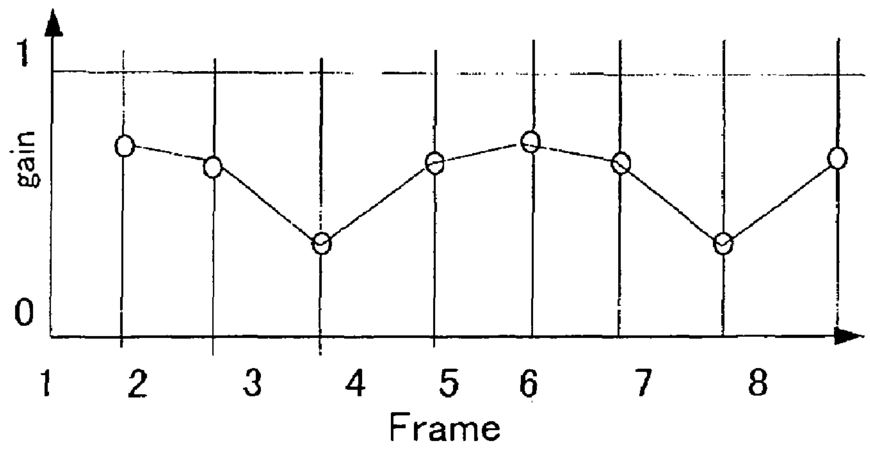
FIG. 30 is a graph showing an appearance of change of a gain in successive frames.

In case that the image shown in FIG. 28 is displayed, the maximum values of the compensated image data of successive frames fluctuate as shown in FIG. 29. Accordingly, in case that the gain is set with respect to each frame as shown in (Equation 20), fluctuation of the gain with respect to each frame gets up as shown in FIG. 30A. As a result, luminance fluctuation of the display image gets up, and flicker feeling occurs.

Figure 30B:
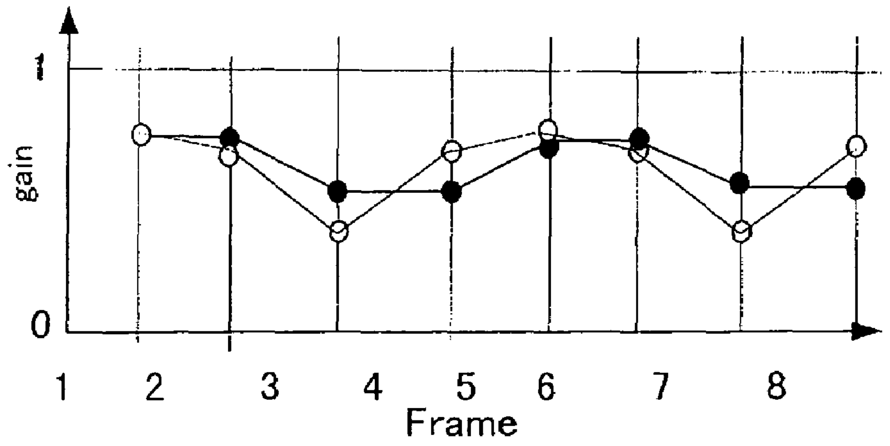

In contrast to this, in case that the gain was determined by (Equation 21), since the gain is averaged, as shown in FIG. 30A, fluctuation of the gain is lessened, and fluctuation of the luminance is reduced. Accordingly, there was an excellent advantage that the flicker feeling is reduced. In addition, in FIG. 30B, a graph of white circles shows a gain by (Equation 20), and a graph of black circles shows a gain averaged by (Equation 21).

Since the fluctuation of the gain is lessened in the third method in the same manner as in the second method, the flicker feeling is reduced.

The gain calculation unit 21, by averaging the gain, reduces the flicker feeling in images of successive scenes as described above. On the other hand, it is also desirable that, when a scene of the image was changed, the gain is changed to a gain after the scene was changed. Then, a scene switch threshold value Gth as a preset threshold value is disposed, and, assuming that the gain of the precedent frame calculated by (Equation 20) is GB, and a gain which is calculated by (Equation 20) from the maximum value of the compensated image data detected by the maximum value detection circuit 20 of the precedent frame is GN, and an absolute value of a difference of GN−GB is ΔG, a gain of a next frame is smoothed to be calculated as follows, $$\text{If } \Delta G = |GN - GB| > Gth,$$

$$\text{Gain } G1 = (GN - GB) \times A + GB$$

$$\text{If } \Delta G = |GN - GB| \leqq Gth,$$

$$\text{Gain } G1 = (GN - GB) \times B + GB$$

(However, A, B are real numbers having values of $1 \geqq A \geqq B \geqq 0$), and thereby, a good result was obtained.

In particular, as values of A and B, they are set as follows, $$A = 1,\ B = 1/16 \text{ to } 1/64$$

and thereby, it was good.

(Multiplier)

The gain G1 calculated by the gain calculation unit 21 and the compensated image data Dout as the output of the adder are multiplied with each other by the multiplier 22, and a result is, as the compensated image data Dmult in which amplitude was adjusted, transferred to a limiter circuit.

(Limiter Unit)

As described above, there is no problem if the gain can be determined such that the overflow does not occur but, according the above-described several gain deciding methods, since it is difficult to determine the gain such that the overflow does not occur without fail, it is desirable that a limiter 24 is disposed.

The limiter 24 has a preset limit value, and compares the output data Dmult inputted to the limiter with the limit value, and if the limit value is smaller than the output data, the limit value is outputted, and if the limit value is larger than the output data, the output data is outputted as it is.

The compensated image data Dlim which was completely limited to the input range of the modulation unit 8 by this means is outputted from the limiter 24, and through the shift register 5 and the latch circuit 6, inputted to the modulation unit 8.

(Luminance Control Unit)

Hereinafter, a luminance control unit comprising a high power supply current value calculation circuit and an ABL circuit will be described.

(High Voltage Power Supply Current Value Calculation Circuit)

A method for calculating a current value of the high voltage power supply (i.e., an electric power value of the high voltage power supply) by calculation of the image data in order to realize ABL etc. will be described.

In the above-described FIG. 26, 200 designates an integration part (integration unit) for integrating 1 frame portion of the image data as the luminance desired value, and 201 designates a multiplier. This integration part 200 and the multiplier 201 are the high voltage power supply current value calculation circuit as a unit for calculating a current value (Ia) of the high voltage power supply from the image data. In the same figure, the high voltage power supply current value calculation circuit was shown by yarding with a dotted line.

The unit for calculating the current value of the high voltage power supply calculates the current value (Ia) of the high voltage power supply by the following principle.

The compensation of the influence of the voltage drop on the scanning wiring in this embodiment is a compensation method of "the image data is adjusted so that it becomes emission charge amount when there is no voltage drop on the scanning wiring to obtain the compensated image data". Then, in case that a pulse width (compensated image data) exceeds horizontal scanning period, in order for a maximum value of the pulse width (compensated image data) to be accommodated within predetermined time (horizontal scanning period), for example, a gain is multiplied with the compensated image data in frame for adjustment.

To multiply the gain with the compensated image data in frame is, since the gain is multiplied with i.e., "the compensated image data which was adjusted so as to become the emission charge amount when there is no voltage drop on the scanning wiring", nothing else that electric charge amount which is emitted by respective electron-emitting devices of the display panel is of the gain times to be driven.

Therefor, in case that the influence of the voltage drop was compensated, "the value which was obtained by multiplying the integrated value of the image data with the gain" in frame corresponds to "the emission charge amount of respective electron-emitting devices in 1 frame" as it is.

Since the electric charge amount per unit time is an electric current, "the value which was obtained by multiplying the integrated value of the image data with the gain" corresponds to an average current within time assuming that 1 frame is set as the unit time, i.e., "the current value of the high voltage power supply". Also, it can be said that "the current value of the high voltage power supply" is the average current value corresponding to the light-emission luminance of the display apparatus.

In FIG. 26, the unit for calculating the current value of the high voltage power supply (current value calculation unit) carries out the integration of the image data with respect to each frame based upon the above-described principle by the integration part 200. Concretely, the integration part 200 is composed of a register and an adder with respect to each color of RGB. The integration part 200 resets the register in frame, and adds the image data to be inputted and an output of the register by the adder, and re-loads results of the addition to the register with respect to each input timing of the image data. Herewith, at completion time of 1 frame, the integrated values with respect to each color are calculated. Then, by adding the integrated values with respect to each color, the integrated value (equivalent to APL value) is calculated.

A multiplier 201 multiplies the integrated value (APL value) of the image data in frame as the output of the integration part 200 and the gain G1 for preventing the overflow to output. The output of this multiplier 201 becomes a value which corresponds to the current value (Ia) of the high voltage power supply.

For example, if the APL value when the image data is all 255 (at the all white time) is normalized to become 255, when the output (a value which corresponds to the current value of the high voltage power supply) of the multiplier 201 is 255 (the gain G1 is 1), it becomes equal to a value which is calculated by multiplying the current value of the electron-emitting device when there is no voltage drop on the scanning wiring with the number of row wiring and drive duty.

In CRTs, as a current detection unit of the high voltage power supply, there is a known method in which a resistance for current detection is attached to the high voltage power supply, and from its voltage, the current value of the high voltage power supply is found but, according to the structure of this embodiment, it is possible to precisely calculate the current value of the high voltage power supply only by calculation of data. Particularly, in realizing ABL by signal processing as described below, it is not necessary to have an analog-to-digital converter which was required in the past and wiring for outputting voltage corresponding the current value of the high voltage power supply etc., and hardware cost can be reduced.

(ABL Circuit)

Then, a method which carries out signal processing for realizing ABL will be described.

In FIG. 26, 202 designates a register which stores the limit value (Iamax) of the high voltage current, 203 designates a comparator, 204 designates a divider, and 205 designates a switch. As described above, the output of the multiplier 201 corresponds to the current value (Ia) of the high voltage power supply. In FIG. 26, the high voltage power supply current value calculation circuit (current value calculation unit) and ABL circuit (electric power limitation unit) are shown by yarding with a dotted line.

The comparator 203 compares the output (Ia: correspond to the current value of the high voltage power supply) of the multiplier 201 with the current limit value (Iamax: reference current value) of the high voltage power supply which is set in the register 202 in advance. Then, in case that the output (corresponds to the current value of the high voltage power supply) of the multiplier 201 is larger than the preset current limit value (Iamax), in order to limit the electric power of the display apparatus, new gain G1' is calculated to the gain G1 which prevents the overflow. That is, it is controlled so that a value which is found by multiplying the new gain G1' with the APL value (new current value of the high voltage power supply) becomes the current limit value (Iamax).

If the above signal processing is mathematized, it becomes as follows.

When $APL \times G1 < \text{Iamax}$, $$G1' = G1 \quad \text{(Equation 22)}$$

When $APL \times G1 \geqq \text{Iamax}$, $$G1' \times APL = \text{Iamax} \quad \text{(Equation 22)}$$

The new gain G1' is determined to meet the above equation. That is, $$G1' = \text{Iamax}/APL \quad \text{(Equation 23)}$$

By the above-described control, it became possible to limit the average current (i.e., electric power of the high voltage power supply) of the high voltage power supply of 1 frame.

In the actual structure, as shown in FIG. 26, the comparator 203 compares the output (Ia: correspond to the current value of the high voltage power supply) of the multiplier 201 with the current limit value (Iamax) of the high voltage power supply which is set in the register 202 in advance. In case of APL×G1<Iamax, the output of the comparator 203 connects an input of the switch 205 to an output of the gain calculation unit 21 to realize (Equation 22).

On the other hand, in case of APL×G1≧Iamax, the output of the comparator 203 connects the input of the switch 205 to an output of the divider 204. Since the divider 204 outputs a value which is calculated by diving the limit value (Iamax) of the high voltage current by the output of the multiplier 201, in case of APL×G1≧Iamax, (Equation 23) can be realized.

In this manner, ABL function could be realized by changing the gain G1 which prevents the overflow to the new gain G1'.

In the above embodiment, ABL operation was realized by changing the gain G1 which prevents the overflow to the new gain G1' but, as a matter of course, after the gain G1 which prevents the overflow was multiplied, further, in case of APL×G1>Iamax, 1 may be further multiplied, and in case of APL×G1≧Iamax, Iamax/(APL×G1) may be further multiplied.

In addition, in case that the compensation of the influence of the voltage drop on the scanning wiring is not carried out, since the electric charge amount which is actually emitted is changed by the voltage drop of the scanning wiring, the image data does not coincide with the electric charge amount to be emitted. Therefore, according to the signal processing of this embodiment, it is possible to carry out precise calculation of the current value of the high voltage power supply and precise ABL operation.

As above, the current value calculation method of the high voltage power supply and ABL, in case that the overflow processing was carried out, were described. Then, a case in which there is no necessity of the overflow processing, since the voltage drop amount is small or scanning period is long, will be described.

In case that there is no overflow processing, since the gain G1 is 1, (Equation 22), (Equation 23) become (Equation 24), (Equation 25).

When $\text{APL} < \text{Iamax}$, $$G1' = 1 \quad \text{(Equation 24)}$$

When $\text{APL} \geqq \text{Iamax}$, $$Gi' \times APL = \text{Iamax},$$

the new gain G1' is determined to satisfy the above equations. That is, $$G1' = \text{Iamax}/APL \quad \text{(Equation 25).}$$

In the actual structure, since the gain G1=1, in FIG. 26, it is not necessary to have the maximum value detection circuit 20, the gain calculation unit 21 and the multiplier 201. Then, the current value (Ia) of the high voltage power supply corresponds to the APL itself.

Figure 31:
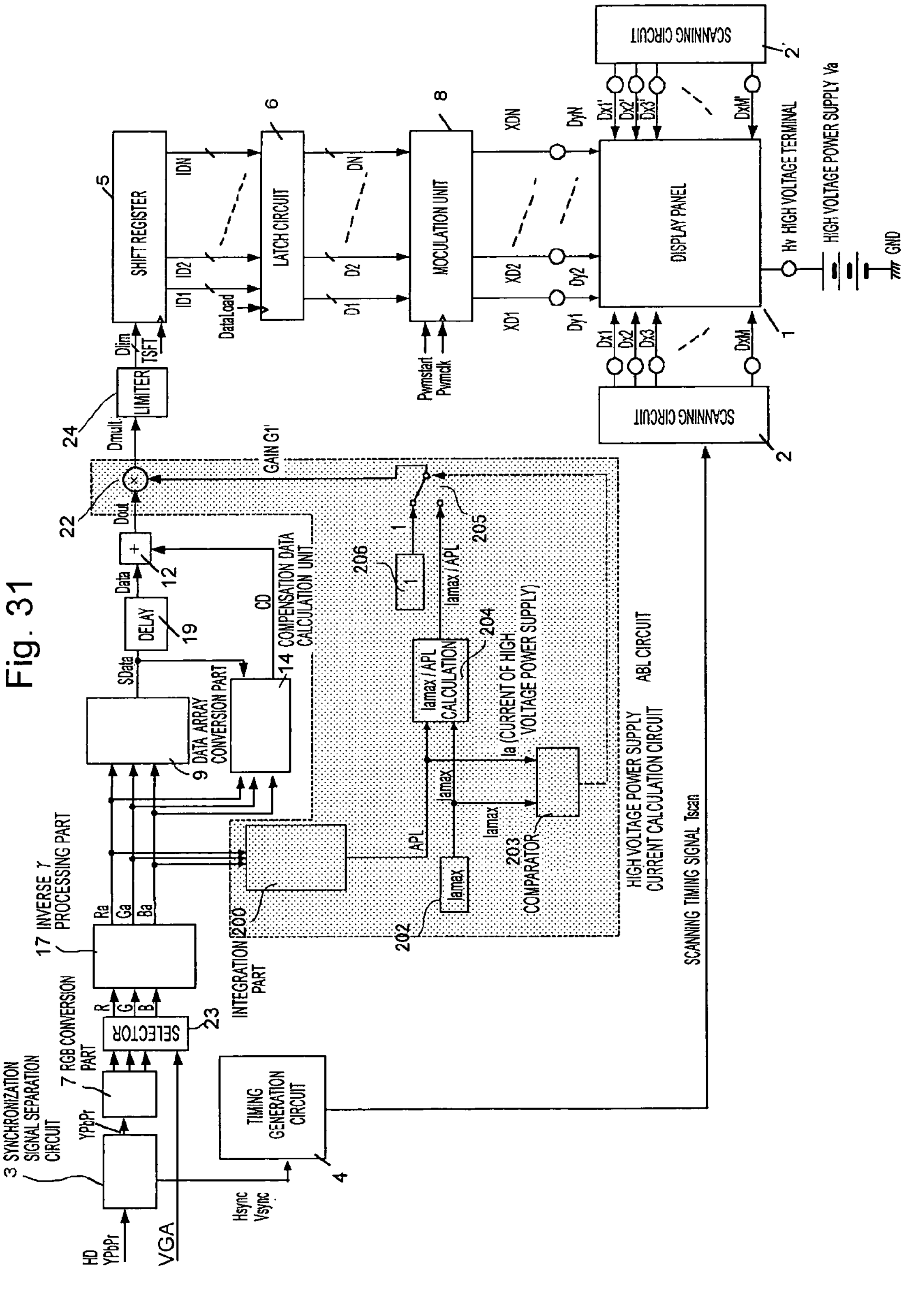
FIG. 31 is a block diagram showing a structure of a variation of the display apparatus according to the second embodiment of the invention.

A structure of a luminance control unit in case of no overflow processing is shown in FIG. 31. In case that there is the overflow processing, the multiplier 22 multiplies the coefficient for preventing the overflow. On the other hand, in case that there is no overflow processing of FIG. 31, the multiplier 22 is used for multiplying the coefficient for limiting electric power with the compensated image data. In FIG. 31, the high voltage power supply current value calculation circuit and ABL circuit were shown by yarding with a dotted line. 206 designates a register, which stores, "1" as the coefficient G1' in case of APL<Iamax. Since other operations are the same as in the case that there is the overflow processing, explanations are omitted.

By the above-described control, even in case that there is no overflow processing, the average current (i.e., electric power of the high voltage power supply) of the high voltage power supply in 1 frame can be calculated by use of the APL value, and further, the ABL operation can be carried out.

In case that the overflow processing is not carried out, the integrated value (APL value) of the image data corresponds to the current value (Ia) of the high voltage power supply as it is, and this shows that, by compensating the influence of the voltage drop on the scanning wiring, the current value (Ia) of the high voltage power supply can be calculated with good precision. That is, in case that the compensation of the influence of the voltage drop is not carried out, even if the integrated value of the image data is simply calculated, it does not correspond precisely to the current value of the high voltage power supply, which is not necessary to be said.

(Shift Resistor, Latch Circuit)

The compensated image data Dlim as outputs from the limiter 24 undergoes the serial/parallel conversion by the shift resistor 5, whereby the image data Dout changes from its serial data format into parallel image data ID1 to IDN per modulation wiring and then it is outputted to the latch circuit 6. The latch circuit 6 latches the data from the shift resistor 5 immediately before one horizontal interval is started, based on the timing signal Dataload. The outputs from the latch circuit 6 are delivered to the modulation unit 8 as parallel image data D1 to DN.

In this embodiment, the image data ID1 to IDN and D1 to DN are each composed of 8 bits. Their operation timing is based on the timing control signals TSFT and Dataload from the timing generation circuit 4 (see, FIGS. 26 and 31).

(Details of the Modulation Circuit)

The parallel image data D1 to DN outputted from the latch circuit 6 is provided to the modulation unit 8. The structure of the modulation unit 8 is same as one described above in the first embodiment.

Figure 32:
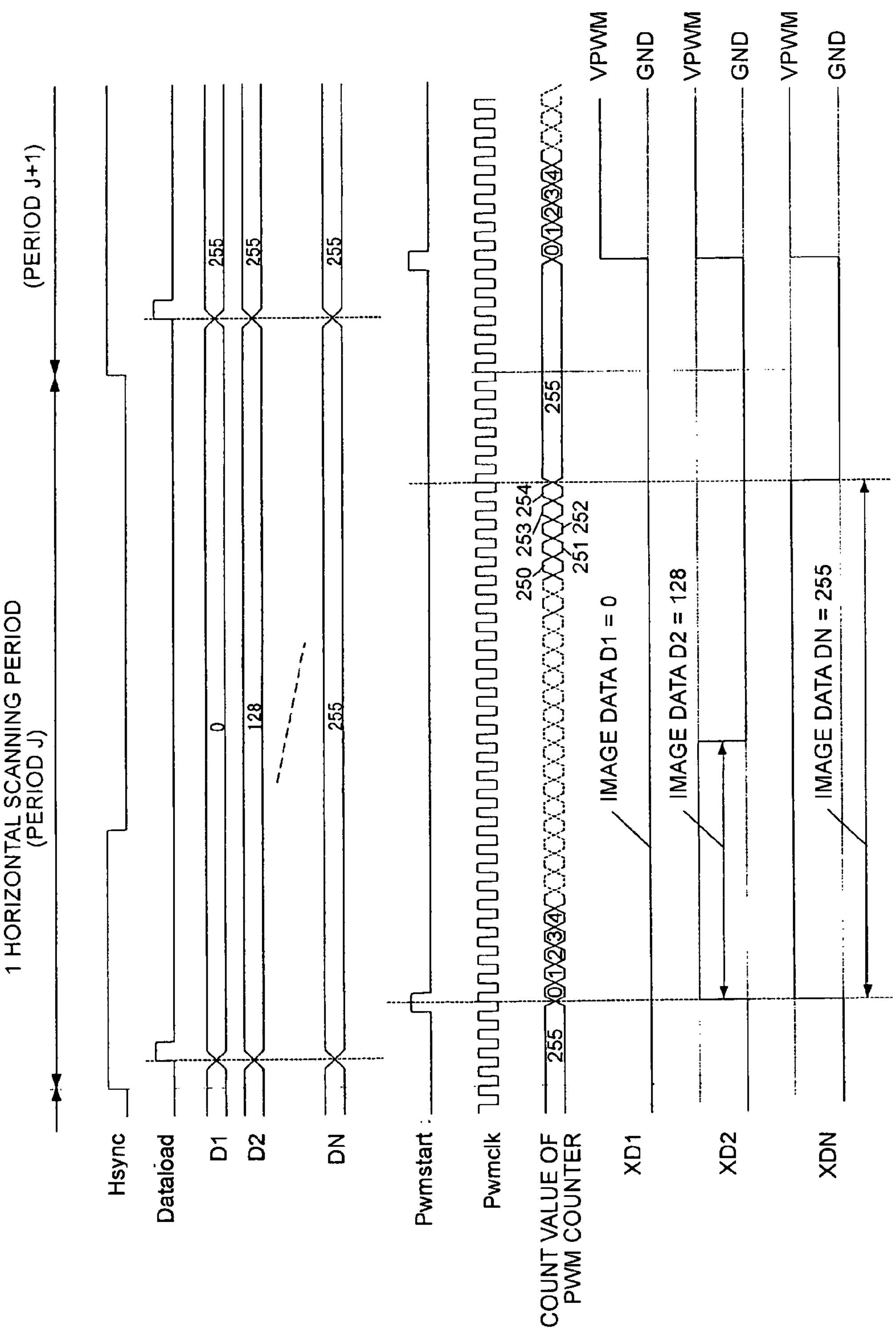
FIG. 32 is a timing chart for explaining operations of the modulation unit.

FIG. 32 is a timing chart showing the operation of the modulation unit 8 according to the present invention. In FIG. 32, Hsync denotes a horizontal synchronization signal; Dataload denotes a load signal provided to the latch circuit 6; D1 to DN denote the input signals to columns 1 to N of the modulation unit 8 described above; Pwmstart denotes a synchronization clear signal for the PWM counter; and Pwmclk denotes a clock of the PWM counter. Further, XD1 to XDN represent outputs of the modulation unit 8 pertaining to columns 1 to N.

As shown in FIG. 32, when one horizontal scanning period starts, the latch circuit 6 latches the image data and transfers the data to the modulation unit 8.

The PWM counter starts the count based on the Pwmstart and the Pwmclk, and when the count value reaches 255, it stops the counter and holds the value 255.

The comparator provided to each of the columns compares the counter value of the PWM counter and the image data from each of the columns. When the value of the PWM counter is greater than the image data, it outputs "High", and it outputs "Low" during all the other periods.

The comparator output is connected to the gate of the switch at each column. While the comparator output is "Low", the switch on a VPWM side shown in FIG. 18A is turned "ON", and the switch on a GND side is turned "OFF", so that the modulation wiring connects to the voltage VPWM. In contrast, while the comparator output is "High", the switch on the VPWM side in FIG. 18A is turned "OFF", and the switch on the GND side is turned "ON", so that the voltage in the modulation wirings connects with the ground potential.

Each part operates as described above, whereby the pulse-width modulation signal outputted by the modulation unit 8 exhibits the waveform with the synchronized rising edge of the pulse as shown in D1, D2 and DN in FIG. 32.

(Compensation Data Calculation Unit)

Figure 33:
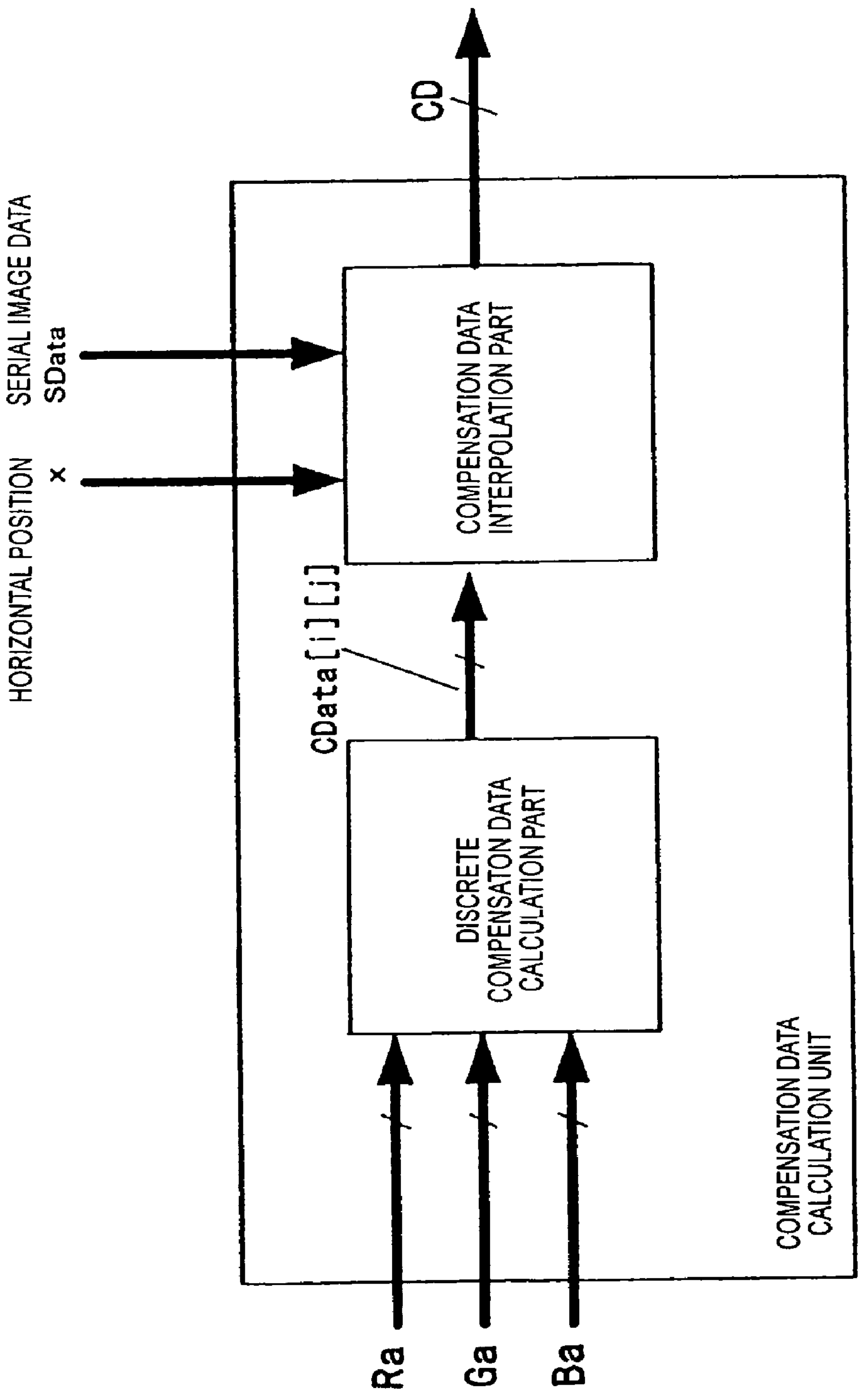
FIG. 33 is a block diagram showing a structure of a compensation data calculation unit.

The compensation data calculation circuit 14 is a circuit which calculates the compensation data of the voltage drop by the above-described compensation data calculation method. The compensation data calculation unit 14 is, as shown in FIG. 33, composed of two blocks of a discrete compensation data calculation part and a compensation data interpolation part.

(Discrete Compensation Data Calculation Part)

FIG. 34 shows the discrete compensation data calculation part for calculating the compensation data discretely.

The discrete compensation data calculation part is of a structure that the register 113 and the table memory 3(112) were omitted from the structure shown in FIG. 22. Then, that is a unit which realizes a function as the voltage drop amount calculation part for dividing the image data into blocks, calculating the statistical amount (the number of lighting) with respect to each block, and calculating the temporal change of the voltage drop at respective node positions from the statistical amount, a function for converting the voltage drop amount with respect to each time into the light-emission luminance amount, a function for integrating the light-emission luminance amount in the time direction and calculating the total light-emission luminance amount, and a function for calculating the compensation data to the reference value of the image data.

Operations of respective blocks are substantially the same as in the structure of FIG. 22.

(Compensation Data Interpolation Part)

The compensation data interpolation part has the same structure as in the first embodiment shown in FIG. 23. The linear approximation unit-a 120 is also the same as in the first embodiment.

(Operational Timings of Respective Parts)

A timing chart of operational timings of respective parts is substantially the same as one shown in FIG. 25. A different point is a point that the output Dout in FIG. 25 is replaced by the output Dlim of the limiter 24.

At the adder 12, the image data Data and the compensation data CD are added together one after the other, and then the compensated image data Dlim is forwarded to the shift register 5. The shift register 5 stores the compensated image data Dlim for one horizontal interval in accordance with TSFT, and also performs the serial/parallel conversion and outputs the parallel image data ID1 to IDN to the latch circuit 6. The latch circuit 6 latches the parallel image data ID1 to IDN from the shift register 5 in correspondence with the rising edge of the Dataload signal, and then transfers the latched image data D1 to DN to the pulse width modulation unit 8.

Third Embodiment

In order to prevent the overflow, in the second embodiment, the maximum value of the compensated image data was detected, and in order for the maximum value to correspond to the maximum value of the input range of the modulation unit, the gain was calculated, and the gain was multiplied with the compensated image data, and thereby, the overflow was prevented.

In contrast to this, in a third embodiment, to detect the maximum value of the compensated image data is the same but, in order for the maximum value to correspond to the maximum value of the input range of the modulation unit, a value of the image data before the compensation is applied is made to be limited. That is, in order to prevent the overflow, the gain is multiplied with the image data which was inputted in advance to lessen its amplitude range, and thereby, the overflow is prevented.

Hereinafter, by use of FIG. 35, the overflow processing of this embodiment will be described.

Figure 35:
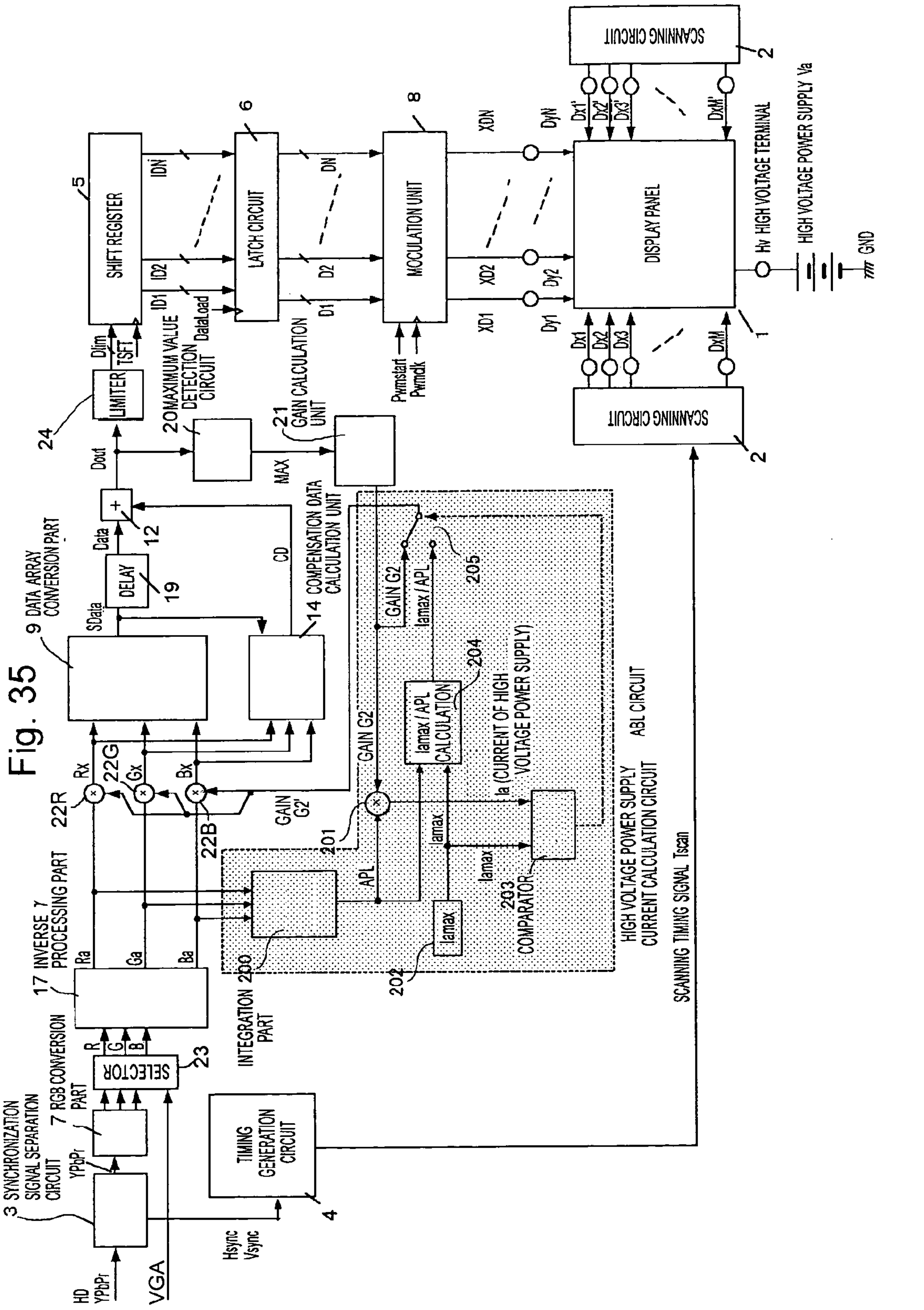
FIG. 35 is a block diagram showing a structure of a display apparatus according to a third embodiment of the invention.

In FIG. 35, 22R, 22G, 22B designate multipliers, 9 designates a data array conversion part, 5 designate a shift register for 1 line of the image data, 6 designates a latch circuit for 1 line of the image data, 8 designates a pulse-width modulation unit for outputting a modulation signal to a modulation wiring of a display panel, 12 designates an adder, 14 designates a compensation data calculation unit, 20 designates a maximum value detection circuit (maximum value detection unit) for detecting the maximum value of the compensated image data Dout within the frame, and 21 designates a gain calculation unit.

Also, R, G, and B designate parallel input image data, Ra, Ga, and Ba designate RGB parallel image data to which the inverse γ conversion processing was applied, Rx, Gx, and Bx designate image data with which a gain G2 was multiplied by the multiplier, the gain G2 is a gain which the gain calculation unit 21 calculated, Data designates image data which was parallel/serial-converted by the data array conversion part 9, CD designates compensation data which was calculated by the compensation data calculation part 14, Dout designates image data compensated (compensated image data) by adding the compensation data to the image data by the adder 12, Dlim designates image data in which Dout was limited below the upper limit of the modulation unit 8 by the limiter 24.

(Multiplier)

The multipliers 22R, 22G, and 22B are units for multiplying the image data Ra, Ga, and Ba after the inverse γ conversion with the gain G2.

More concretely, the multipliers 22R, 22G, and 22B, in accordance with the gain which was determined by the gain calculation unit 21, multiply the image data Ra, Ga, and Ba with the gain G2, and output the image data Rx, Gx, and Bx after the multiplication.

The gain G2 is a value which the gain calculation unit 21 calculates, and a value which is determined so that the compensated image data Dout as the addition result of the image data Data the compensation data by the adder 12 as described later are maintained within the input range of the modulation unit 8.

(Maximum Value Detection Circuit)

The maximum value detection circuit 20 is, as shown in FIG. 35, connected to respective parts.

The maximum value detection circuit 20 is a unit for detecting a value which becomes the maximum in the compensated image data Dout of 1 frame portion. The same unit is a circuit which can be configured by a comparator and a register etc. The same unit is a circuit which compares a value stored in the register with the value of the compensated image data Dout which is sequentially transferred, and, in case that the value of the compensated image data Dout is larger than the value of the register, renews the value of the register with its data value. In case that the value of the register is cleared to 0 at a beginning of a frame, at the time of an end of the frame, the maximum value of the compensated image data in its frame is stored in the register.

The maximum value of the compensated image data detected in this manner is transferred to the gain calculation unit 21.

(Gain Calculation Unit)

The gain calculation unit 21 is a unit which makes reference to the detected value MAX of the maximum value detection circuit 20, and calculates the gain so that the compensated image data Dout is maintained within the input range of the modulation unit 8. Also, in this embodiment, the gain calculation unit 21 calculates the gain for adjusting the amplitude of the compensated image data based upon the adaptive type gain method. Additionally, in the structure of this embodiment, the gain may be calculated by use of the fixed gain method.

The gain G2, when it is assumed that the maximum value which was detected by the maximum value detection circuit 20 is MAX, the maximum value within the input range of the modulation unit 8 is INMAX, and the gain which was calculated by the gain calculation unit 21 to a precedent frame is GB, may be determined as in (Equation 26).

$$\text{Gain } G2 \leqq (\text{INMAX}/\text{MAX}) \times GB \qquad \text{(Equation 26)}$$

In the gain calculation unit 21, the gain is renewed in the vertical blanking period, and a value of the gain is changed with respect to each frame.

In addition, here, it is configured that, by use of the maximum value of compensated image data of a precedent frame, a gain to be multiplied with compensated image data of a current frame is calculated. That is, it is configured that, by utilizing correlation of compensated image data (image data) between frames, the overflow is prevented.

Accordingly, in a narrow sense, there may be a case that the overflow occurs due to a difference of compensated image data with respect to each frame.

In such a case, the limiter unit may be provided to the output of the multiplier which calculates the compensated image data and the gain, and a circuit may be designed so as for the output of the multiplier to be surely accommodated within the input range of the modulation unit.

Also, the inventors confirmed that, besides the above-described gain determining method, the gain may be calculated by use of the following another methods.

For example, the maximum value of the compensated image data which was detected in a frame precedent to the current frame may be averaged, and by use of the averaged value AMAX, the gain G2 which is applied to the compensated image data of the current frame may be determined as in (Equation 27). However, GB designates the gain G2 which was calculated by the gain calculation unit 21 to the precedent frame.

$$\text{Gain } G2 \leqq (\text{INMAX}/\text{AMAX}) \times GB \qquad \text{(Equation 27)}$$

Also, as another method, the gain G2 may be calculated with respect to each frame by use of (Equation 26), and they may be averaged and a current gain may be calculated.

Any method among these 3 methods is desirable in the sense of preventing the overflow but, considering occurrence of the flickers, it is desirable to calculate it by use of the method of (Equation 27).

In the gain calculation method of (Equation 27), when the number of frames averaging the maximum values of the compensated image data was studied, in case that for example maximum values of compensated image data of precedent 16 frames to 64 frames to a current frame were averaged, a good image with less flickers was obtained.

In addition, also in this method, as shown in FIG. 35, it is, needless to say, desirable that the limiter 24 for limiting the output of the adder 12 is provided so that the overflow is prevented completely.

Also, a method of calculating the gain may be changed by detecting the scene change, in the same manner as in the second embodiment.

Then, a luminance control unit will be described but, a basic structure is the same as one shown in FIG. 26.

A unit which calculates the current value of the high voltage power supply is composed of, in the same manner as in the second embodiment, the integration part 200 and the multiplier 201. In this embodiment, the current value of the high voltage power supply is calculated by multiplying the integrated value of the image data which was integrated by the integration part 200 with the gain G2 for preventing the overflow (see, FIG. 35).

Since the principle and structure of the high voltage power supply current value calculation circuit are the same as in the second embodiment, descriptions are omitted.

According to this embodiment, the current value of the high voltage power supply can be calculated only by calculation of data, and hardware cost can be reduced.

(ABL Circuit)

Then, in FIG. 35, a method of carrying out signal processing for realizing ABL will be described.

In FIG. 35, 200 designates an integration part (integration unit) for integrating 1 frame portion of the image data as the luminance desired value, 201 designates a multiplier, 202 designates a register which stores the limit value (Iamax) of the high voltage current, 203 designates a comparator, 204 designates a divider, and 205 designates a switch. As described above, the output of the multiplier corresponds to the current value (Ia) of the high voltage power supply. In FIG. 35, the high voltage power supply current value calculation circuit (current value calculation unit) and ABL circuit (electric power limitation unit) are shown by yarding with a dotted line.

The comparator 203 compares the output (Ia: correspond to the current value of the high voltage power supply) of the multiplier 201 with the current limit value (Iamax: reference current value) of the high voltage power supply which is set in the register 202 in advance. Then, in case that the output (corresponds to the current value of the high voltage power supply) of the multiplier 201 is larger than the preset current limit value (Iamax), in order to limit the electric power of the display apparatus, new gain G2' is calculated to the gain G2 which prevents the overflow. That is, it is controlled so that a value which is found by multiplying the new gain G2' with the APL value (new current value of the high voltage power supply) becomes the current limit value (Iamax).

If the above signal processing is mathematized, it becomes as follows.

When APL×G2<Iamax, $$G2'=G2 \quad \text{(Equation 28)}$$

When PL×G2≧Iamax, $$G2' \times APL = \text{Iamax}$$

The new gain G2' is determined to meet the above equation. That is, $$G2' = \text{Iamax}/APL \quad \text{(Equation 29)}$$

By the above-described control, it became possible to limit the average current (i.e., electric power of the high voltage power supply) of the high voltage power supply of 1 frame.

In the actual structure, as shown in FIG. 35, the comparator 203 compares the output (Ia: correspond to the current value of the high voltage power supply) of the multiplier 201 with the current limit value (Iamax) of the high voltage power supply which is set in the register 202 in advance. In case of APL×G2<Iamax, the output of the comparator 203 connects an input of the switch 205 to an output of the gain calculation unit 21 to realize (Equation 28).

On the other hand, in case of APL×G2≧Iamax, the output of the comparator 203 connects the input of the switch 205 to an output of the divider 204. Since the divider 204 outputs a value which is calculated by diving the limit value (Iamax) of the high voltage current by the output of the multiplier 201, in case of APL×G2≧Iamax, (Equation 29) can be realized.

In this manner, ABL function could be realized by changing the gain G2 which prevents the overflow to the new gain G2'.

As above, the current value calculation method of the high voltage power supply and ABL, in case that the overflow processing was carried out, were described. Then, a case in which there is no necessity of the overflow processing, since the voltage drop amount is small or scanning period is long, will be described.

In case that there is no overflow processing, since the gain G2 is 1, (Equation 28), (Equation 29) become (Equation 30), (Equation 31).

When APL<Iamax, $$G2'=1 \quad \text{(Equation 30)}$$

When APL≧Iamax, $$G2' \times APL = \text{Iamax},$$

the new gain G2' is determined to satisfy the above equations. That is, $$G2' = \text{Iamax}/APL \quad \text{(Equation 31).}$$

In the actual structure, since the gain G2=1, in FIG. 35, it is not necessary to have the maximum value detection circuit 20, the gain calculation unit 21 and the multiplier 201. Then, the current value (Ia) of the high voltage power supply corresponds to the APL itself.

Figure 36:
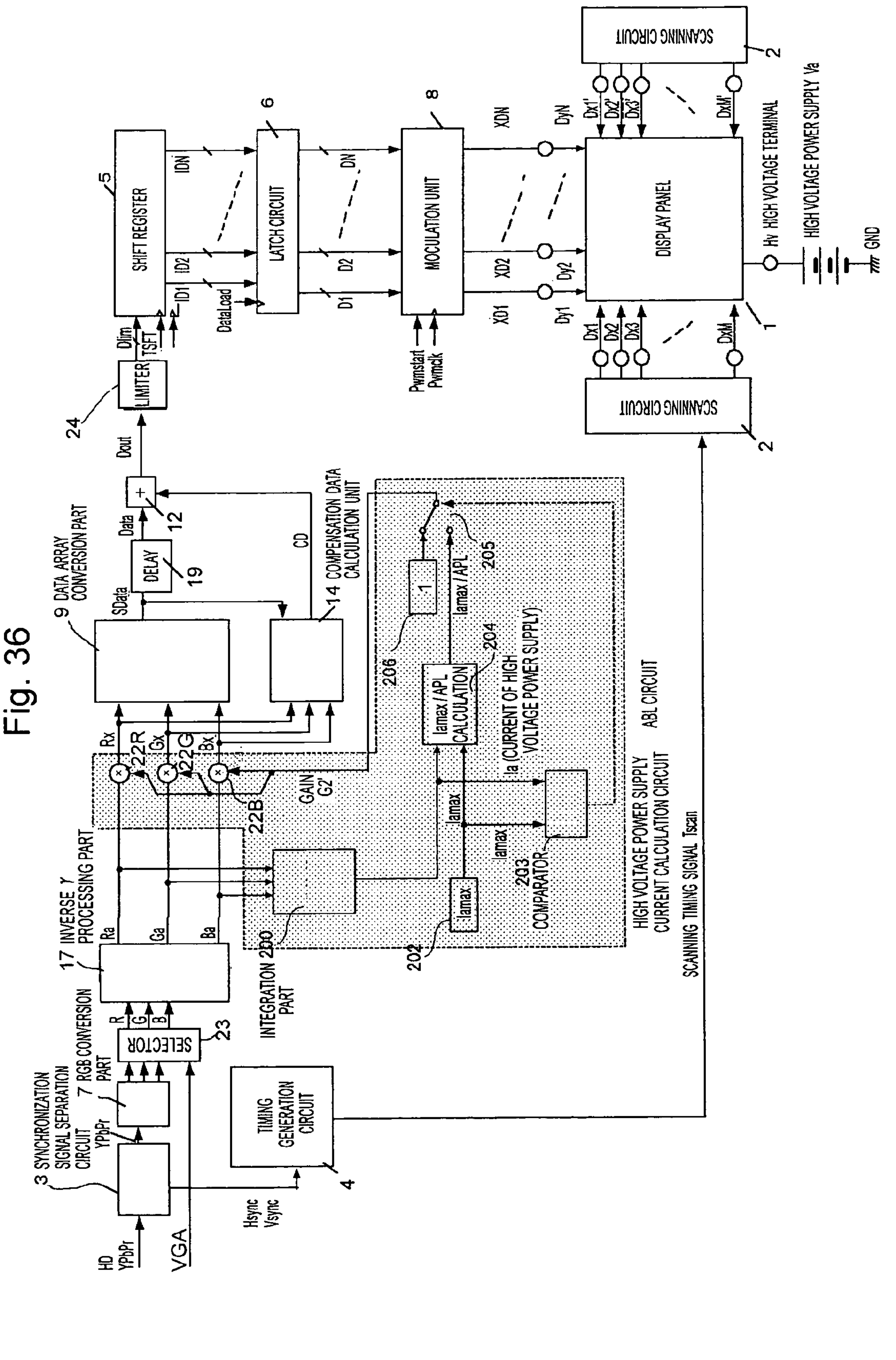
FIG. 36 is a block diagram showing a structure of a variation of the display apparatus according to the third embodiment of the invention.

A structure of a luminance control unit in case of no overflow processing is shown in FIG. 36. In case that there is the overflow processing, the multipliers 22R, 22G and 22B multiply the coefficients for preventing the overflow. On the other hand, in case that there is no overflow processing of FIG. 36, the multipliers 22R, 22G and 22B are used for multiplying the coefficient for limiting electric power with the compensated image data. In FIG. 36, the high voltage power supply current value calculation circuit and ABL circuit were shown by yarding with a dotted line 206 designates a register, which stores "1" as the coefficient G2' in case of APL<Iamax. Since other operations are the same as in the case that there is the overflow processing, explanations are omitted.

By the above-described control, even in case that there is no overflow processing, the average current (i.e., electric power of the high voltage power supply) of the high voltage power supply in 1 frame can be calculated by use of the APL value, and further, the ABL operation can be carried out.

In case that the overflow processing is not carried out, the integrated value (APL value) of the image data corresponds to the current value (Ia) of the high voltage power supply as it is, and this shows that, by compensating the influence of the voltage drop on the scanning wiring, the current value (Ia) of the high voltage power supply can be calculated with good precision. That is, in case that the compensation of the influence of the voltage drop is not carried out, even if the integrated value of the image data is simply calculated, it does not correspond precisely to the current value of the high voltage power supply, which is not necessary to be said.

Additionally, in the third embodiment, in the same manner as in the second embodiment, in case that the compensation of influence of the voltage drop on the scanning wiring is not carried out, since actually emission charge amount varies due to the voltage drop on the scanning wiring, the image data does not coincide with the electric charge amount to be emitted. Therefore, it is not possible to carryout precise calculation of the current value of high voltage power supply and precise ABL operation by use of the signal processing of this embodiment.

Then, a method of determining the current limit value (Iamax) of the high voltage power supply which is set in advance, in the second and third embodiments will be described.

(1) Determined from Electric Power of the Display Apparatus

From a maximum power consumption specification of the display apparatus, a maximum power consumption specification of the high voltage power supply is determined. Then, by dividing a maximum power value of the high voltage power supply by voltage of the high voltage power supply, the current limit value (Iamax) is determined. Then, the value is stored in the register 202.

(2) User Determines

From a maximum power consumption specification of the display apparatus, a maximum power consumption specification of the high voltage power supply is determined. Further, a maximum power consumption specification (energy-saving mode) which is smaller than the above specification is determined. Then, the current limit values (referred to as Iamax1, Iamax2) of the high voltage power supply which correspond to them, respectively are calculated in advance by use of the above-described method, and stored in a memory which is disposed inside of a not-shown controller.

A user, by use of a user interface unit (e.g., remote controller), can select a normal mode and the energy-saving mode. The controller makes reference to the memory disposed inside, and writes in the register 202 so that the current limit value becomes Iamax1 in case of the normal mode, and writes in the register 202 so that the current limit value becomes Iamax2 in case of the energy-saving mode.

(3) Determined by an External Environment

From a maximum power consumption specification of the display apparatus, a maximum power consumption specification of the high voltage power supply is determined. Also, further, a second maximum power consumption specification (dark place mode) which is smaller than the above specification is determined. Then, the current limit values (referred to as Iamax3, Iamax4) of the high voltage power supply which correspond to them, respectively are calculated in advance by use of the above-described method, and stored in a memory which is disposed inside of a not-shown controller.

The controller has a not-shown illumination sensor, and when an environment is bright, makes reference to the memory disposed inside and writes in the register 202 so that the current limit value becomes Iamax3, and writes in the register 202 so that the current limit value becomes Iamax4 when the environment is dark.

As above, the current limit value (Iamax) of the high voltage power supply, in the second and third embodiments can be determined. In particular, by the method of (2) or (3), or combination of (2) and (3), it becomes possible to further suppress electric power for displaying. Also, these methods are applicable to the above-described first embodiment.

According to this embodiment, an image can be displayed with high grade, by multiplying the gain such that the image data after compensation does not overflow the input range of the modulation unit. Further, the integration result of the input image data and the gain are multiplied with each other to detect the current value of the high voltage power supply, precise ABL operation could be carried out with less hardware.

Fourth Embodiment

A display apparatus of this embodiment has an amplitude adjustment unit having a function of multiplying a coefficient for adjusting the amplitude of the compensated image data such that the amplitude of the compensated image data corresponds to the input range of the modulation unit. Also, it has a current value calculation unit for calculating an average current value which corresponds to the light-emission luminance of the display apparatus based upon the integrated value of the input image data as the luminance desired value and the coefficient, and a drive condition change unit for changing a driving condition of the electron-emitting device based upon the average current value and a predetermined reference current value.

It is suitable that the current value calculation unit has an integration unit for integrating the input image data, and sets a result of multiplication of the output of the integration unit and the coefficient as the average current value corresponding to the light-emission luminance of the display apparatus.

It is suitable that the drive condition change unit compares the average current value with the reference current value, and in case that the average current value is larger than the reference current value, determines a drive voltage for limiting electric power relating to the light-emission luminance of the display apparatus.

It is suitable that the drive condition change unit determines the drive voltage such that the average current value does not exceed the reference current value.

It is suitable that the drive condition change unit has a function of changing calculation parameters which are used for calculation of the compensated image data.

It is suitable that the reference current value is determined in a manufacturing stage in advance, or, changeable by at least one unit out of the user interface unit and the external environment detection unit.

It is suitable that the amplitude adjustment unit detects a maximum value of an output of the compensated image data calculation unit with respect to each frame, and, in order for the maximum value to be accommodated within an upper limit of the input range of the modulation circuit, calculates a coefficient for adjusting the amplitude of the compensated image data in an accommodative manner.

It is suitable that the amplitude adjustment unit makes reference to an output of the compensated image data calculation unit relating to a plurality of frames which are precedent to the current frames, and in order for those values to correspond to the input range of the modulation unit, calculates the coefficient for adjusting the amplitude of the compensated image data in an accommodative manner.

It is suitable that the coefficient for adjusting the amplitude of the compensated image data is a coefficient which always has a constant value and was determined in advance.

It is suitable that the coefficient for adjusting the amplitude of the compensated image data is a coefficient which was determined such that, in case that the input image data is maximized, an output of the compensated image data calculation unit does not overflow above the input range of the modulation unit.

It is suitable that the compensated image data calculation unit has a unit which predicts and calculates, in accordance with the input image data, spatial distribution and time change of the voltage drop amount which should occur on the row wiring during 1 horizontal scanning period, and a unit which calculates the compensated image data in which compensation is applied to the input image data, from the calculated voltage drop amount.

It is suitable that the compensated image data calculation unit has a unit which discretely predicts and calculates, in accordance with the input image data, spatial distribution and time change of the voltage drop amount which should occur on the row wiring during 1 horizontal scanning period, and a unit which calculates the compensated image data in which compensation is applied to the input image data, from the calculated voltage drop amount.

It is suitable that the compensated image data calculation unit has a unit which discretely predicts and calculates, in accordance with the input image data, spatial distribution and time change of the voltage drop amount which should occur on the row wiring during 1 horizontal scanning period, a discrete compensated image data calculation unit which discretely calculates the compensated image data to the image data corresponding to time when the voltage drop was calculated, in a spatial position where the voltage drop amount was calculated, from the calculated voltage drop amount, and a compensated image data interpolation unit which interpolates an output of the discrete compensated image data calculation unit and calculates the compensated image data corresponding to a value and a horizontal display position of the input image data.

It is suitable that the compensated image data which is calculated by the compensated image data calculation unit is adjusted such that the emission charge amount of the compensated image data becomes the emission charge amount of the input image data in case that there is no voltage drop amount which should occur on the row wiring.

It is suitable that the drive condition change unit is one which changes the drive voltage of display devices as a drive condition, and its drive voltage is voltage which is determined by the selection electric potential which is outputted from the scanning unit, an electric potential which is outputted from the modulation unit or an electric potential of the high voltage generation unit, or combination of these electric potentials.

Also, in a display apparatus which has the compensated image data calculation unit which calculates the compensated image data as the image data in which the influence of the voltage drop which is caused by a resistance portion of the scanning line and unit was compensated, and the amplitude adjustment unit having a function for multiplying the coefficient for adjusting the amplitude of the compensated image data such that the amplitude of the compensated image data corresponds to the input range of the modulation unit, and in which, the modulation unit sets the compensated image data in which the amplitude was adjusted by the amplitude adjustment unit as an input, and outputs a modulation signal to the column wiring, and, in case that even image data which is not 0 was inputted, a pulse-width of a pulse which is outputted from the modulation unit close to an output terminal of the scanning unit is shortened as compared with a pulse-width of a pulse which is outputted from the modulation unit far away from the output terminal of the same scanning unit, it is suitable to have a current value calculation unit for calculating the average current value which corresponds to the light-emission luminance of the display apparatus based upon the integrated value of the input image data, and a drive condition change unit for changing the drive condition of the electron-emitting device based upon the average current value and the predetermined reference current value.

It is suitable that the drive condition change unit compares the average current value with the reference current value, and in case that the average current value is larger than the reference current value, determines the drive voltage for limiting electric power relating to the light-emission luminance of the display device.

It is suitable that the drive condition change unit, in case that the average current value is larger than the reference current value, lessens an absolute value of at least one out of electric potentials which constitute the conditions for determining the drive voltage, such as the selection electric potential which is outputted from the scanning unit, the electric potential which is outputted from the modulation unit, and the electric potential of the high voltage generation unit.

With regard to the luminance control unit according to this embodiment, its characteristic structure will be described in detail.

Figure 37:
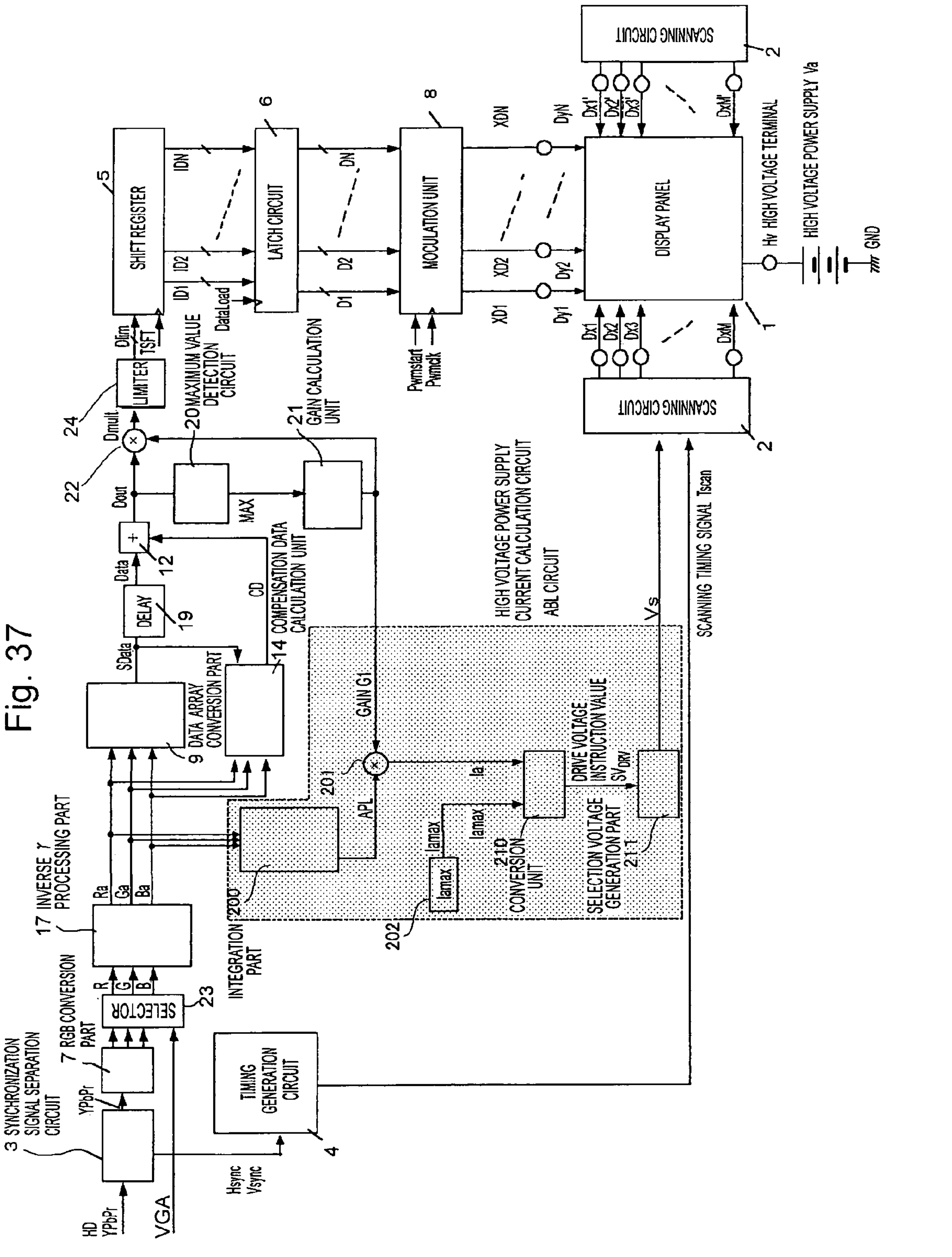
FIG. 37 is a block diagram showing a structure of a display apparatus according to a fourth embodiment of the invention.

FIG. 37 shows one example of a circuit structure which carries out signal processing for controlling the luminance on 1 frame. Here, descriptions of the same components as in the structure shown in FIGS. 14, 26, 31, 35, and 36 are omitted.

In FIG. 37, the high voltage power supply current value calculation circuit (current value calculation unit) and ABL circuit (electric power limitation unit) are shown by yarding with a dotted line. In addition, since the conversion unit 210 and the selection voltage generation part 211 are also a unit for changing the drive condition, they can be called as the drive condition change unit.

In the structure of FIG. 37, the conversion unit 210 is a table memory to which the output of the multiplier 201 (Ia: corresponds to the current value of the high voltage power supply) and the current limit value (Iamax: reference current value) of the high voltage power supply which is set in the register 202 in advance are inputted. Then, in case that the output (corresponds to the current value of the high voltage power supply) of the multiplier 201 is larger than the current limit value (Iamax) which is set in advance, the drive condition is changed so as to limit electric power of the display apparatus.

Figure 38:
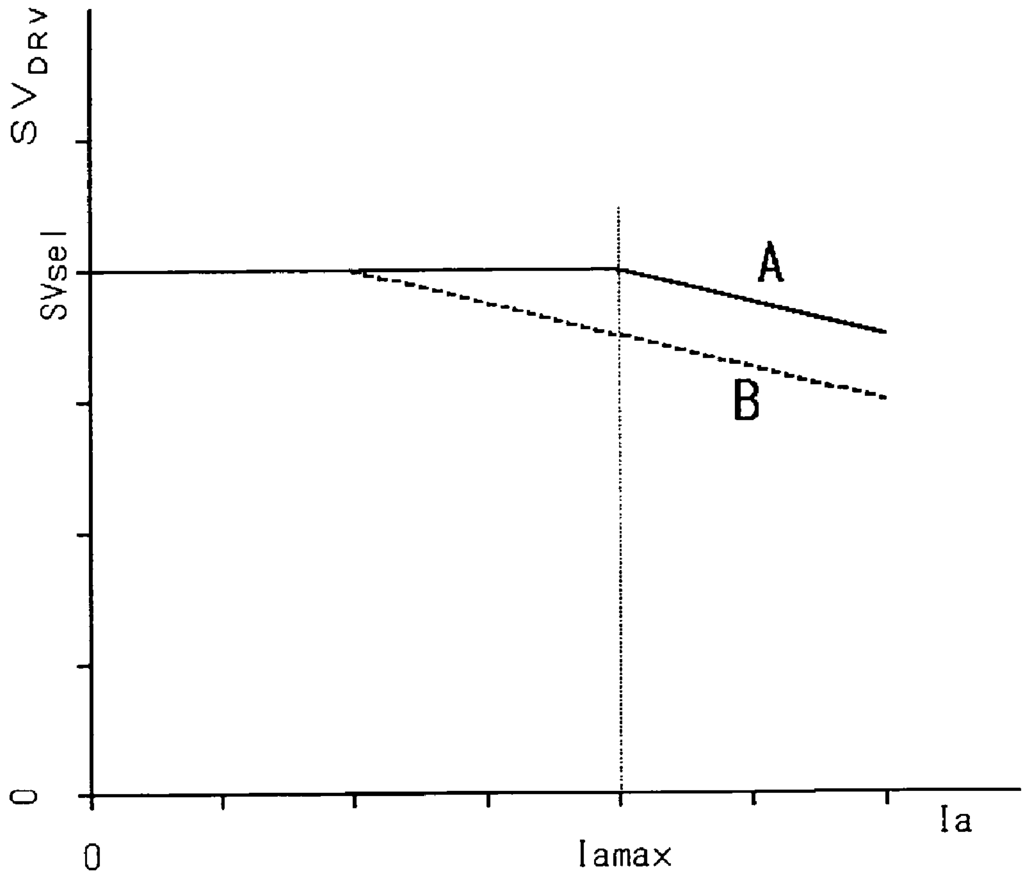
FIG. 38 is a diagram showing a conversion characteristic of a conversion unit.

More concretely, as shown in FIG. 38, with regard to the output (Ia: corresponds to the current value of the high voltage power supply) of the multiplier 201 which exceeds the current limit value (Iamax), the drive voltage instruction value ($SV_{DRV}$) is lessened as shown by A in FIG. 38.

In FIG. 38, a horizontal axis represents the output (Ia: corresponds to the current value of the high voltage power supply) of the multiplier 201, and a vertical axis represents the drive voltage instruction value $SV_{DRV}$, and shows numerical values (for example, data of digital quantity) corresponding to $V_{DRV}$ as an electric potential difference between the electric potential (VPwm) of the output of the modulation unit and the selection electric potential (Vs) of the scanning circuit. Also, in FIG. 38, SVsel is a drive voltage instruction value corresponding to the rated voltage $V_{SEL}$ of the surface conduction electron-emitting device.

A curve of a concrete characteristic shown by A in FIG. 38 is determined such that, when it was calculated that the output (Ia) of the multiplier 201 exceeds the current limit value (Iamax), actual electric power does not exceed it. Also, an example in which the current limit value Iamax is set to be smaller is shown by a characteristic B in FIG. 38. Such a picture that the drive voltage instruction value SVDRV is getting decreased from when the output Ia of the multiplier 201 is smaller is obtained.

The selection voltage generation part 211 converts the drive voltage instruction value $SV_{DRV}$ into the actual drive voltage ($V_{DRV}$) As a method of changing the drive voltage, at least one of the electric potential (Vpwm) of the output of the modulation unit 8, and the selection electric potential (Vs) of the scanning circuits 2 and 2' may be changed. In this embodiment, in order to limit the electric power, only the selection electric potential (Vs) of the scanning circuits 2 and 2' is to be changed.

Figure 39:
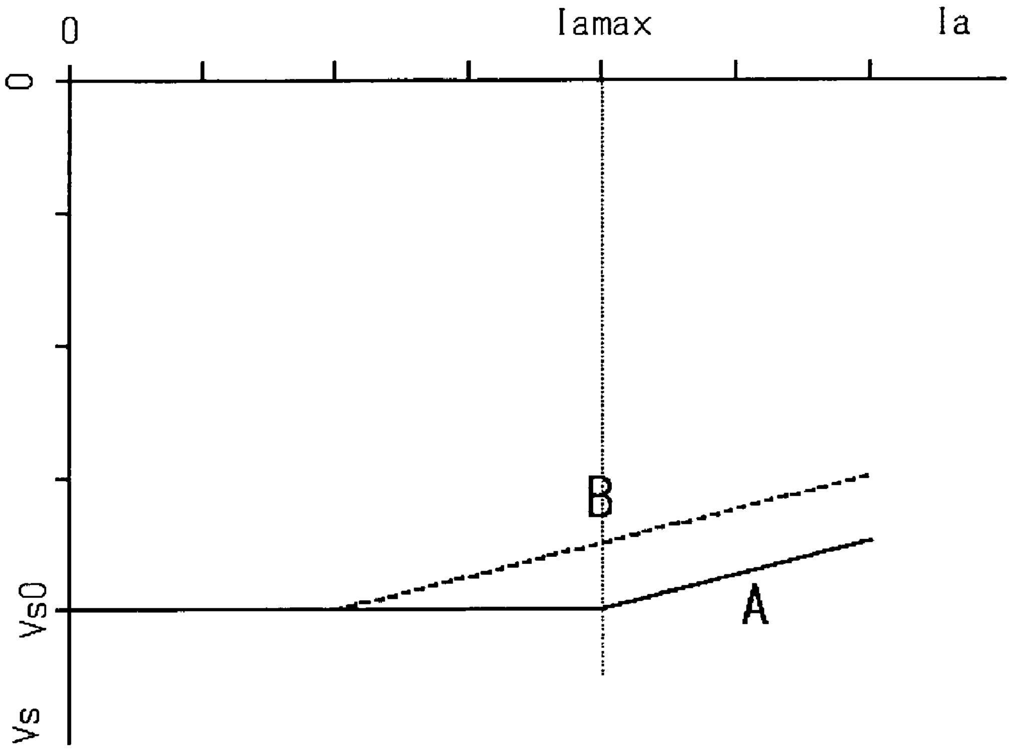
FIG. 39 is a diagram showing a characteristic of a selection voltage generation unit.

FIG. 39 is a graph showing a characteristic of the selection voltage generation part 211, and a horizontal axis represents the output (Ia: corresponds to the current value of the high voltage power supply) of the multiplier 201, and a vertical axis represents the selection electric potential (Vs) of the scanning circuits 2 and 2'. The selection electric potential (Vs) of the scanning circuits 2 and 2' is determined such that the drive voltage ($V_{DRV}$) becomes the drive voltage instruction value $SV_{DRV}$ as the output of the selection voltage generation part 211. In addition, Vs0 was determined to be $-0.5\times V_{SEL}$.

The curves of the characteristics A and B in FIG. 38 correspond, respectively, to curves of characteristics A and B in FIG. 39. Then, the selection voltage generation part 211 changes the selection electric potential Vs of the scanning circuits 2 and 2' such that its absolute value is lessened when the output (Ia) of the multiplier 201 exceeds a predetermined value. That is, the scanning circuits 2 and 2' function as a dependent power supply in which the selection electric potential Vs outputted from there changes in accordance with the output of the selection voltage generation part 211.

By the structure which changes the selection electric potential of the scanning circuits 2 and 2' as described above, influence of the voltage drop was compensated and further, the ABL operation could be carried out.

In the fourth embodiment, in case that the conversion unit 210 is configured to output a digital output, and the selection voltage generation part 211 is configured to output an analog signal by providing an analog-to-digital converter inside thereof, the circuit structure can be realized with low cost because of.

In the fourth embodiment, as the drive condition, it was configured that the selection electric potential of the scanning circuits 2 and 2' as the drive voltage becomes changeable. Besides this, as the drive voltage, electric potential of the output of the modulation unit 8 may be changed, or both of the selection electric potential of the scanning circuits 2 and 2' and the electric potential of the output of the modulation unit 8 may be changed. Further, even when the electric potential of the high voltage power supply is changed, the ABL operation can be carried out.

In the fourth embodiment, compensation of influence of the voltage drop on the scanning wiring is carried out. Therefore, in case that the drive condition (drive voltage: $V_{DRV}$) is changed on a large scale, there may be a case that errors occur in calculating the compensation of influence of the voltage drop on the scanning wiring. Then, a structure for lessening this error will be described.

Fifth Embodiment

Figure 40:
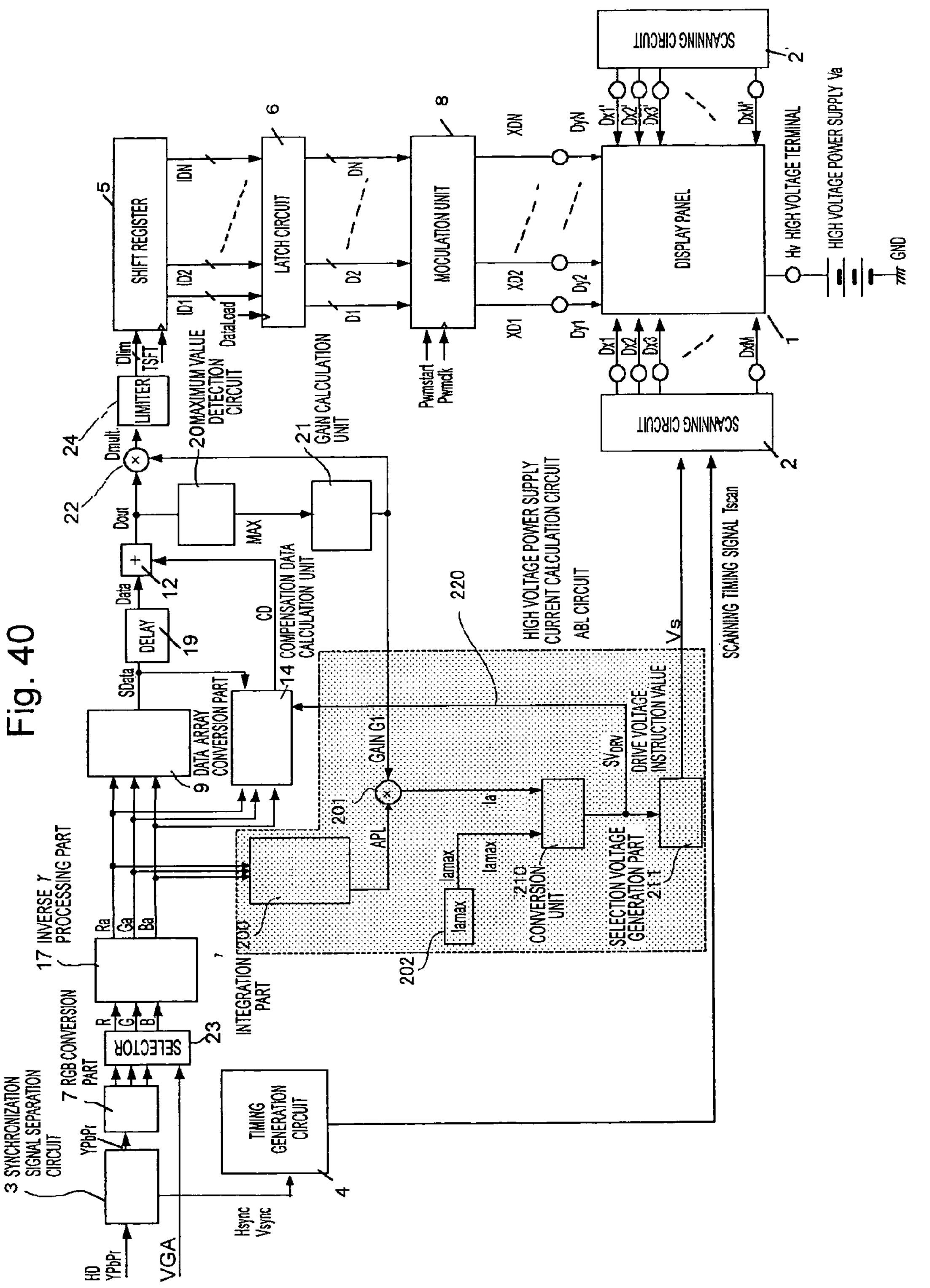
FIG. 40 is a block diagram showing a structure of a display apparatus according to a fifth embodiment of the invention.

FIG. 40 shows a structure of a display apparatus of this embodiment.

A structural difference of FIG. 40 and FIG. 37 is on a point that, in the luminance control unit, the drive voltage instruction value $SV_{DRV}$ which was outputted from the conversion unit 210 is supplied to the compensation data calculation unit 14. Descriptions of the same portions as in the fourth embodiment are omitted.

In FIG. 40, the conversion unit 210 receives inputs of the output (Ia) of the multiplier 201 and the current limit value (Iamax) of the high voltage power supply which is set in the register 202 in advance, and, in order to limit the electric power of the display apparatus, changes the drive voltage instruction value $SV_{DRV}$ as the drive condition to then, be outputted.

The drive voltage instruction value $SV_{DRV}$ is, as described above, inputted to the selection voltage generation part 211, and used for changing the selection electric potential of the scanning circuits 2 and 2' and limiting the electric power of the high voltage power supply of the display panel. Further, the drive voltage instruction value $SV_{DRV}$ is sent to the compensation data calculation unit 14 through a wiring 220, and used for changing calculation parameters of the voltage drop compensation and calculating the compensated image data, as described below.

With regard to the operation of the conversion unit 210, in this method, the following operation was more desirable.

Assuming that SVsel represents the drive voltage instruction value corresponding to the rated voltage of the surface conduction electron-emitting device, the conversion unit 210 determines $SV_{DRV}$ by use of the following equation.

When Ia<Iamax, $$SV_{DRV}=SVsel \quad \text{(Equation 32)}$$

When Ia≧Iamax, $$SV_{DRV}=(Iamax/Ia)\times SV_{DRV}' \quad \text{(Equation 33)}$$

(However, $SV_{DRV}'$ represents a drive voltage instruction value of a precedent frame)

The conversion unit 210 outputs the above-described drive voltage instruction value ($SV_{DRV}$). As to others, the above-described operations are carried out.

In this embodiment, even when the electric potential of the high voltage power supply is changed, the ABL operation could be carried out. In case that the high voltage power supply is changed, the voltage drop amount is not almost changed but, since emission current amount of the electron-emitting device is somewhat changed, that portion is considered as a parameter.

In this embodiment, even when the drive condition (drive voltage: $V_{DRV}$) is changed on a large scale, there occurs no error in calculating the compensation of influence of the voltage drop on the scanning wiring, and good ABL operation could be realized.

In addition, in case that the compensation of influence of the voltage drop on the scanning wiring is not carried out, since the electric charge amount to be actually emitted varies due to the voltage drop on the scanning wiring, the image data does not coincide with the electric charge amount to be discharged. Therefore, there may be a case that precise ABL operation can not be carried out.

With regard to the above-described current value calculation method of the high voltage power supply and ABL, a case that the overflow processing was carried out was described but, in case that the voltage drop amount is small or the scanning time is long, and the overflow processing is not necessary, since the gain G1 is 1, the maximum value detection circuit 20, the gain calculation unit 21, and the multipliers 22, 201 out of the structure in FIG. 40 are not necessary.

In case that the overflow processing is not carried out, the integrated value (APL value) of the image data corresponds to the current value (Ia) of the high voltage power supply as it is, and this shows that, by compensating the influence of the voltage drop on the scanning wiring, the current value (Ia) of the high voltage power supply can be calculated with good precision. That is, in case that the compensation of the influence of the voltage drop is not carried out, even if the integrated value of the image data is simply found, it does not correspond precisely to the current value of the high voltage power supply, which is not necessary to be said.

(Shift Resistor, Latch Circuit)

The compensated image data Dlim as outputs from the limiter 24 undergoes the serial/parallel conversion by the shift resistor 5, whereby the image data Dout changes from its serial data format into parallel image data ID1 to IDN per modulation wiring and then it is outputted to the latch circuit 6. The latch circuit 6 latches the data from the shift resistor 5 immediately before one horizontal interval is started, based on the timing signal Dataload. The outputs from the latch circuit 6 are delivered to the modulation unit 8 as parallel image data D1 to DN.

In this embodiment, the image data ID1 to IDN and D1 to DN are each composed of 8 bits. Their operation timing is based on the timing control signals TSFT and Dataload from the timing generation circuit 4 (see, FIGS. 26 and 31).

(Detail of the Modulation Unit)

The parallel image data D1 to DN as the output of the latch circuit 6 are supplied to the modulation unit 8. The modulation unit 8 is the structure as shown in FIG. 18, and the same as that in the above-described respective embodiments. A timing chart which shows the operation of the modulation unit 8 in this embodiment is the same as one shown in FIG. 32

(Compensation Data Calculation Unit)

A structure of the compensation data calculation unit 14 is the same as one shown in FIG. 21. Also, a structure for calculating the compensation data discretely is the same as one shown in FIG. 22.

Sixth Embodiment

In the fourth and fifth embodiments etc., the maximum value of the compensated image data was detected, and the gain was calculated such that the maximum value corresponds to the maximum value of the input range of the modulation unit 8, and the gain was multiplied with the compensated image data so that the overflow was prevented.

In contrast to this, in a sixth embodiment, in the same manner as in the above-described fourth and fifth embodiment, the maximum value of the compensated image data is detected. In this embodiment, a value of the image data before compensation is applied is limited such that its maximum value corresponds to the maximum value of the input range of the modulation unit 8. That is, in order to prevent the overflow, its amplitude range is lessened in advance by multiplying the image data inputted with the gain so that the overflow is prevented.

In addition, as another method of calculating the gain, in a structure of this embodiment, the gain may be calculated by use of the fixed gain method.

In this embodiment, when it is assumed that the maximum value of the compensated image data Dout in 1 frame is MAX, and the maximum value of the input range of the modulation unit is INMAX, and the gain calculated by the gain calculation unit to a precedent frame is GB, the gain G2 is determined by use of the above-described (Equation 26).

In the gain calculation unit 21, the gain is renewed in the vertical blanking period and a value of the gain is changed with respect to each frame.

In addition, this embodiment is configured that, by use of the maximum value of the compensated image data of a precedent frame, the gain to be multiplied with the compensated imaged data of a current frame is calculated, i.e., by use of correlation of the compensated image data (image data) between frames, the overflow is prevented. Accordingly, in a narrow sense, there may be a case that the overflow occurs due to the difference of the compensated image data with respect to each frame. In order to prevent this, it is desirable to design a circuit such that a limiter unit is provided to the output of the multiplier which multiplies the compensated image data with the gain, and the output of the multiplier is surely accommodated within the input range of the modulation unit.

Also, besides the above-described gain deciding methods, the gain may be calculated by use of the following another method. That is, the maximum value of the compensated data which was detected in a frame precedent to the current frame may be averaged, and by use of the averaged value AMAX, the gain G2 which is applied to the compensated image data of the current frame may be determined as in (Equation 27). However, GB designates the gain G2 which was calculated by the gain calculation unit 21 to the precedent frame.

Also, as still another method, the gains G2 with respect to each frame may be calculated by use of (Equation 26), and a current gain may be calculated by averaging them.

Any method among these 3 methods is desirable in the sense of preventing the overflow but, considering occurrence of the flickers, it is desirable to calculate it by use of the method of (Equation 27).

In the gain calculation method of (Equation 27), when the number of frames averaging the maximum values of the compensated image data was studied, in case that for example maximum values of compensated image data of precedent 16 frames to 64 frames to a current frame were averaged, a good image with less flickers was obtained.

In addition, also in this method, it is, needless to say, desirable that the limiter 24 for limiting the output of the adder 12 is provided so that the overflow is prevented completely.

Also, a method of calculating the gain may be changed by detecting the scene change, in the same manner as in the fourth embodiment.

Hereinafter, the luminance control unit comprising the high voltage power supply current value calculation circuit and the ABL circuit will be described.

Since the principle and structure of the high voltage power supply current value calculation circuit are the same as in the fourth embodiment, the description is omitted.

In the past, a resistance for current detection is attached to the high voltage power supply, and from its voltage, the current value of the high voltage power supply is found but, according to the structure of this embodiment, in the same manner as in the fourth embodiment, without adopting a conventional like structure, the current value of the high voltage power supply could be calculated only by only by calculation of data. Particularly, in realizing ABL as described below, in the same manner as in the fourth embodiment, hardware cost could be reduced.

Figure 41:
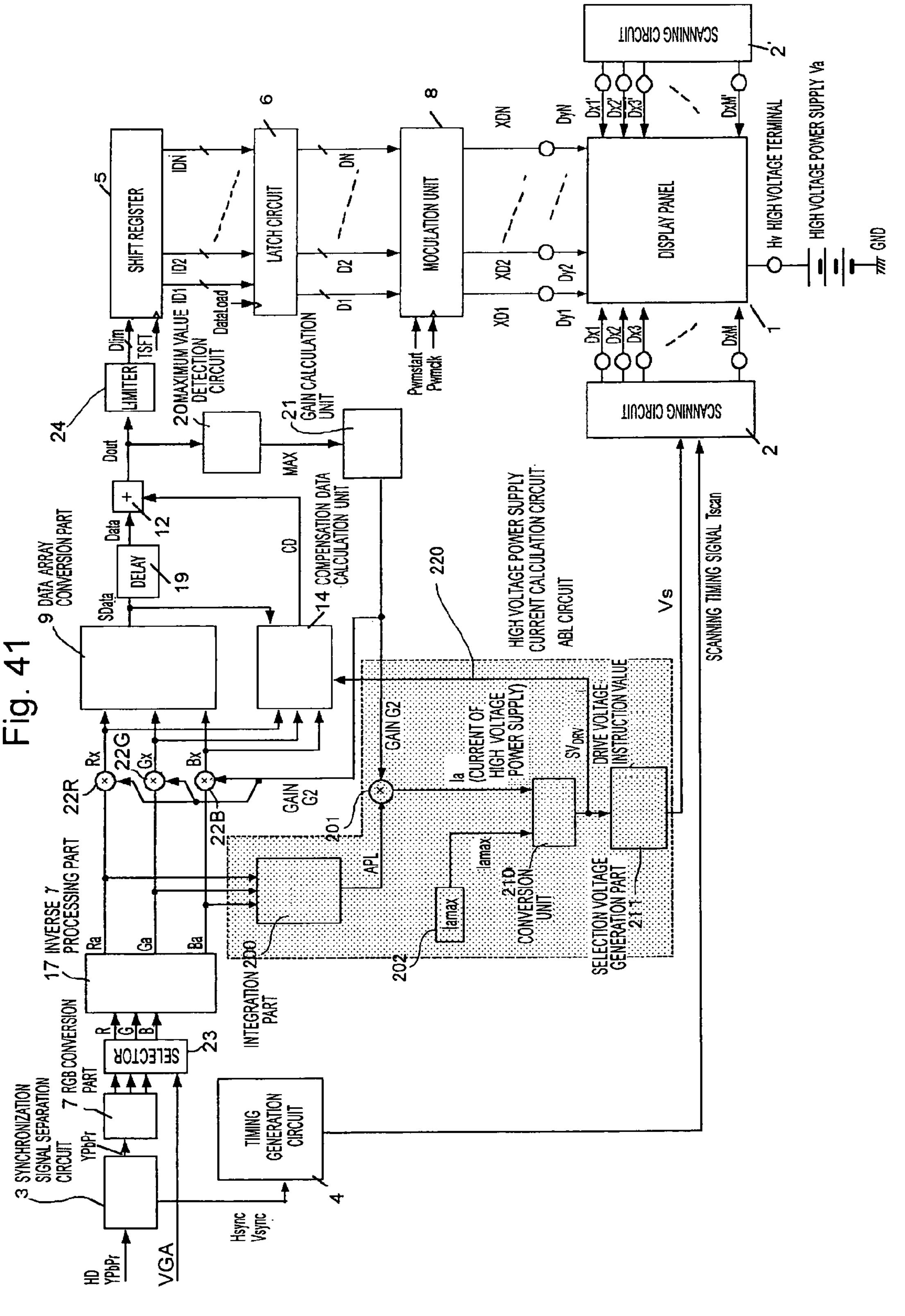
FIG. 41 is a block diagram showing a structure of a display apparatus according to a sixth embodiment of the invention.

In FIG. 41, 200 designates the integration part (integration unit) for integrating 1 frame portion of the image data as the luminance desired value, 201 designates the multiplier, 202 designates the register which stores the limit value (Iamax) of the high voltage current, 210 designates the conversion unit, and 211 designates the selection voltage generation part (selection voltage generation unit). In FIG. 41, as described above, the output of the multiplier 201 corresponds to the current value (Ia) of the high voltage power supply. In FIG. 41, the high voltage power supply current value calculation circuit (current value calculation unit) and the ABL circuit (electric power limitation unit) are shown by yarding with a dotted line.

Also in this embodiment, in the same manner as in the fourth embodiment, as the drive condition, the drive voltage $V_{DRV}$ (among them, the selection electric potential of the scanning circuits 2 and 2': Vs) was changed. In this embodiment, compensation of influence of the voltage drop on the scanning wiring is carried out, and further, based upon the change of the drive condition (drive voltage: $V_{DRV}$), parameters for calculation of the compensation of influence of the voltage drop on the scanning wiring are changed.

Since FIG. 41 is the same as FIG. 40 except that a place where the gain G2 is multiplied for overflow processing differs, descriptions of respective parts are omitted.

In FIG. 41, the conversion unit 210 receives inputs of the output (Ia: corresponds to the current value of the high voltage power supply) of the multiplier 201 and the current limit value (Iamax) of the high voltage power supply which is set in the register 202 in advance, and, in order to limit the electric power of the display apparatus, changes the drive voltage instruction value $SV_{DRV}$ as the drive condition to then, be outputted.

The drive voltage instruction value $SV_{DRV}$ is inputted to the selection voltage generation part 211, and used for changing the selection electric potential of the scanning circuits 2 and 2' and limiting the electric power of the high voltage power supply of the display panel. Further, the drive voltage instruction value $SV_{DRV}$ is sent to the compensation data calculation unit 14 through a wiring 220, and used for changing calculation parameters and calculating the compensated image data.

With regard to the operation of the conversion unit 210, in this method, the following operation was desirable in the same manner as in the fifth embodiment.

Assuming that SVsel represents the drive voltage instruction value corresponding to the rated voltage of the surface conduction electron-emitting device, the conversion unit 21 determines $SV_{DRV}$ as in (Equation 32), (Equation 33).

The conversion unit 210 outputs the above-described drive voltage instruction value ($SV_{DRV}$). As to others, the above-described operations are carried out.

In this embodiment, as the drive condition, the drive voltage (among them, the selection electric potential of the scanning circuits 2 and 2') was changed but, as a matter of course, the electric potential of the output of the modulation unit 8 or both may be changed. Further, even when the electric potential of the high voltage power supply is changed, the ABL operation can be carried out.

In this embodiment, even when the drive condition (drive voltage: $V_{DRV}$) is changed on a large scale, there occurs no error in calculating the compensation of influence of the voltage drop on the scanning wiring, and good ABL operation could be realized.

In the same manner as in the fourth embodiment, in case that the drive condition (drive voltage: $V_{DRV}$) is not changed on a large scale, the wiring 220 is not necessary, and even when the calculation of compensation of influence of the voltage drop on the scanning wiring was carried out, there was little influence on image quality of display. Then, the ABL operation was realized well.

In addition, in case that the compensation of influence of the voltage drop on the scanning wiring is not carried out, since the electric charge amount to be actually emitted varies due to the voltage drop on the scanning wiring, the image data does not coincide with the electric charge amount to be emitted. Therefore, there may be a case that precise ABL operation can not be carried out.

In addition, since the methods of determining the current limit value (Iamax) of the high voltage power supply which is set in advance, in the fourth to sixth embodiments are the same as the determining methods in the above-described second and third embodiments, to describe it again is omitted.

As described above, the display apparatuses in the embodiments could improve the deterioration of the display image due to the voltage drop on the scanning wiring, which was the conventional problem.

Also, the image could be displayed with high grade by multiplying the gain such that the image data after compensation does not overflow above the input range of the modulation unit.

Then, further, the luminance control could be carried out precisely with less hardware by multiplying integration result of the input image data with the gain and detecting it as the current value of the high voltage power supply.

The method including the above-described compensation processing and luminance control processing can be realized as an 1 chip semiconductor integrated circuit, and also, it is possible to distribute them as IP cores for them.

What is claimed is:

1. An image data processing circuit comprising:

a first circuit for calculating an average picture level value of the image data;

a multiplier for multiplying a coefficient by the image data;

a second circuit for calculating a first coefficient for the multiplier based upon the average picture level value;

a third circuit for calculating a second coefficient for the multiplier, the second coefficient being calculated so that the result of multiplying (1) image data having a value over an input range of a circuit to which data from the multiplier is inputted, and (2) the second coefficient falls in the input range; and a selection circuit for selecting the coefficient to be used in the multiplier from the first coefficient calculated by the second circuit and the second coefficient calculated by the third circuit.

* * * * *

UNITED STATES PATENT AND TRADEMARK OFFICE

CERTIFICATE OF CORRECTION

PATENT NO. : 7,414,622 B2
APPLICATION NO. : 11/260456
DATED : August 19, 2008
INVENTOR(S) : Naoto Abe et al.

It is certified that error appears in the above-identified patent and that said Letters Patent is hereby corrected as shown below:

SHEET 14:

Fig. 14, "MOCULATION" should read --MODULATION--.

SHEET 26:

Fig. 26, "MOCULATION" should read --MODULATION-- and "SCANNING CIRCUIT 2" (right hand side) should read --SCANNING CIRCUIT 2'--.

SHEET 31:

Fig. 31, "MOCULATION" should read --MODULATION--.

SHEET 35:

Fig. 35, "MOCULATION" should read --MODULATION--.

SHEET 36:

Fig. 36, "MOCULATION" should read --MODULATION--.

SHEET 37:

Fig. 37, "MOCULATION" should read --MODULATION--.

SHEET 40:

Fig. 40, "MOCULATION" should read --MODULATION--.

SHEET 41:

Fig. 41, "MOCULATION" should read --MODULATION--.

UNITED STATES PATENT AND TRADEMARK OFFICE

CERTIFICATE OF CORRECTION

PATENT NO. : 7,414,622 B2
APPLICATION NO. : 11/260456
DATED : August 19, 2008
INVENTOR(S) : Naoto Abe et al.

Figure 42:
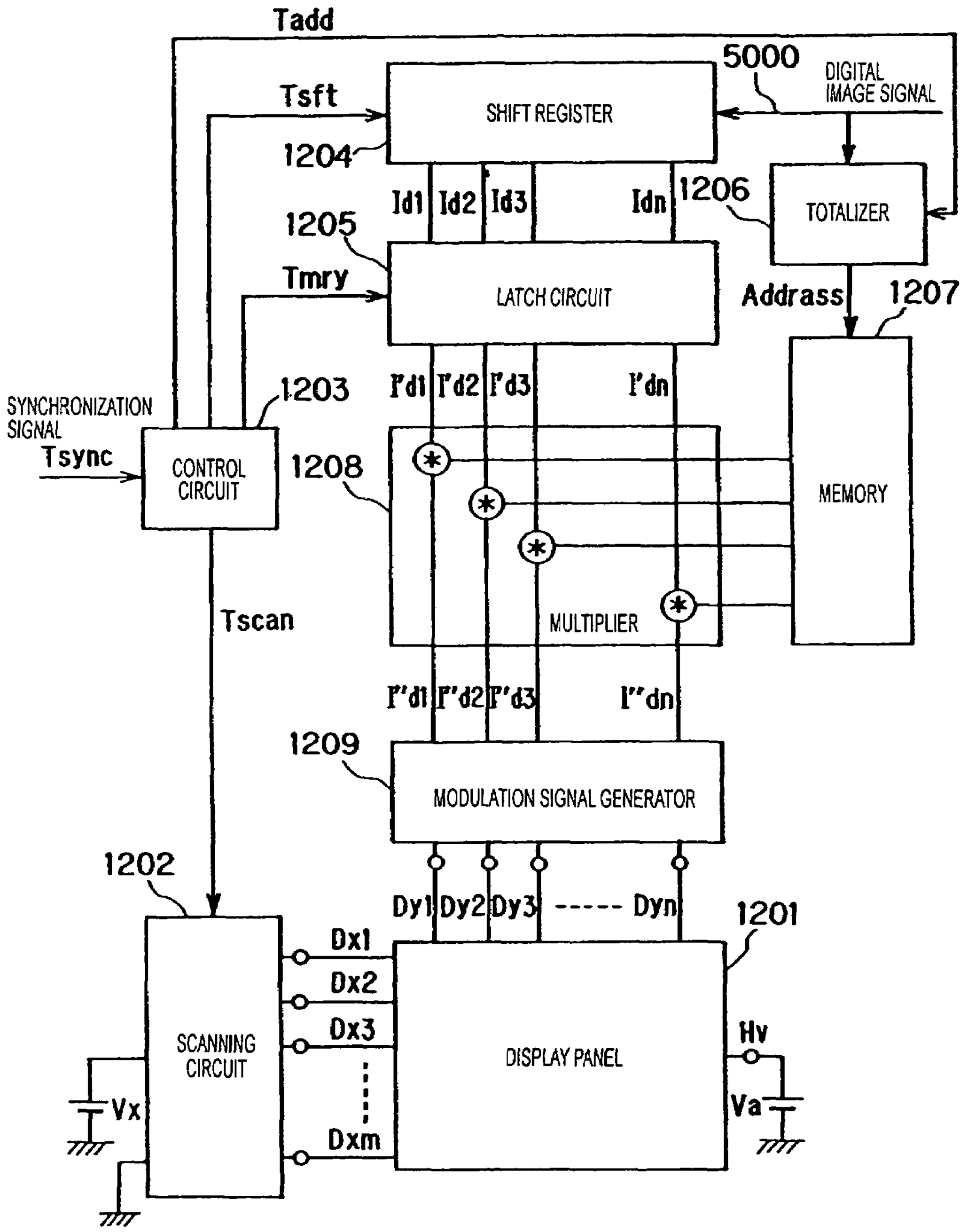
FIG. 42 is a block diagram showing a structure of a conventional display apparatus.

It is certified that error appears in the above-identified patent and that said Letters Patent is hereby corrected as shown below:

SHEET 42:

Fig. 42, “Addrass” should read --Address--.

COLUMN 3:

Line 60, “wirings and row” should be deleted.

COLUMN 8:

Line 44, “calculated the” should read --calculated of the--.
Line 54, “interpolates” should read --interpolating--.

COLUMN 9:

Line 1, “what used,” should read --what is used,--.

COLUMN 11:

Line 20, “i emitted” should read --“i” emit--.

COLUMN 12:

Line 35, “currnts become” should read --currents becomes--.

COLUMN 13:

Line 59, “calculation” should read --calculation.--.
Line 61, “model.).” should read --model.)--.

COLUMN 15:

Line 54, “$rl0=rt+0.5\times n\times r$” should read --$r10=rt+0.5\times n\times r$--.

UNITED STATES PATENT AND TRADEMARK OFFICE

CERTIFICATE OF CORRECTION

PATENT NO. : 7,414,622 B2
APPLICATION NO. : 11/260456
DATED : August 19, 2008
INVENTOR(S) : Naoto Abe et al.

It is certified that error appears in the above-identified patent and that said Letters Patent is hereby corrected as shown below:

COLUMN 17:

Line 17, "coefficient a" should read --coefficient α--.

COLUMN 23:

Line 7, "position×located" should read --position × located--.

COLUMN 27:

Line 46, "provided.)." should read --provided).--.

COLUMN 28:

Line 32, "sift" should read --shift--.
Line 41, "SVDRV" should read --$SV_{DRV}$--.
Line 49, "$V_{DRV}$from" should read --$V_{DRV}$ from--.
Line 59, "screen.Also," should read --screen. Also,--.

COLUMN 29:

Line 11, "SVDRV" should read --$SV_{DRV}$--.

COLUMN 32:

Line 17, "immediatly" should read --immediately--.

COLUMN 38:

Line 10, "before inputted" should read --before being inputted--.

UNITED STATES PATENT AND TRADEMARK OFFICE
CERTIFICATE OF CORRECTION

PATENT NO. : 7,414,622 B2
APPLICATION NO. : 11/260456
DATED : August 19, 2008
INVENTOR(S) : Naoto Abe et al.

It is certified that error appears in the above-identified patent and that said Letters Patent is hereby corrected as shown below:

COLUMN 39:

Line 17, "Gain $G1 \leqq$ INMAX/AMAX (Equation 20)" should read
--Gain $G1 \leqq$ INMAX/MAX (Equation 20)--.

COLUMN 40:

Line 59, "$1 \geqq A \geqq B \geqq 0$)," should read --$1 \geqq A \geqq B > 0$),--.

COLUMN 43:

Line 37, "G1>Iamax," should read --G1<Iamax,--.

COLUMN 49:

Line 25, "diving" should read --dividing--.
Line 66, "line" should read --line.--.

COLUMN 54:

Line 3, "SVsel" should read --$SV_{sel}$--.
Line 12, "SVDRV" should read --$SV_{DRV}$--.

COLUMN 55:

Line 23, "$SV_{DRV}$is," should read --$SV_{DRV}$ is,--.
Line 35, "SVsel" should read --$SV_{sel}$--.
Line 41, "$SV_{DRV}$=SVsel (Equation 32)" should read
--$SV_{DRV}=SV_{sel}$ (Equation 32)--.
Line 45, "$SV_{DRV}$=(Iamax/Ia)×$SV_{DRV}$'(Equation 33)" should read
--$SV_{DRV}$=(Iamax/Ia)×$SV_{DRV}$' (Equation 33)--.

UNITED STATES PATENT AND TRADEMARK OFFICE

CERTIFICATE OF CORRECTION

PATENT NO. : 7,414,622 B2
APPLICATION NO. : 11/260456
DATED : August 19, 2008
INVENTOR(S) : Naoto Abe et al.

It is certified that error appears in the above-identified patent and that said Letters Patent is hereby corrected as shown below:

COLUMN 58:

Line 51, "SVsel" should read --$SV_{sel}$--.

Signed and Sealed this

First Day of December, 2009

David J. Kappos
*Director of the United States Patent and Trademark Office*